United States Patent
Greifeneder et al.

(10) Patent No.: US 9,231,858 B1
(45) Date of Patent: Jan. 5, 2016

(54) COMPLETENESS DETECTION OF MONITORED GLOBALLY DISTRIBUTED SYNCHRONOUS AND ASYNCHRONOUS TRANSACTIONS

(75) Inventors: Bernd Greifeneder, Linz (AT); Markus Phleger, St. Johann am Wimberg (AT); Robert Kohel, Braunau (AT)

(73) Assignee: dynaTrace software GmbH, Linz (AT)

(*) Notice: Subject to any disclaimer, the term of this patent is extended or adjusted under 35 U.S.C. 154(b) by 1286 days.

(21) Appl. No.: 12/971,408

(22) Filed: Dec. 17, 2010

Related U.S. Application Data

(60) Provisional application No. 61/287,610, filed on Dec. 17, 2009.

(51) Int. Cl.
*G06F 15/16* (2006.01)
*H04L 12/707* (2013.01)
*H04L 12/26* (2006.01)

(52) U.S. Cl.
CPC .................. *H04L 45/24* (2013.01); *H04L 43/16* (2013.01)

(58) Field of Classification Search
CPC ....... H04L 45/124; H04L 45/22; H04L 45/30; H04L 45/302; H04L 45/304; H04L 45/306; H04L 45/3065; H04L 45/44; H04L 45/70; H04L 43/16
USPC .................. 709/248, 238, 239, 240, 241, 242
See application file for complete search history.

(56) References Cited

U.S. PATENT DOCUMENTS

| | | |
|---|---|---|
| 5,432,932 A | 7/1995 | Chen |
| 5,727,147 A | 3/1998 | vanHoff |
| 5,781,778 A | 7/1998 | Meier |

(Continued)

OTHER PUBLICATIONS

Mikhail Dmitriev, "Design of JFluid: A Profiling Technology and Tool Based on Dynamic Bytecode Instrumentation," Sun Microsystems, 2003, <http://delivery.acm.org/10.1145/1700000/1698171/smli_tr-2003-125.pdf> pp. 1-22.

Mikhail Dmitriev, "Selective Profiling of Java Applications Using Dynamic Bytecode Instrumentation," IEEE, 2004, <http://ieeexplore.ieee.org/stamp/stamp.jsp?tp=&arnumber=1291366> pp. 141-151.

(Continued)

*Primary Examiner* — Dhairya A Patel
(74) *Attorney, Agent, or Firm* — Robert Plotkin, P.C.; Robert Plotkin

(57) ABSTRACT

A method and system for detection of completeness of tracing data describing globally distributed, synchronous and asynchronous transaction in real time is presented. Monitored transactions may be executed on different computers systems, connected via computer networks with different and fluctuating latencies, and timing systems of the computers systems may be subject to different time drifts.

The system and method may be implemented by different, multiple collector nodes responsible for collecting and forwarding transaction tracing data to a monitoring node, responsible for correlating transaction tracing data. Collector nodes and monitoring node may reside on different computer systems, which may be connected via computer networks with different and fluctuating latencies, and timing systems of the computers systems may be subject to different time drifts.

Completeness detection may consider different time drifts and different, fluctuating network latencies of all involved computer system and computer networks to translate time information received with tracing data into a virtual timing system, which may be used to implement a deterministic algorithm to detect completeness of tracing data describing the execution of distributed, synchronous and asynchronous transactions.

8 Claims, 34 Drawing Sheets

Example Distributed Monitored Transaction with overtaken Path Events

(56) References Cited

U.S. PATENT DOCUMENTS

| | | | |
|---|---|---|---|
| 5,794,046 A | 8/1998 | Meier | |
| 5,819,093 A | 10/1998 | Davidson | |
| 5,867,712 A | 2/1999 | Shaw | |
| 5,933,639 A | 8/1999 | Meier | |
| 5,953,530 A | 9/1999 | Rishi | |
| 6,101,524 A | 8/2000 | Choi | |
| 6,102,966 A | 8/2000 | Tyma | |
| 6,134,603 A | 10/2000 | Jones | |
| 6,145,121 A | 11/2000 | Levy | |
| 6,151,639 A | 11/2000 | Tucker | |
| 6,202,199 B1 | 3/2001 | Wygodny | |
| 6,266,805 B1 | 7/2001 | Nwana | |
| 6,332,212 B1 * | 12/2001 | Organ et al. | G06F 11/323 714/E11.181 |
| 6,353,923 B1 | 3/2002 | Bogle | |
| 6,539,541 B1 | 3/2003 | Geva | |
| 6,721,941 B1 | 4/2004 | Morshed | |
| 6,728,949 B1 | 4/2004 | Bryant | |
| 6,754,890 B1 | 6/2004 | Berry | |
| 6,760,903 B1 | 7/2004 | Morshed | |
| 6,795,962 B1 | 9/2004 | Hanson | |
| 6,802,054 B2 | 10/2004 | Faraj | |
| 6,862,711 B1 * | 3/2005 | Bahrs et al. | G06F 8/38 715/205 |
| 6,938,246 B2 | 8/2005 | Alford | |
| 6,961,926 B2 | 11/2005 | Koyama | |
| 6,968,540 B2 | 11/2005 | Beck | |
| 6,978,444 B1 | 12/2005 | Farchi | |
| 7,143,392 B2 | 11/2006 | Li | |
| 7,158,924 B2 | 1/2007 | Williams | |
| 7,162,710 B1 | 1/2007 | Edwards | |
| 7,263,689 B1 | 8/2007 | Edwards | |
| 7,293,259 B1 | 11/2007 | Dmitriev | |
| 7,293,260 B1 * | 11/2007 | Dmitriev | G06F 11/3466 714/E11.207 |
| 7,367,025 B1 | 4/2008 | Nikolov | |
| 7,376,940 B1 | 5/2008 | Bush | |
| 7,380,239 B1 | 5/2008 | Srivastava | |
| 7,386,839 B1 | 6/2008 | Golender | |
| 7,409,676 B2 | 8/2008 | Agarwal | |
| 7,493,607 B2 | 2/2009 | Moritz | |
| 7,496,903 B2 | 2/2009 | Rees | |
| 7,500,227 B1 | 3/2009 | Fontana | |
| 7,526,760 B1 | 4/2009 | Daynes | |
| 7,606,814 B2 | 10/2009 | Deily | |
| 7,685,183 B2 | 3/2010 | Pace | |
| 7,689,558 B2 | 3/2010 | Rossmann | |
| 7,698,691 B2 | 4/2010 | Chen | |
| 7,707,555 B2 | 4/2010 | Spertus | |
| 7,721,266 B2 * | 5/2010 | Frey et al. | G06F 11/366 717/128 |
| 7,765,527 B2 | 7/2010 | Burka | |
| 7,779,390 B1 | 8/2010 | Allavarpu | |
| 7,810,075 B2 | 10/2010 | Dostert | |
| 7,818,721 B2 | 10/2010 | Sundararajan | |
| 7,836,438 B1 | 11/2010 | Nikolov | |
| 7,941,789 B2 | 5/2011 | Ivanov | |
| 7,950,004 B2 | 5/2011 | Vieira | |
| 7,957,934 B2 | 6/2011 | Greifeneder | |
| 7,992,133 B1 | 8/2011 | Theroux | |
| 7,992,134 B2 | 8/2011 | Hinchey | |
| 8,032,872 B2 | 10/2011 | Violleau | |
| 8,037,458 B2 | 10/2011 | Shekov | |
| 8,176,480 B1 | 5/2012 | Spertus | |
| 8,266,595 B2 * | 9/2012 | Alexander, III | G06F 8/443 717/126 |
| 8,312,435 B2 | 11/2012 | Wygodny | |
| 8,375,367 B2 | 2/2013 | Briggs | |
| 8,438,427 B2 | 5/2013 | Beck | |
| 8,464,223 B2 | 6/2013 | Choi | |
| 8,539,452 B2 | 9/2013 | Chapman | |
| 8,601,443 B2 | 12/2013 | Barker | |
| 8,938,533 B1 | 1/2015 | Bansal | |
| 2001/0004766 A1 | 6/2001 | Koyama | |
| 2002/0032754 A1 | 3/2002 | Logston | |
| 2002/0174415 A1 | 11/2002 | Hines | |
| 2002/0199173 A1 | 12/2002 | Bowen | |
| 2003/0056200 A1 | 3/2003 | Li | |
| 2003/0163275 A1 | 8/2003 | Farrell | |
| 2004/0010570 A1 | 1/2004 | Kaler | |
| 2004/0093588 A1 | 5/2004 | Gschwind | |
| 2005/0039171 A1 | 2/2005 | Avakian | |
| 2005/0039172 A1 | 2/2005 | Rees | |
| 2005/0039186 A1 | 2/2005 | Borkan | |
| 2005/0039187 A1 | 2/2005 | Avakian | |
| 2005/0039190 A1 | 2/2005 | Rees | |
| 2005/0086656 A1 | 4/2005 | Whitlock | |
| 2005/0223048 A1 | 10/2005 | Smith | |
| 2005/0223367 A1 | 10/2005 | Smith | |
| 2005/0278706 A1 | 12/2005 | Garza | |
| 2005/0283522 A1 | 12/2005 | Parkkinen | |
| 2006/0069682 A1 | 3/2006 | Fanous | |
| 2006/0075386 A1 | 4/2006 | Loh | |
| 2006/0195561 A1 * | 8/2006 | Keane et al. | H04L 41/5012 709/223 |
| 2006/0271395 A1 | 11/2006 | Harris | |
| 2006/0271542 A1 | 11/2006 | Harris | |
| 2006/0271575 A1 | 11/2006 | Harris | |
| 2006/0271930 A1 | 11/2006 | Letizi | |
| 2006/0271931 A1 | 11/2006 | Harris | |
| 2007/0011667 A1 | 1/2007 | Subbiah | |
| 2007/0069005 A1 | 3/2007 | Dickerson | |
| 2007/0088762 A1 | 4/2007 | Harris | |
| 2007/0143323 A1 | 6/2007 | Vanrenen | |
| 2007/0143743 A1 | 6/2007 | Cobb | |
| 2007/0169055 A1 | 7/2007 | Greifeneder | |
| 2007/0180439 A1 | 8/2007 | Sundararajan | |
| 2008/0148240 A1 | 6/2008 | Jones | |
| 2008/0276227 A1 | 11/2008 | Greifeneder | |
| 2008/0282232 A1 | 11/2008 | Cong | |
| 2008/0288212 A1 | 11/2008 | Greifeneder | |
| 2008/0288962 A1 | 11/2008 | Greifeneder | |
| 2009/0044198 A1 | 2/2009 | Kuiper | |
| 2009/0049429 A1 | 2/2009 | Greifeneder | |
| 2010/0030983 A1 * | 2/2010 | Gupta et al. | G06F 11/1466 711/162 |
| 2010/0115495 A1 | 5/2010 | Sunkara | |
| 2010/0318648 A1 | 12/2010 | Agrawal | |
| 2011/0023019 A1 | 1/2011 | Aniszczyk | |
| 2012/0017165 A1 | 1/2012 | Gardner | |
| 2012/0255015 A1 | 10/2012 | Sahita | |
| 2012/0266147 A1 | 10/2012 | Dawson | |
| 2014/0068068 A1 | 3/2014 | Bansal | |

OTHER PUBLICATIONS

Parker Abercrombie et al., "jContractor: Bytecode Instrumentation Techniques for Implementing Design by Contract in Java," UCSB, Aug. 2004, <http://jcontractor.sourceforge.net/doc/Contractor_RV02.pdf> pp. 1-25.

Kuang et al., "E AHRW: An energy efficient adaptive hash scheduler for stream processing on multicore servers," IEEE, pp. 45-56, 2011.

Prabhu et al, "Using thread level speculation to simplify manual parallelization," ACM PPoPP, pp. 1-12, 2003.

Olivier et al, "Scheduling task parallelism on multi socket multicore systems", ACM ROSS, pp. 49-56, 2011.

Ntarmos et al, "Distributed hash sketches: scalable efficient and accurate cardinality estimation for distributed multisets," ACM Trans. on Comput. Sys. vol. 27, No. 1, article 2, pp. 1-52, 2009.

Andrew Z. Tabona, Windows 2003 performance monitor, p. 1-8, Publish Mar. 29, 2004.

Kamdem et al., "Efficiently Rewriting Large Multimedia Application Execution Traces with Few Event Sequences," ACM, pp. 1348-1356, 2013.

Bebenita et al., "Trace-Based Compilation in Execution Environments without Interpreters," ACM, pp. 59-68, 2010.

Miranskyy et al., "SIFT: A Scalable Iterative-Unfolding Technique for Filtering Execution Traces," ACM, pp. 1-15, 2008.

Malnati et al., "JThreadSpy: Teaching Multithreading Programming by Analyzing Execution Traces," ACM, pp. 3-13, 2007.

* cited by examiner

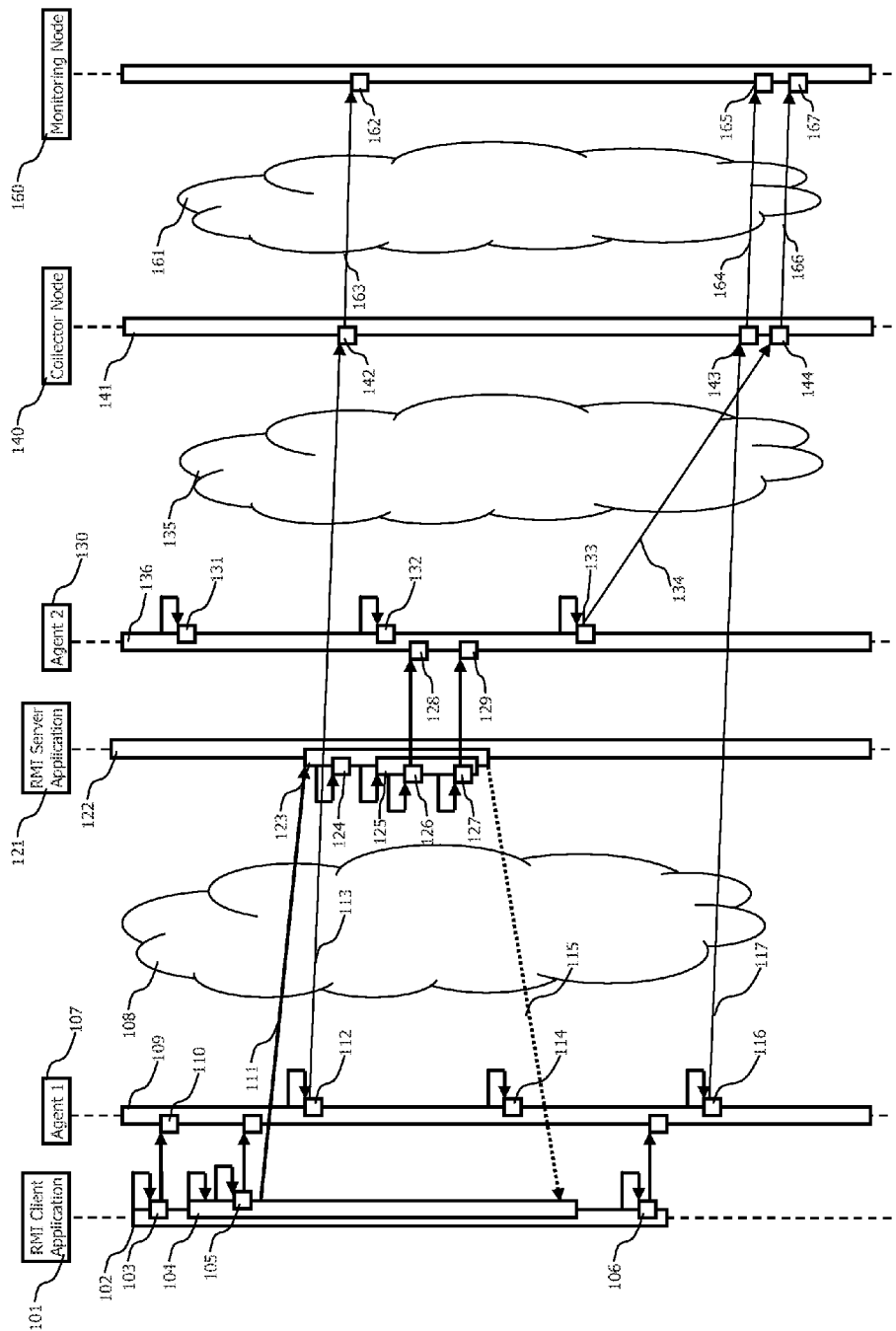

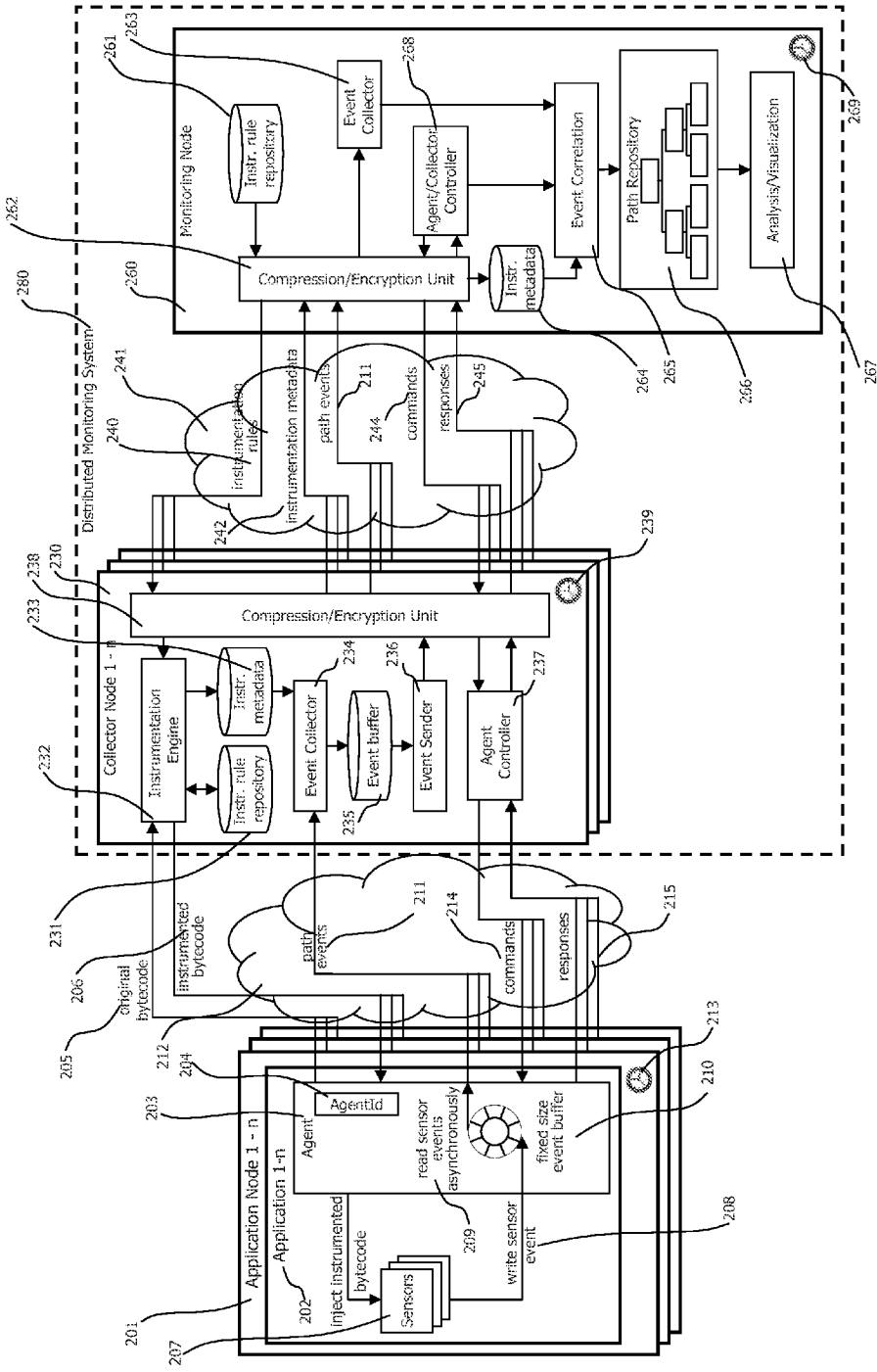
FIG 2: Out of Process Instrumentation with Collector Architecture

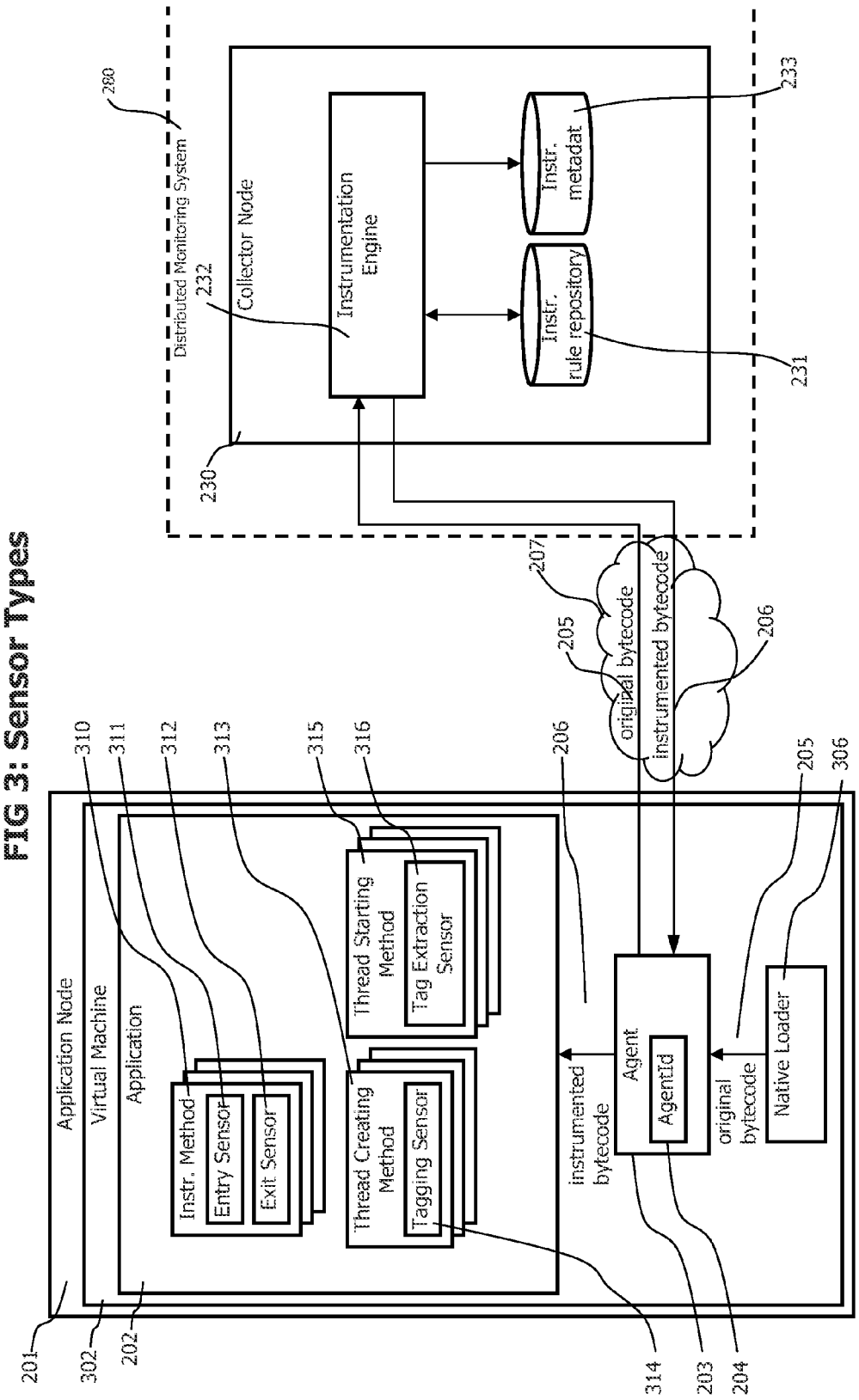

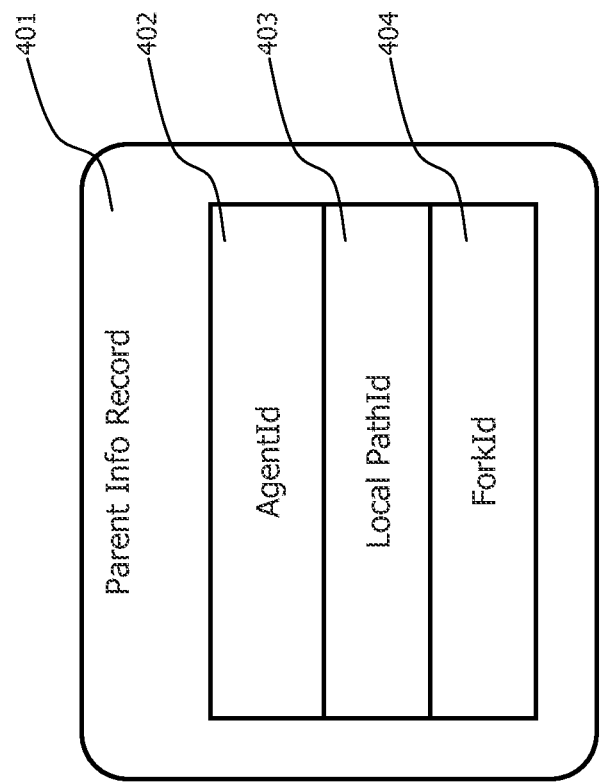

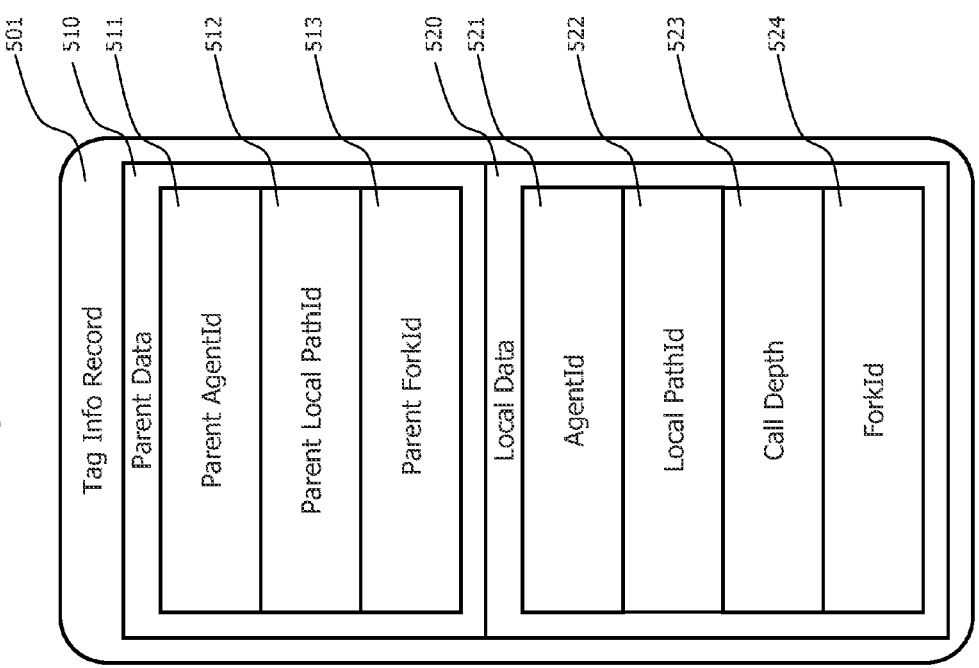
FIG 5: Tag Info Record

FIG 6: Path Event Records
FIG 6A: Start Path Event Record
FIG 6B: Path Event Record
FIG 6C: Path Correlation Event Record
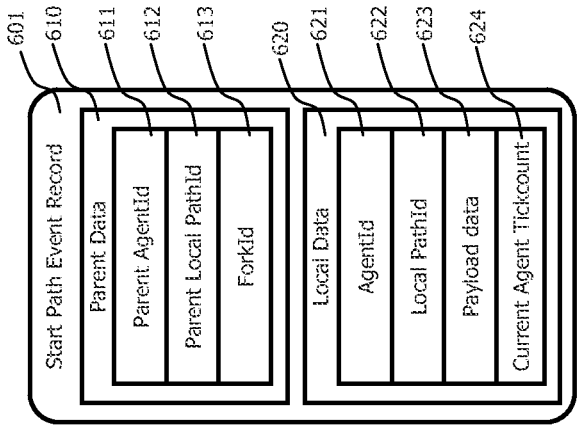
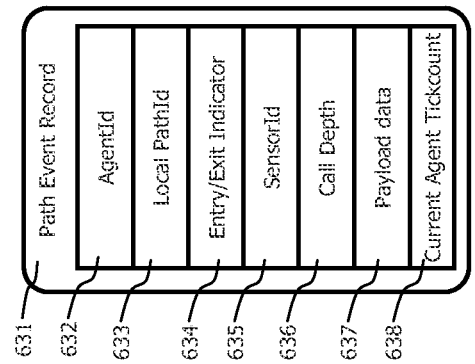
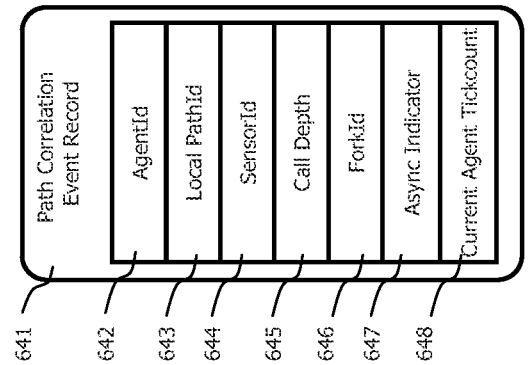

FIG 7: Commands/Responses {FIG 7A, FIG 7B, FIG 7C, FIG 7D, FIG 7E, FIG 7F}
FIG 7A: Agent Tickcount Command
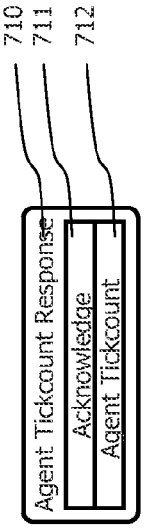
FIG 7B: Agent Tickcount Response
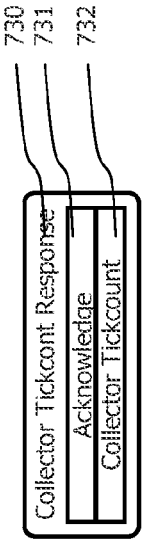
FIG 7C: Collector Tickcount Command
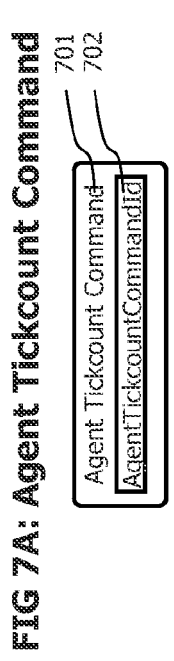
FIG 7D: Collector Tickcount Response
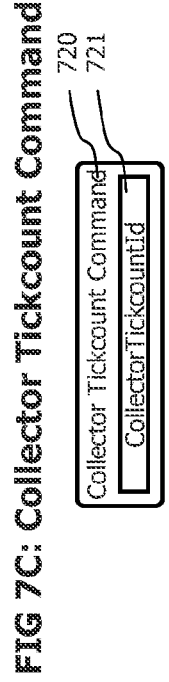
FIG 7E: Collector Agents Drift Update Command
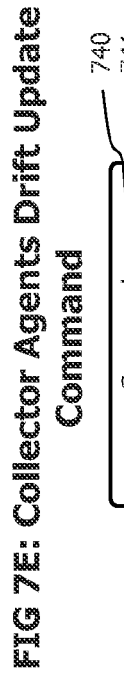
FIG 7F: Collector Agents Drift Update Response
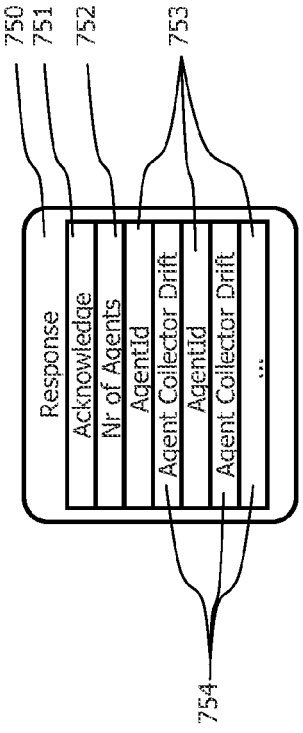

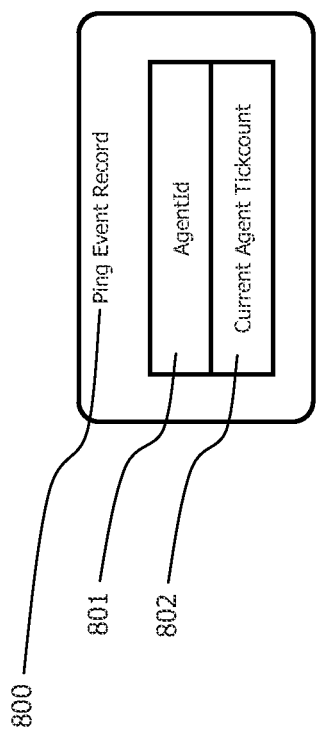
FIG 8: Ping Event Record

FIG 9: Handling Ping Event Record
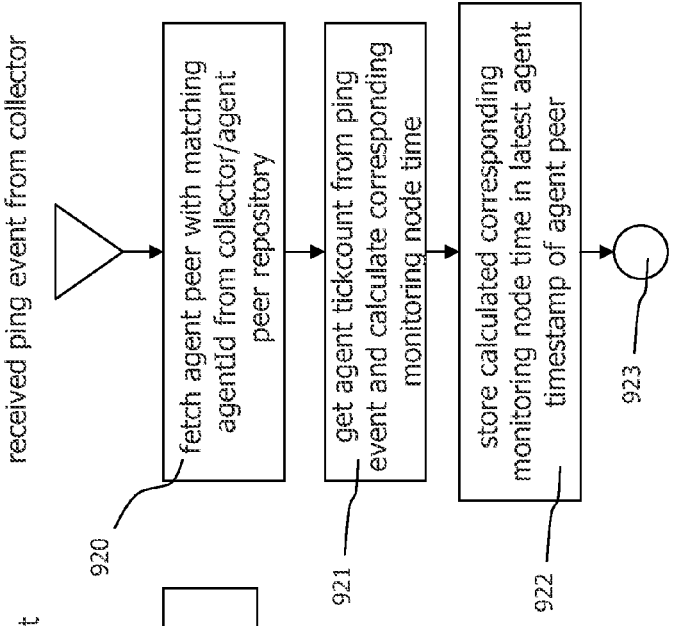
FIG 9C: Monitoring Node
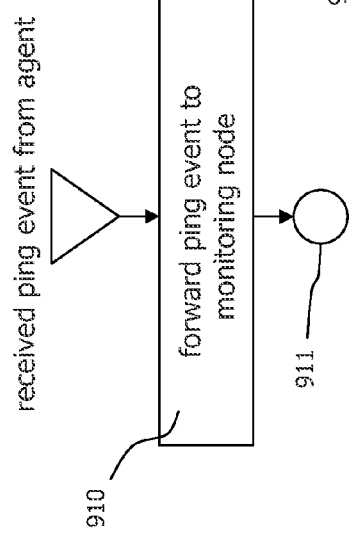
FIG 9B: Collector Node
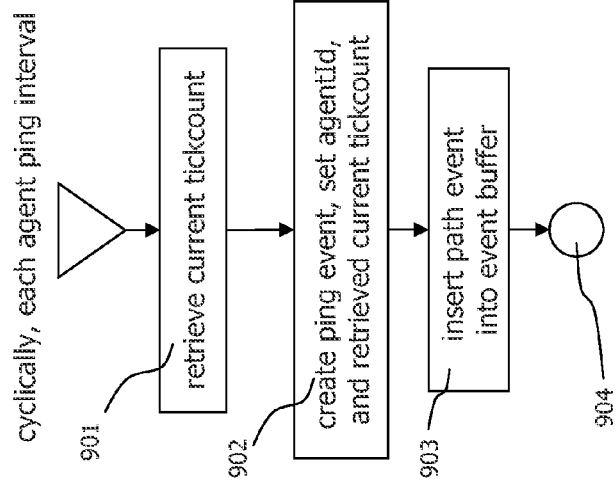
FIG 9A: Agent

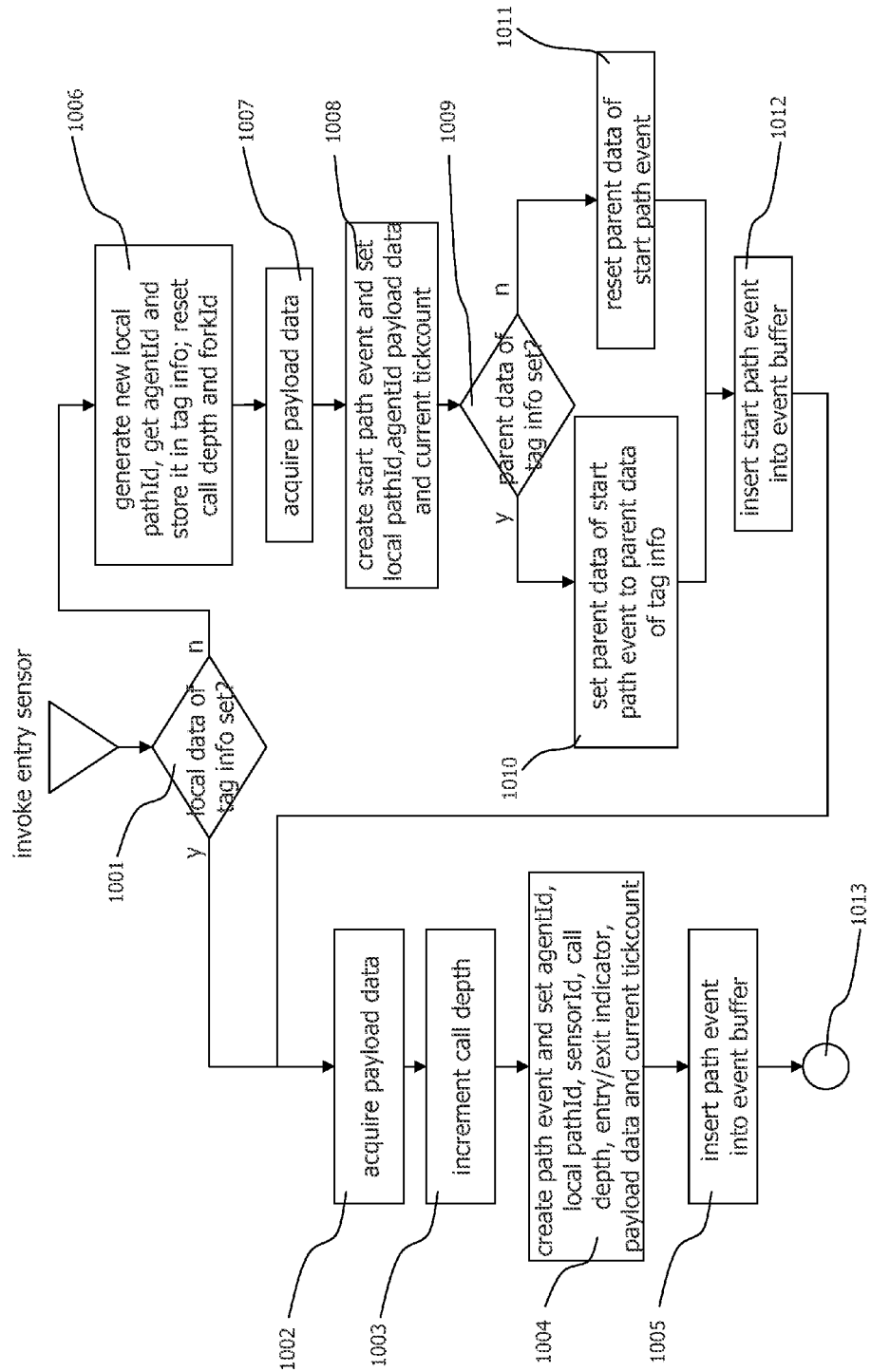

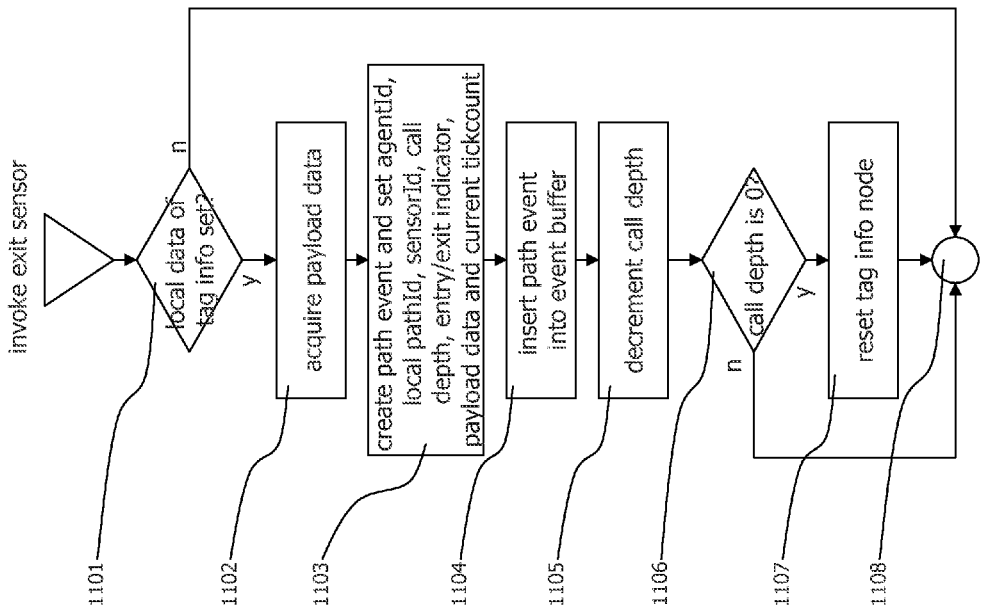

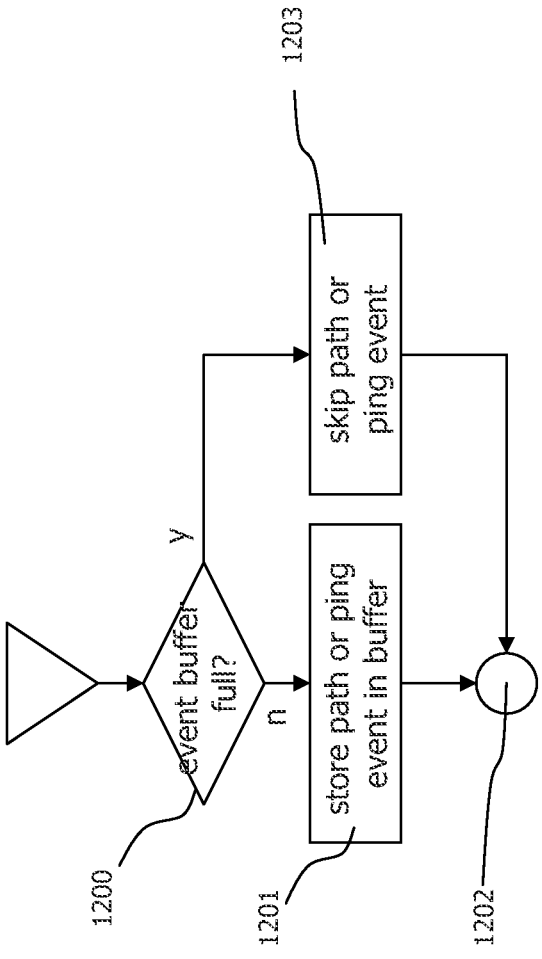
FIG 12: Insert Path and Ping Events into Agents Event Buffer

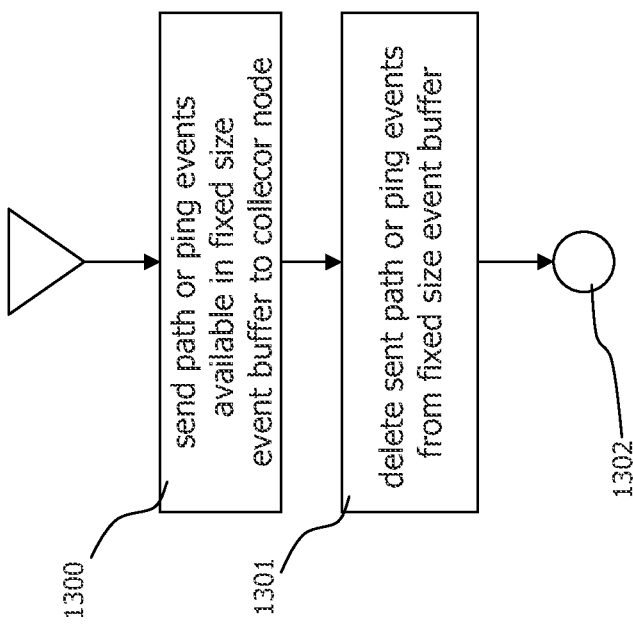

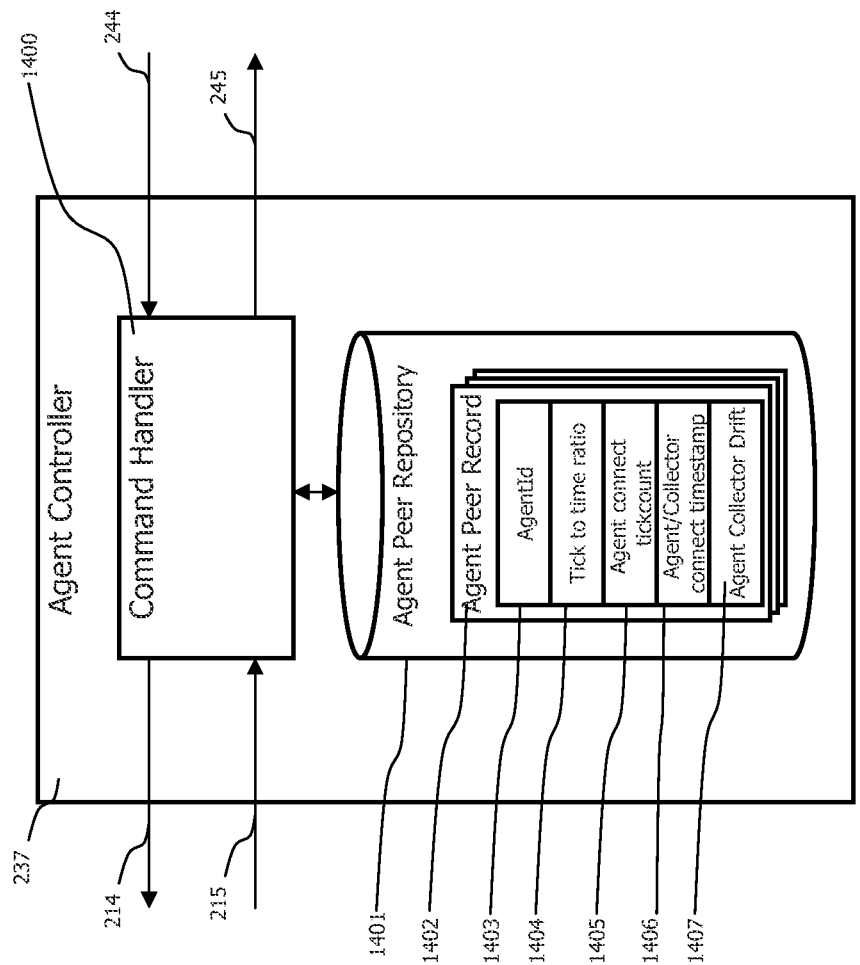

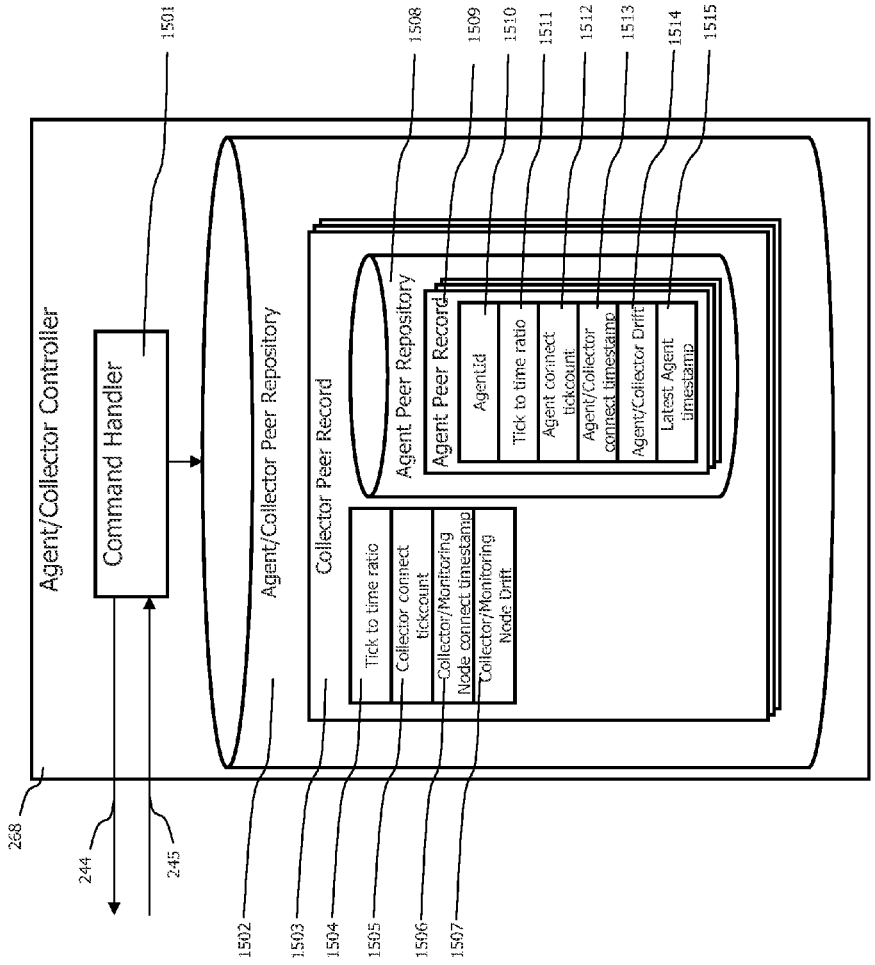
FIG 15: Agent/Collector Controller and Drift Manager

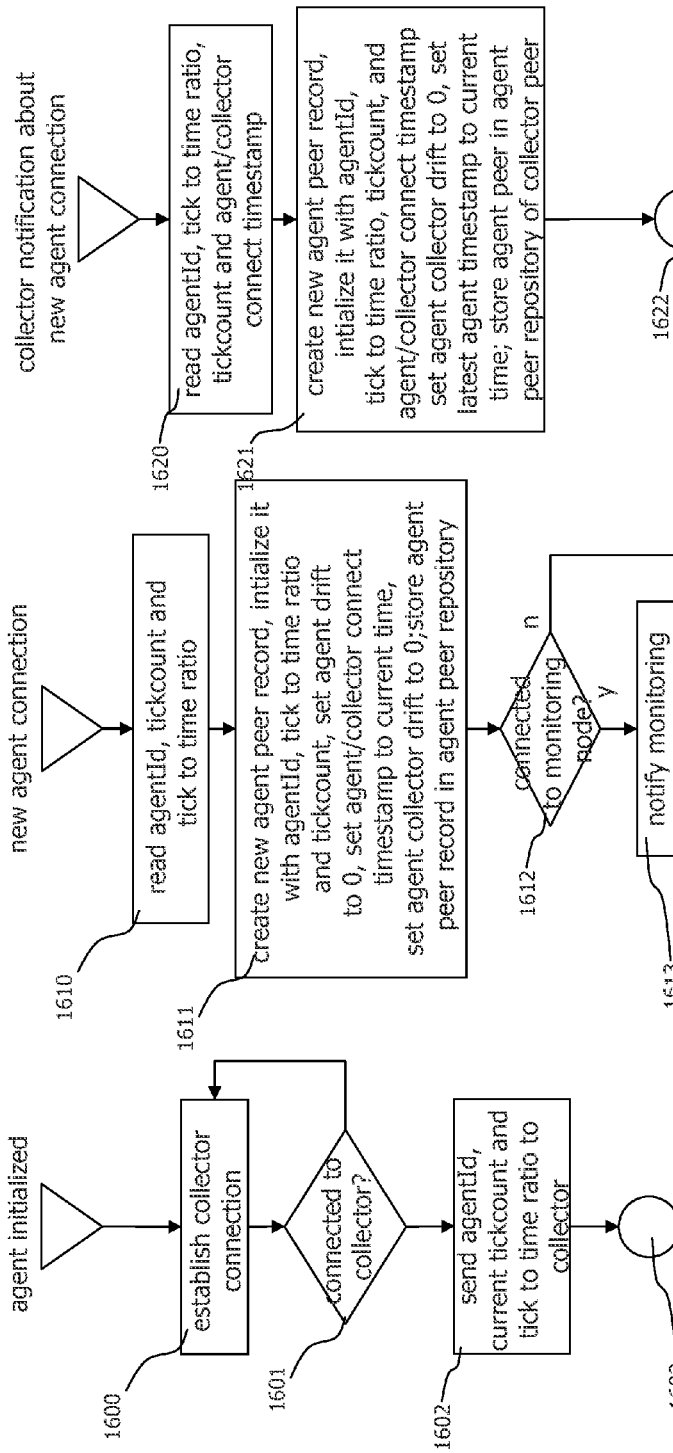

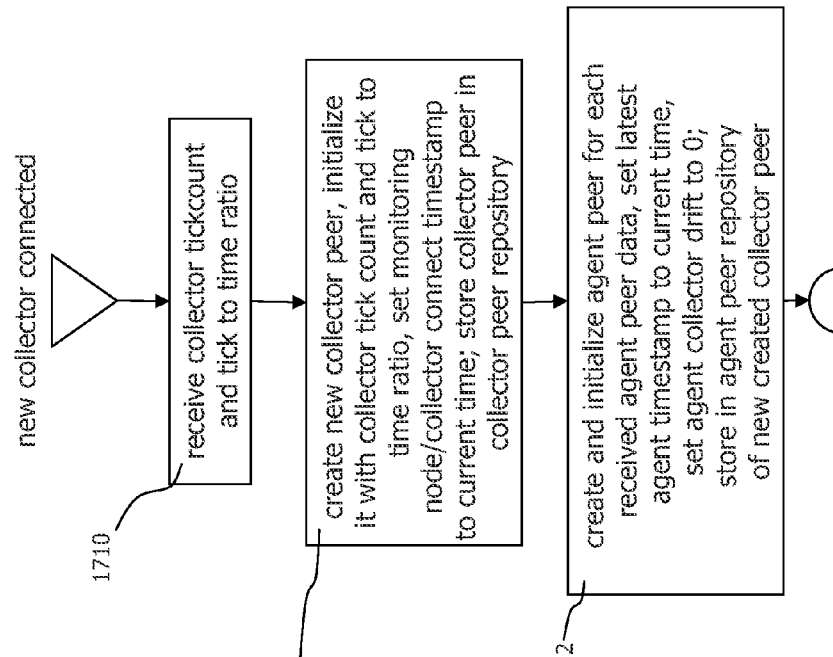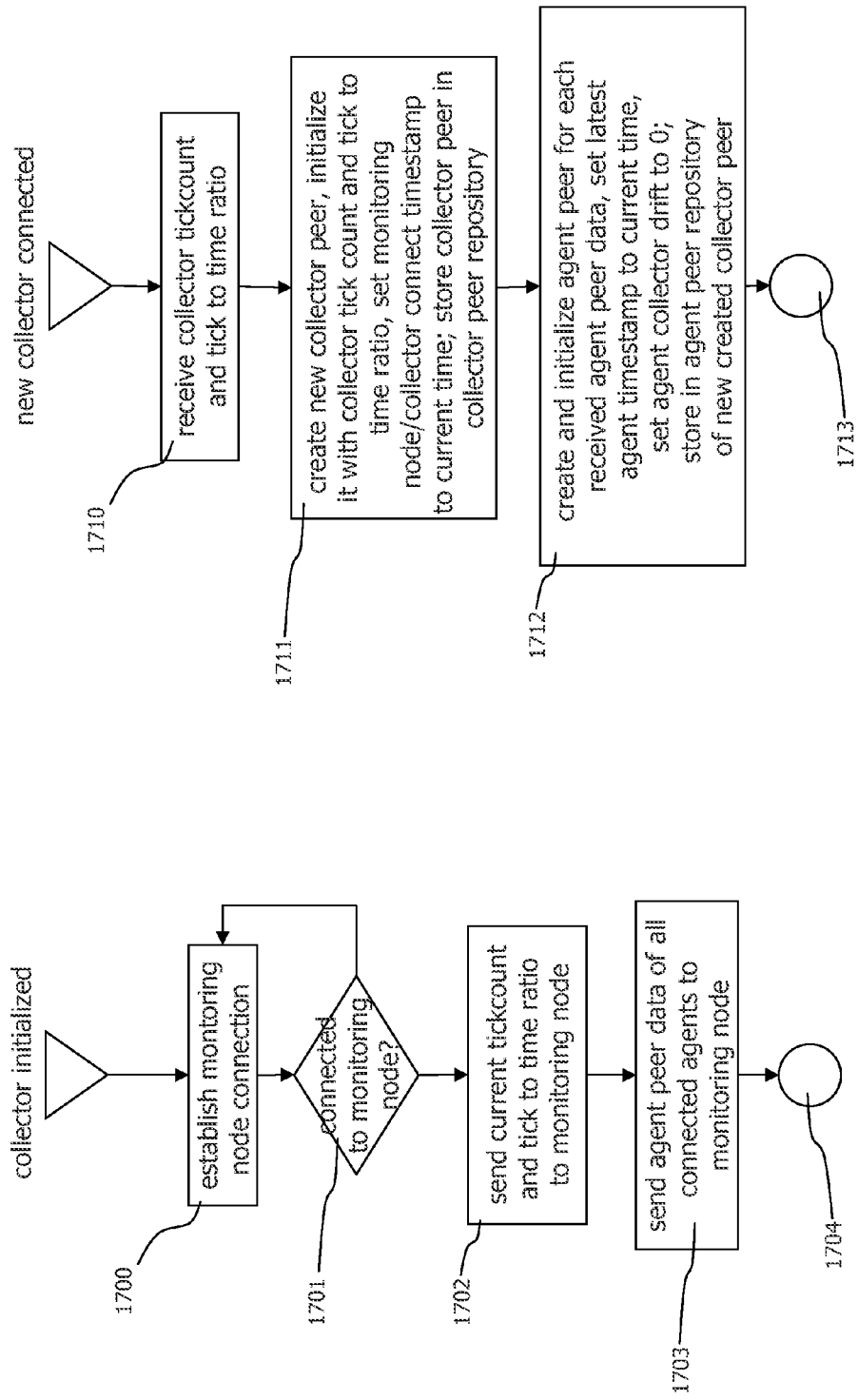

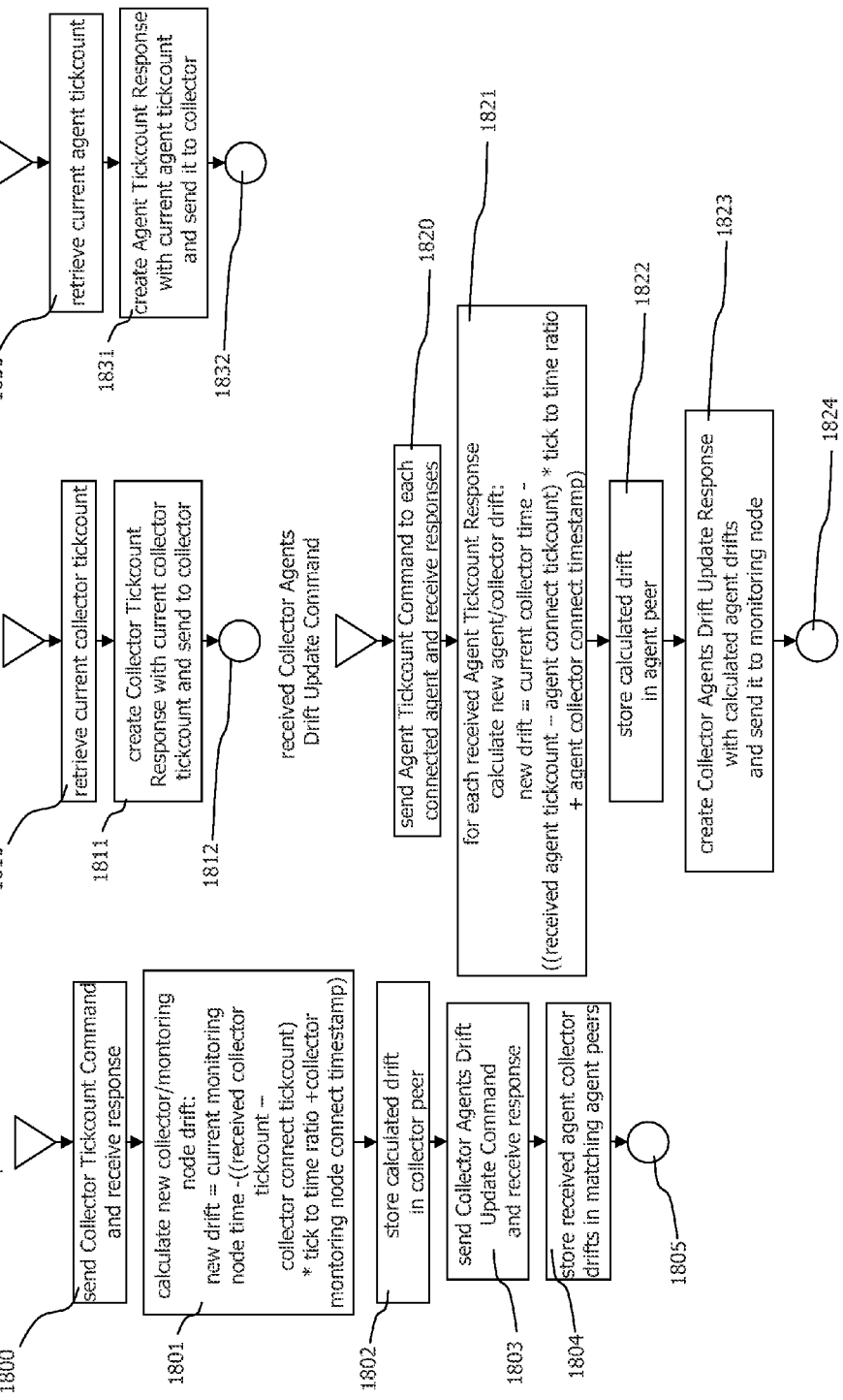

FIG 19: Path Records
FIG 19A: Start Path Record
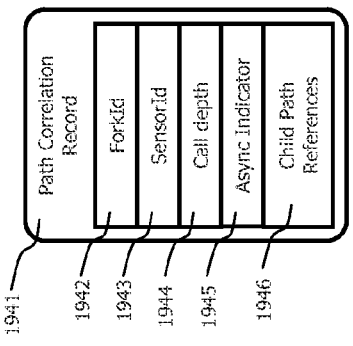
FIG 19B: Path Record
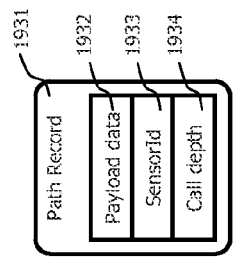
FIG 19C: Path Correlation Record
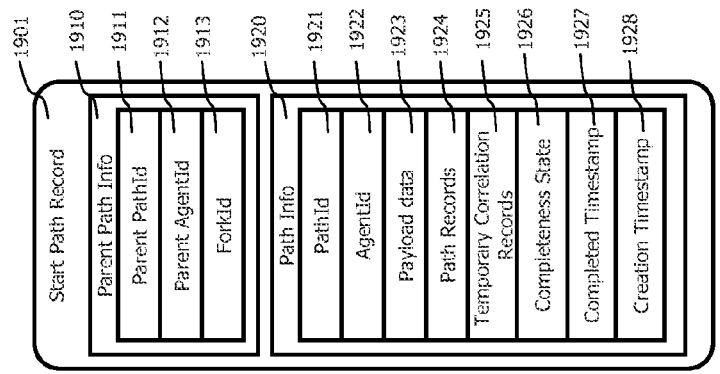

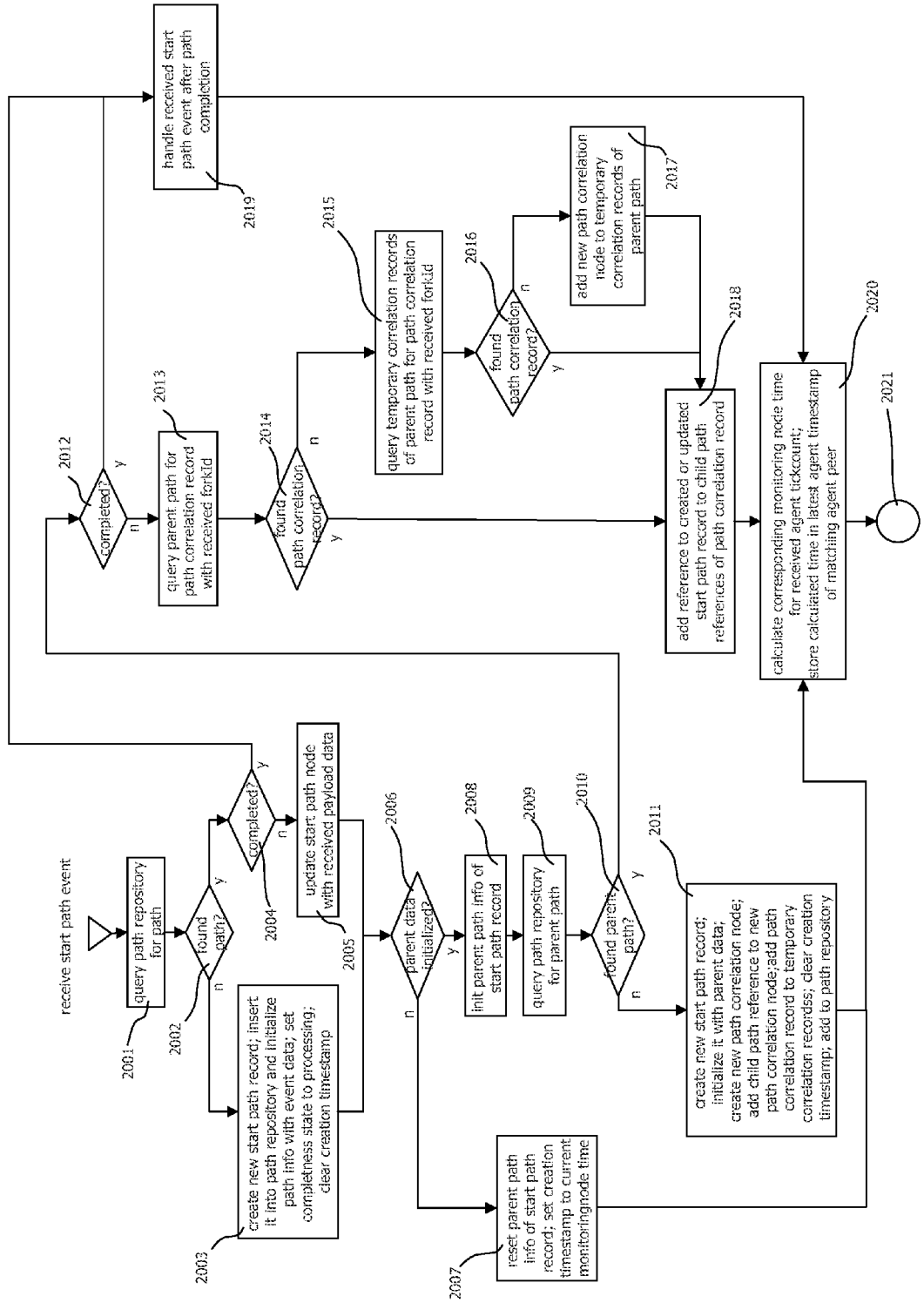
FIG 20: Correlation of Start Path Events

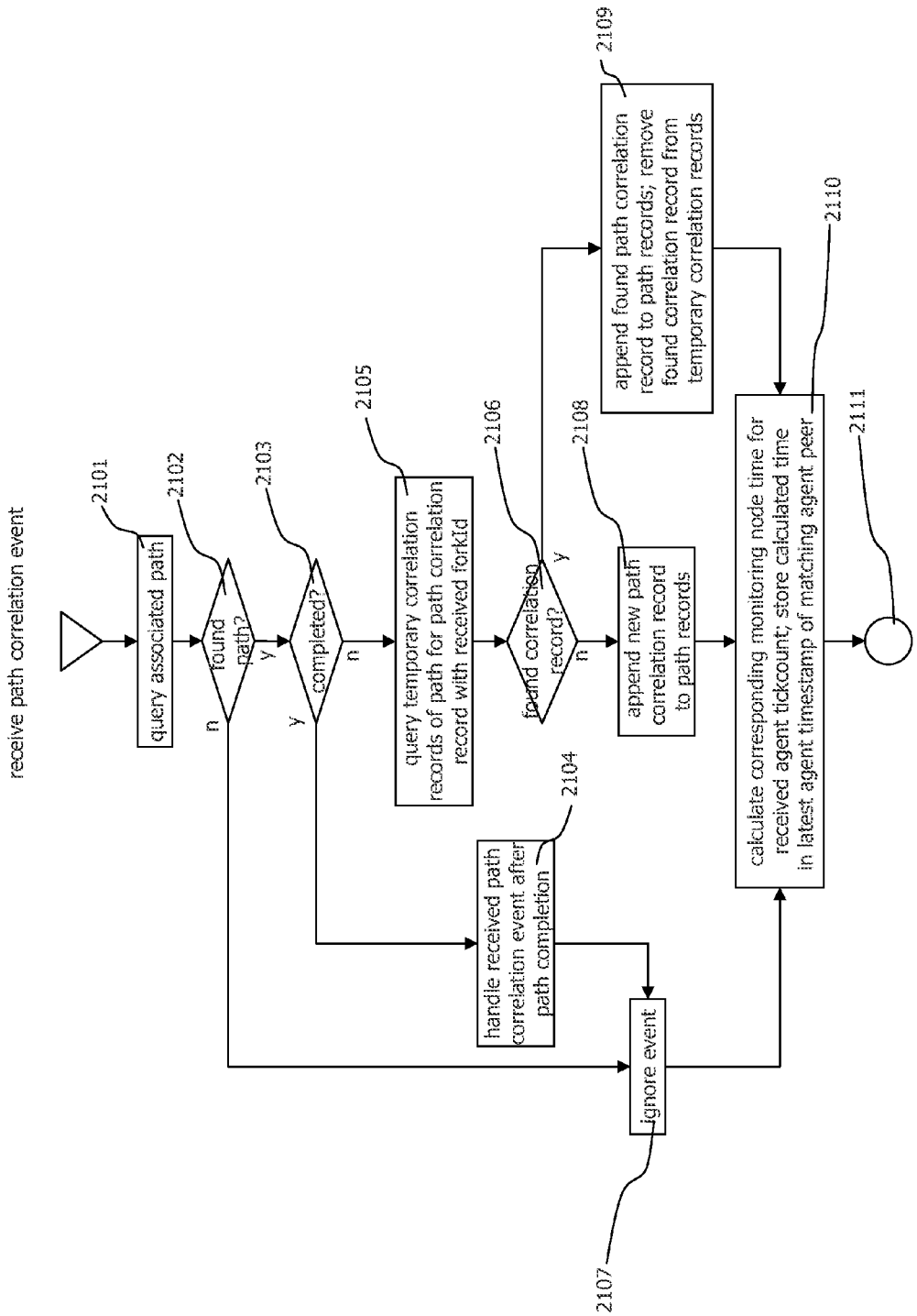

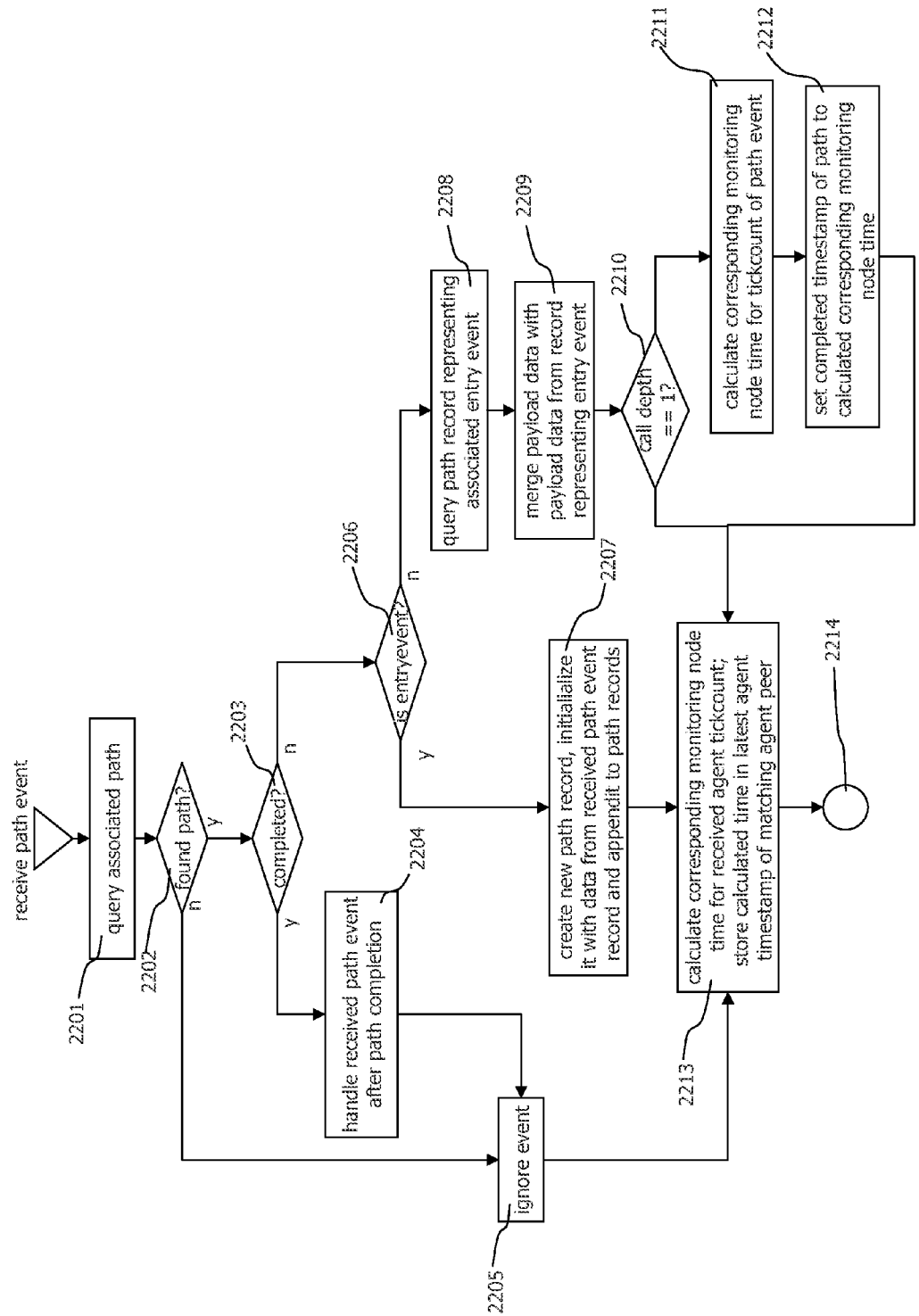

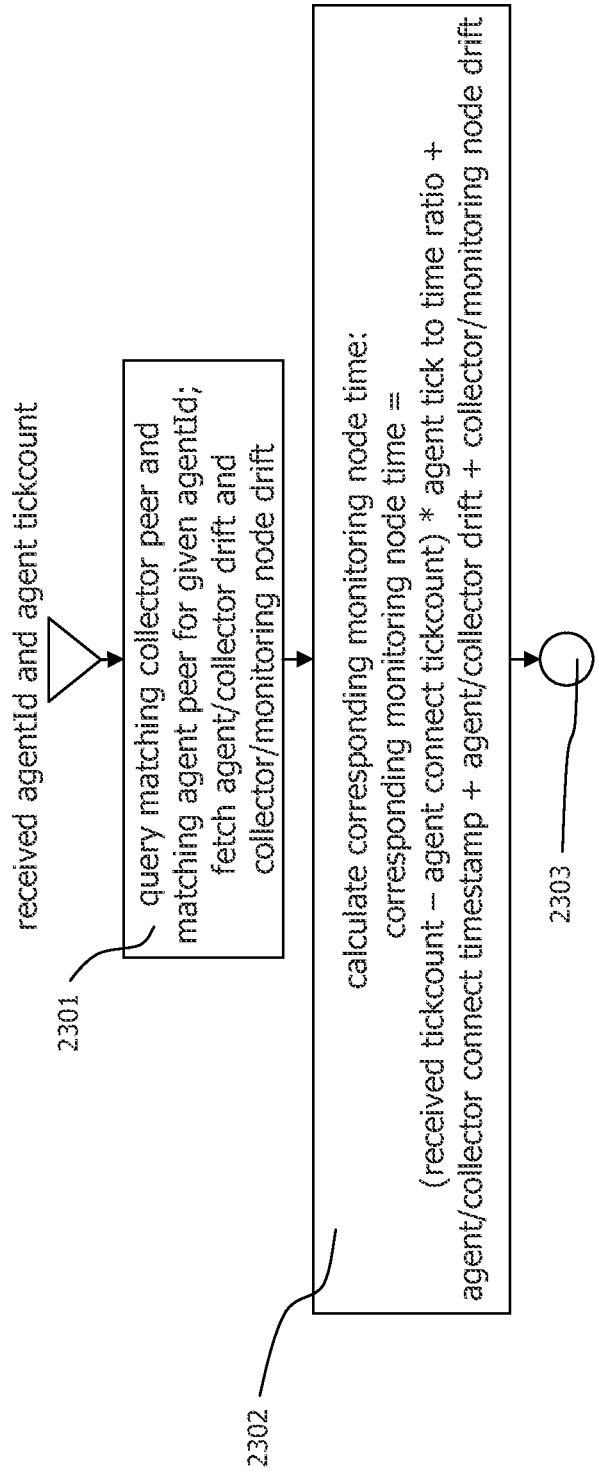
FIG 23: Calculate Corresponding Monitoring Node Time

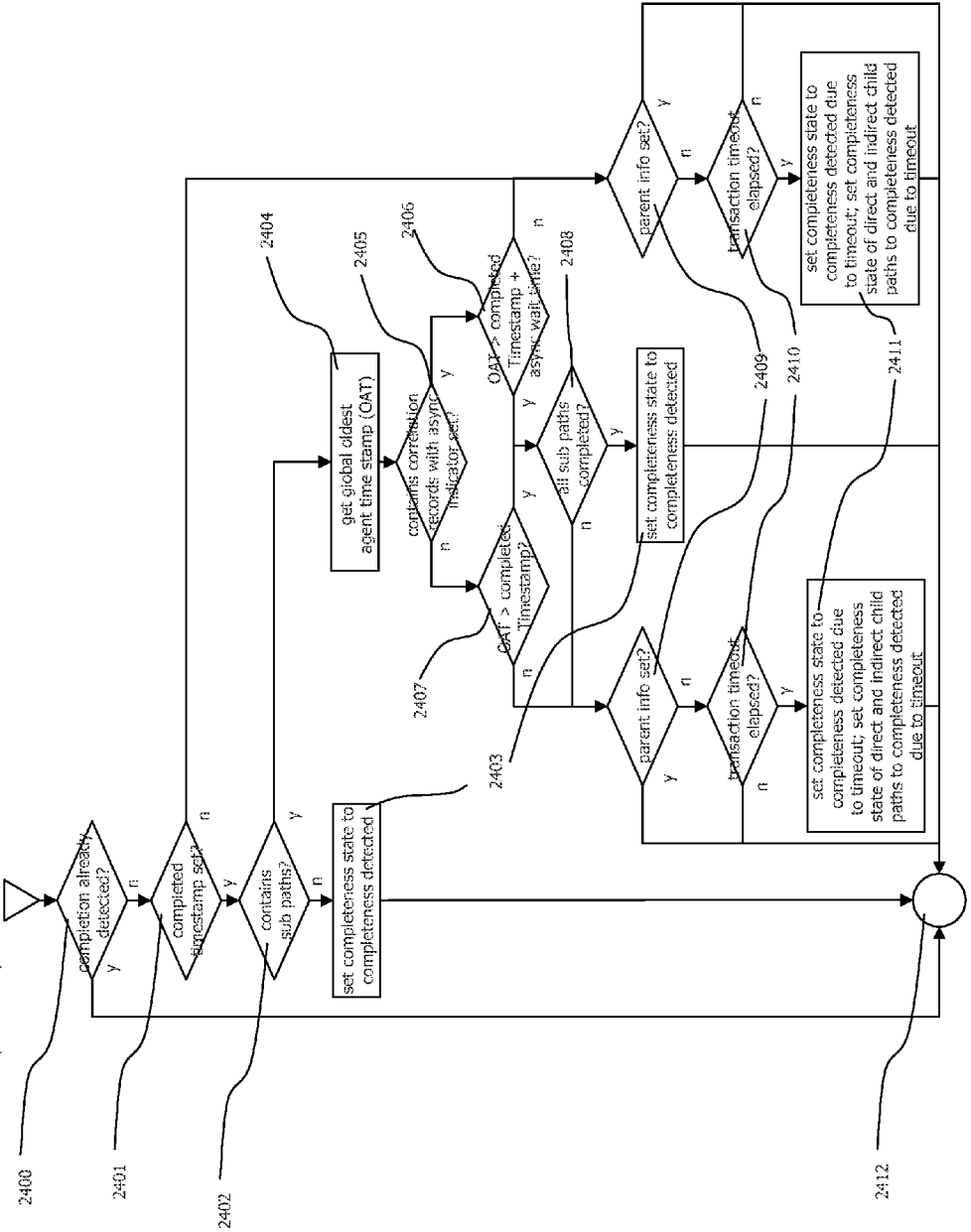
FIG 24: Cyclically Path Completeness Check

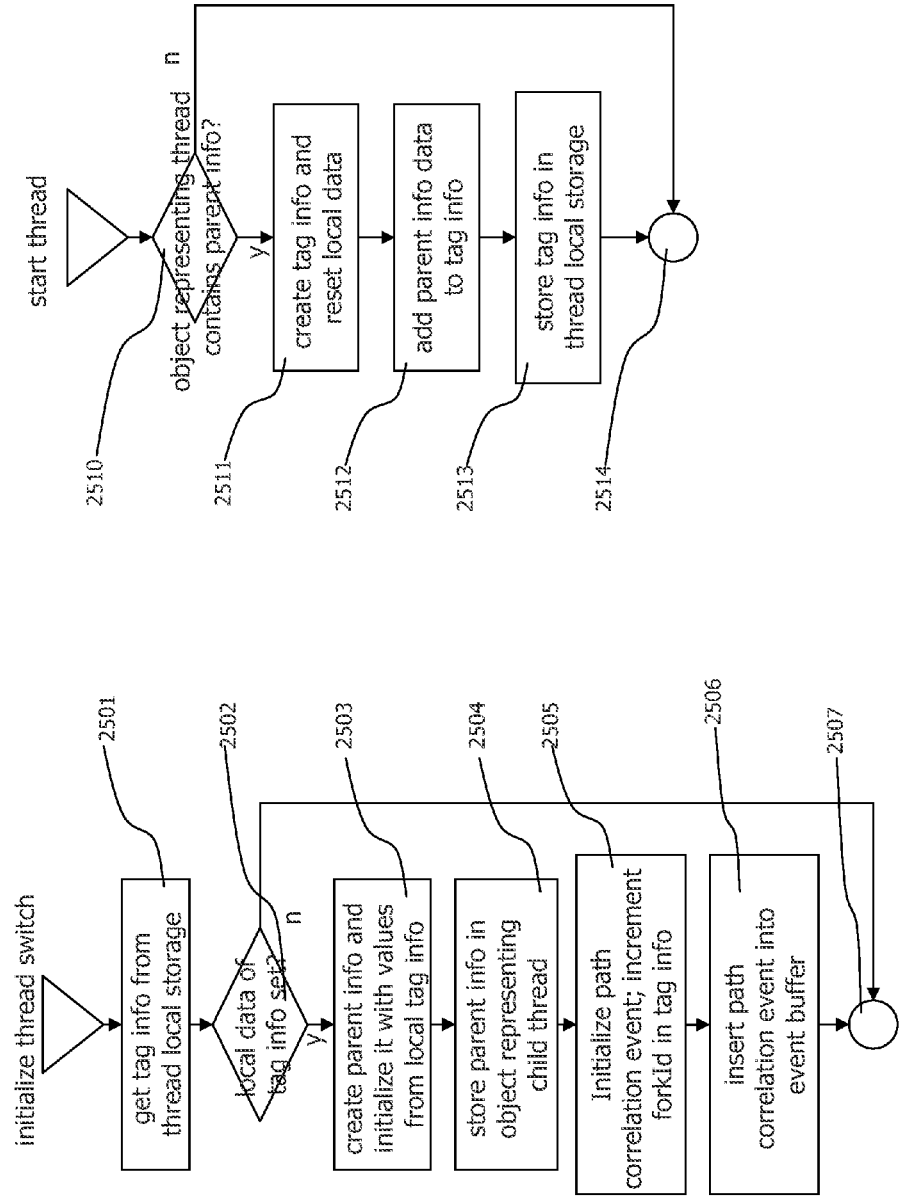

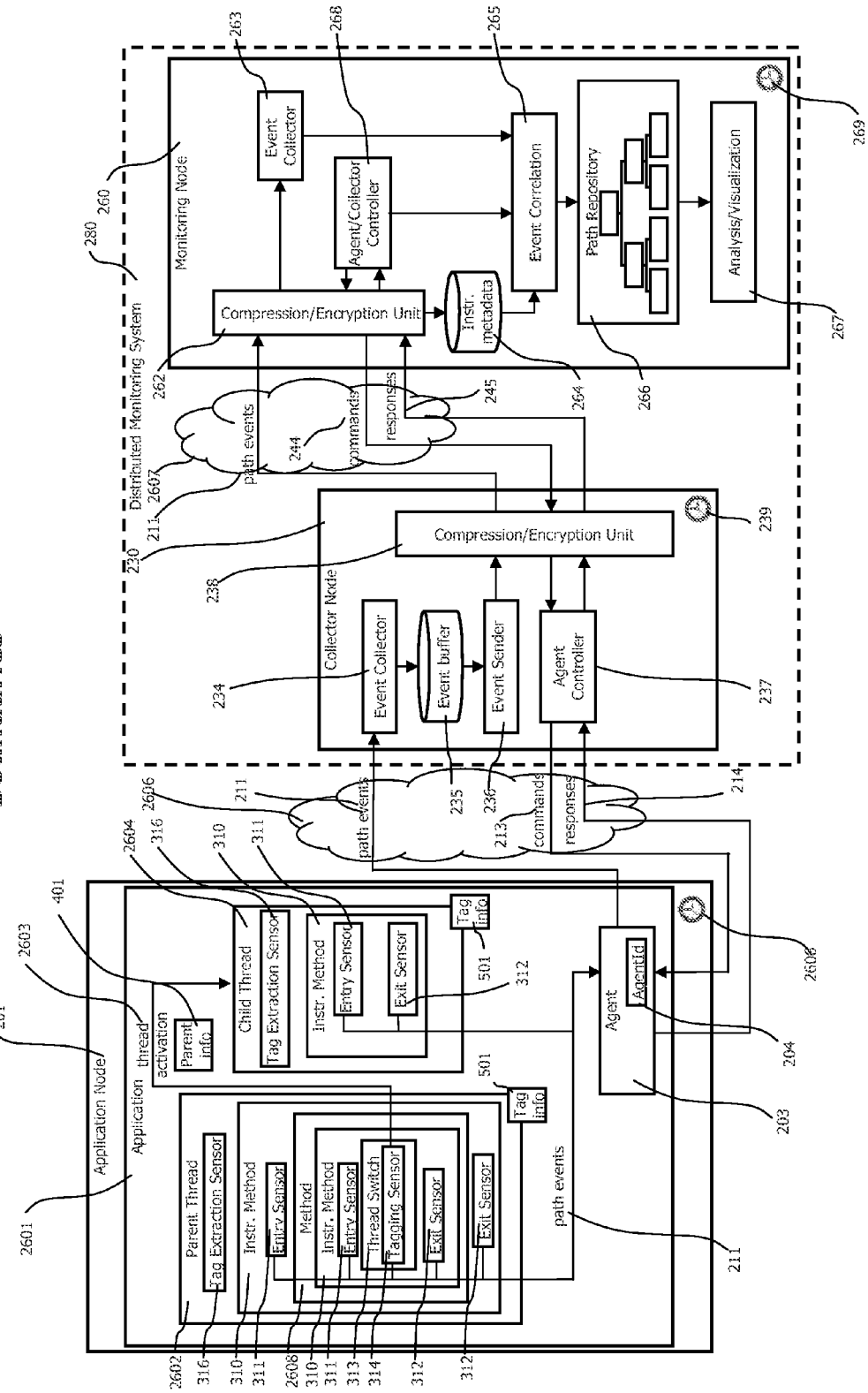
FIG 26: Tracing Transactions over Thread Boundaries

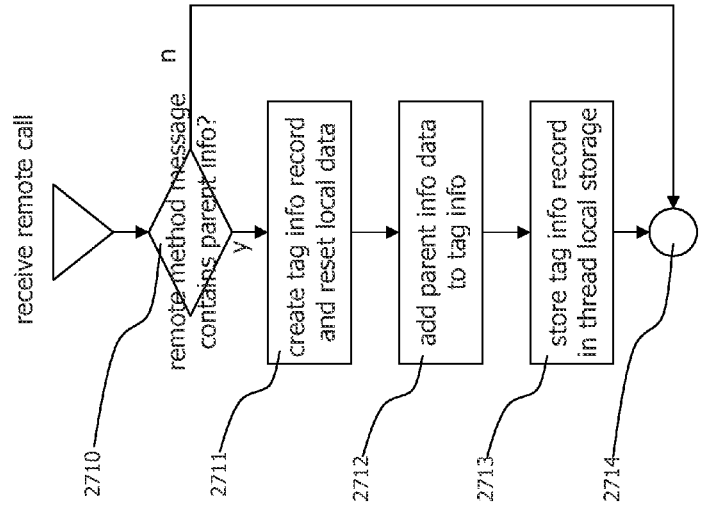
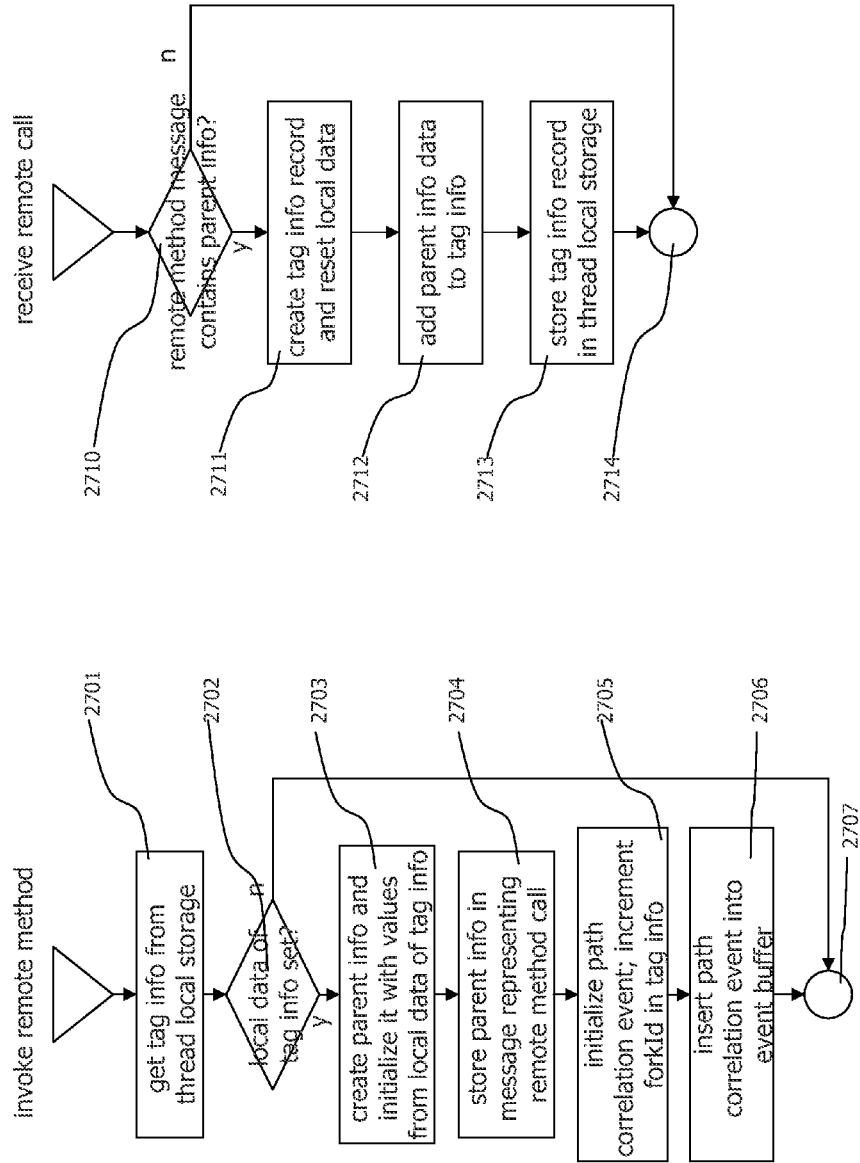
FIG 27: Transfer of Correlation Information within Remote Method Calls
FIG 27A: Remote Method Caller
FIG 27B: Remote Method Callee

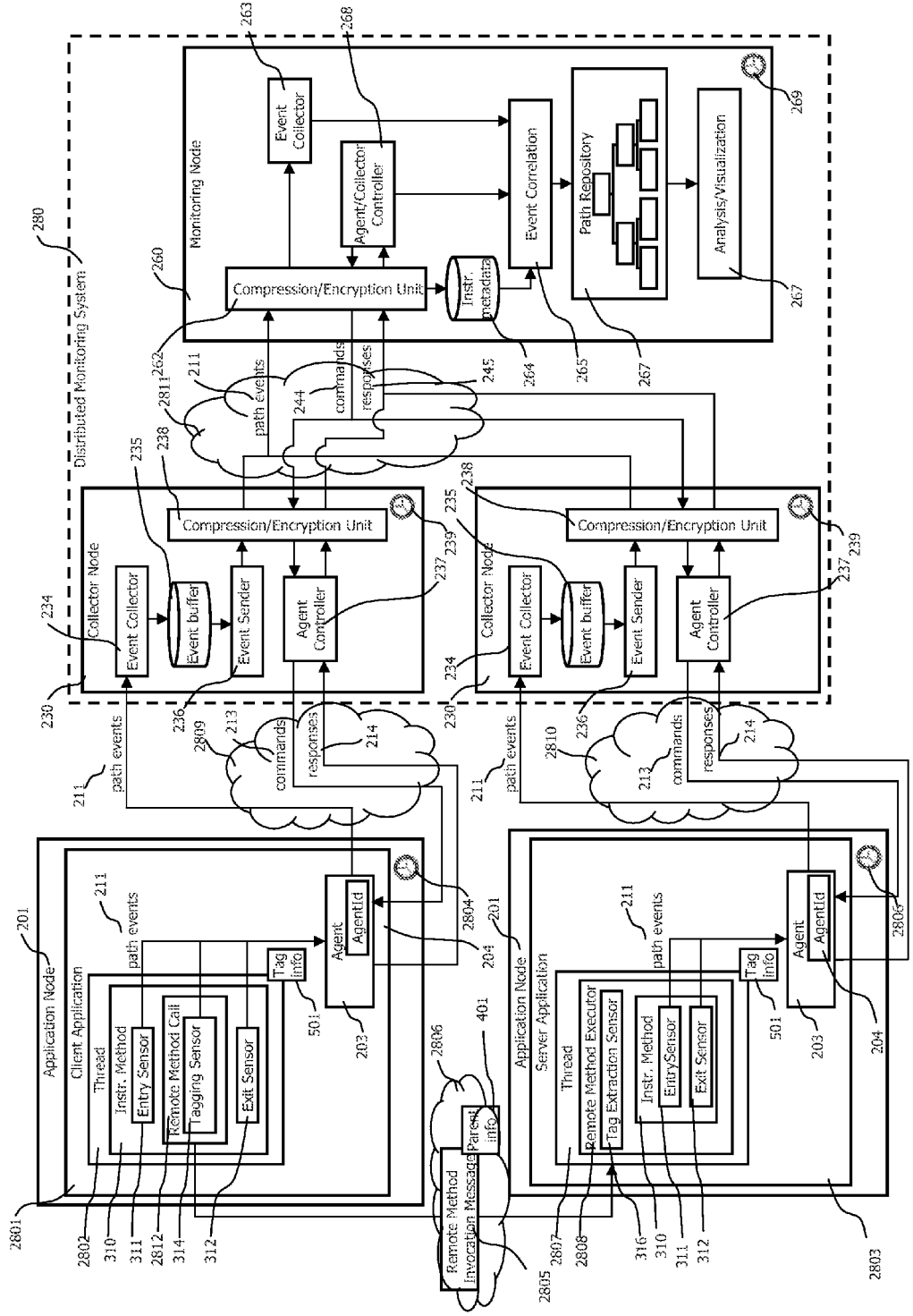
FIG 28: Tracing Transactions over Remote Method Invocations

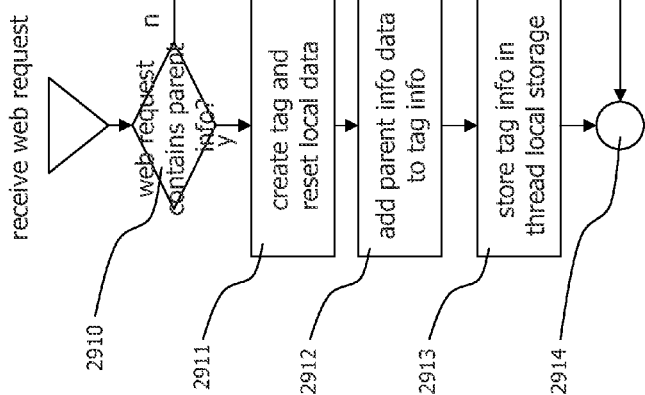
FIG. 29: Transfer of Correlation Information within Web Request
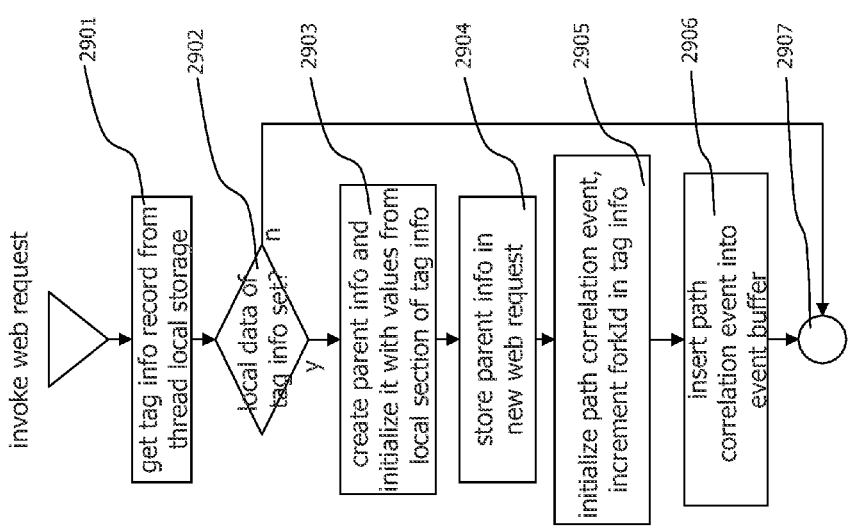

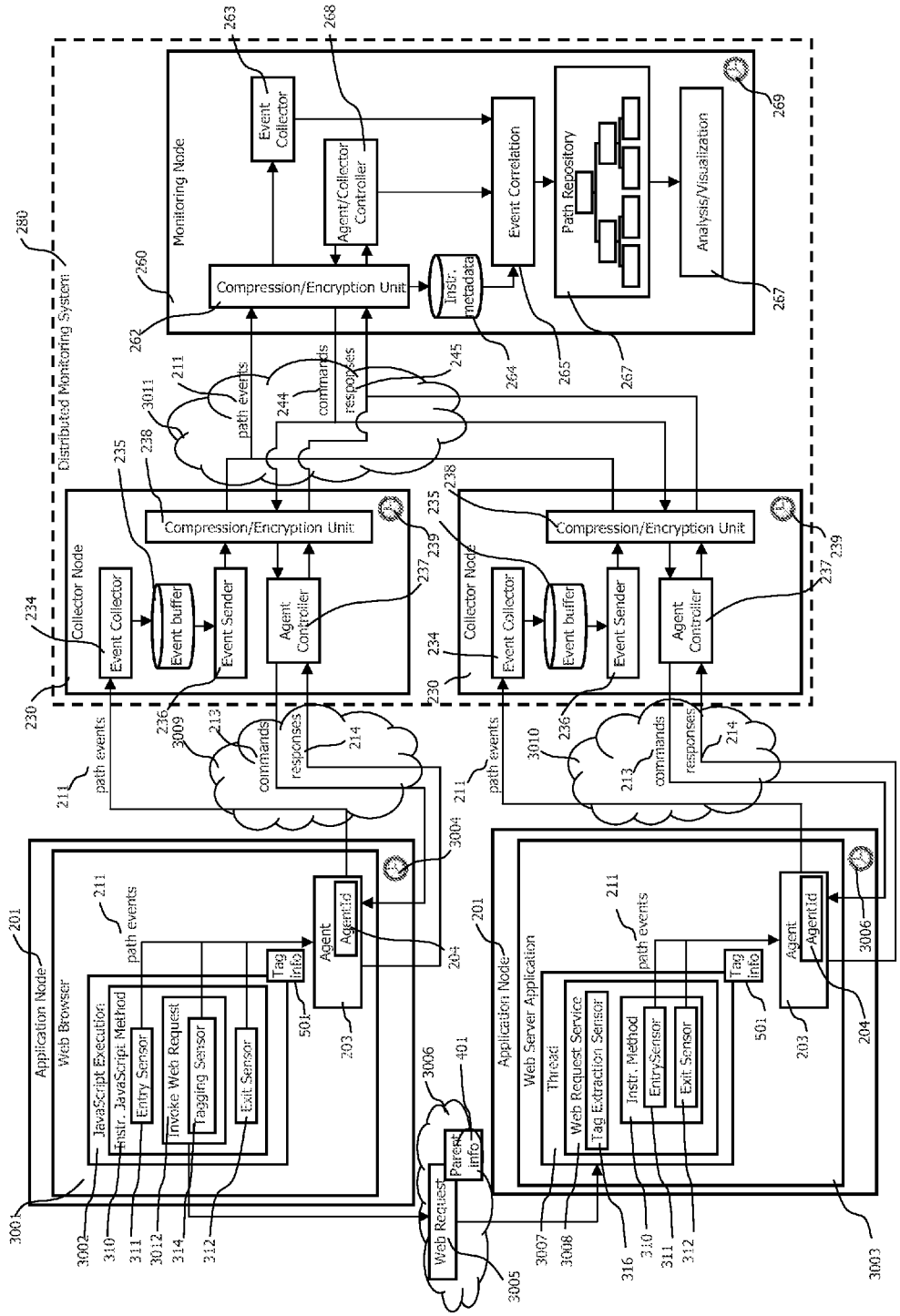
FIG 30: Tracing Transactions from Web Browser to Server

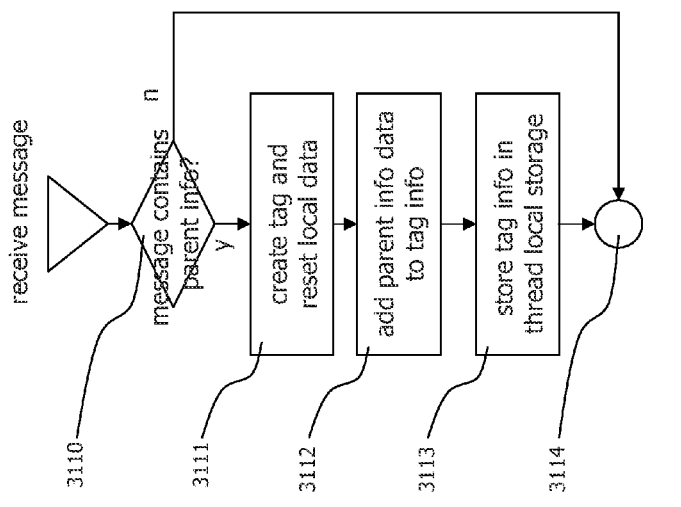
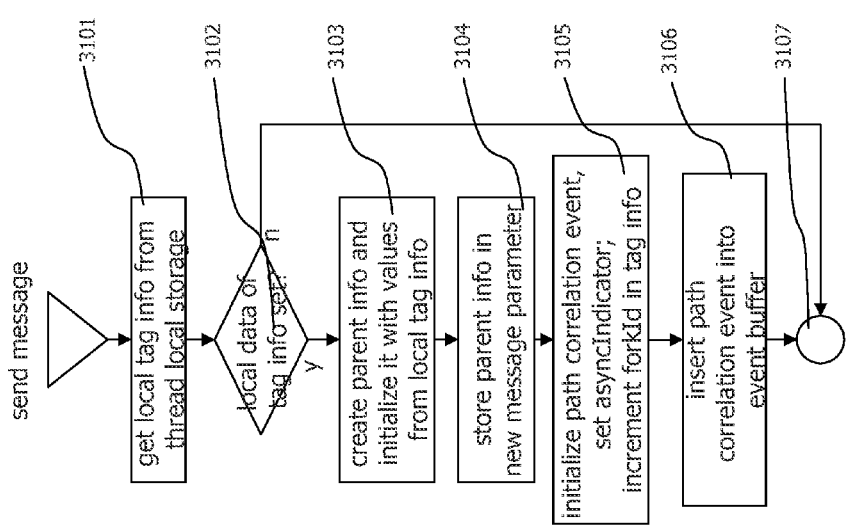
FIG 31: Transfer of Correlation Information within Messages

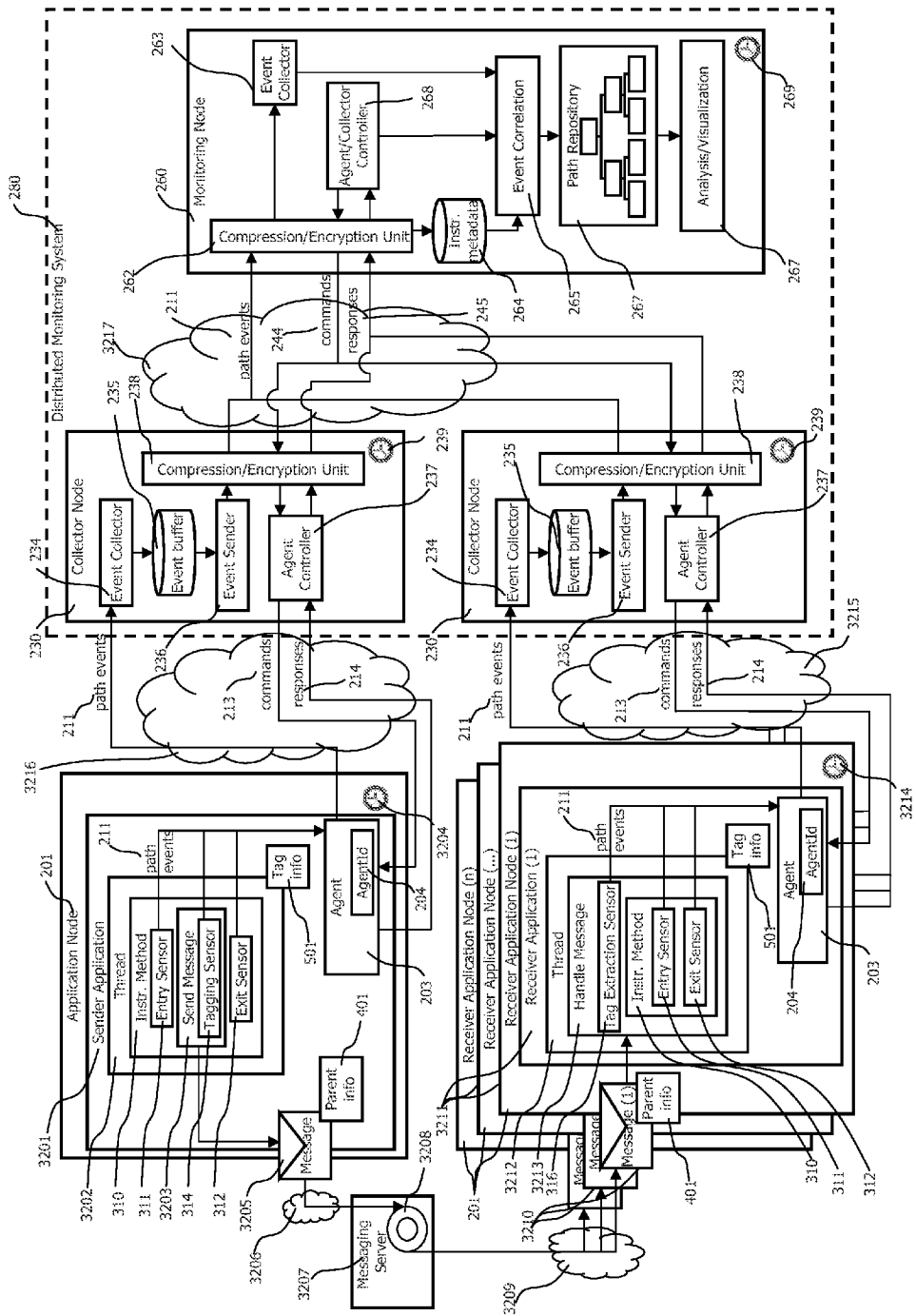

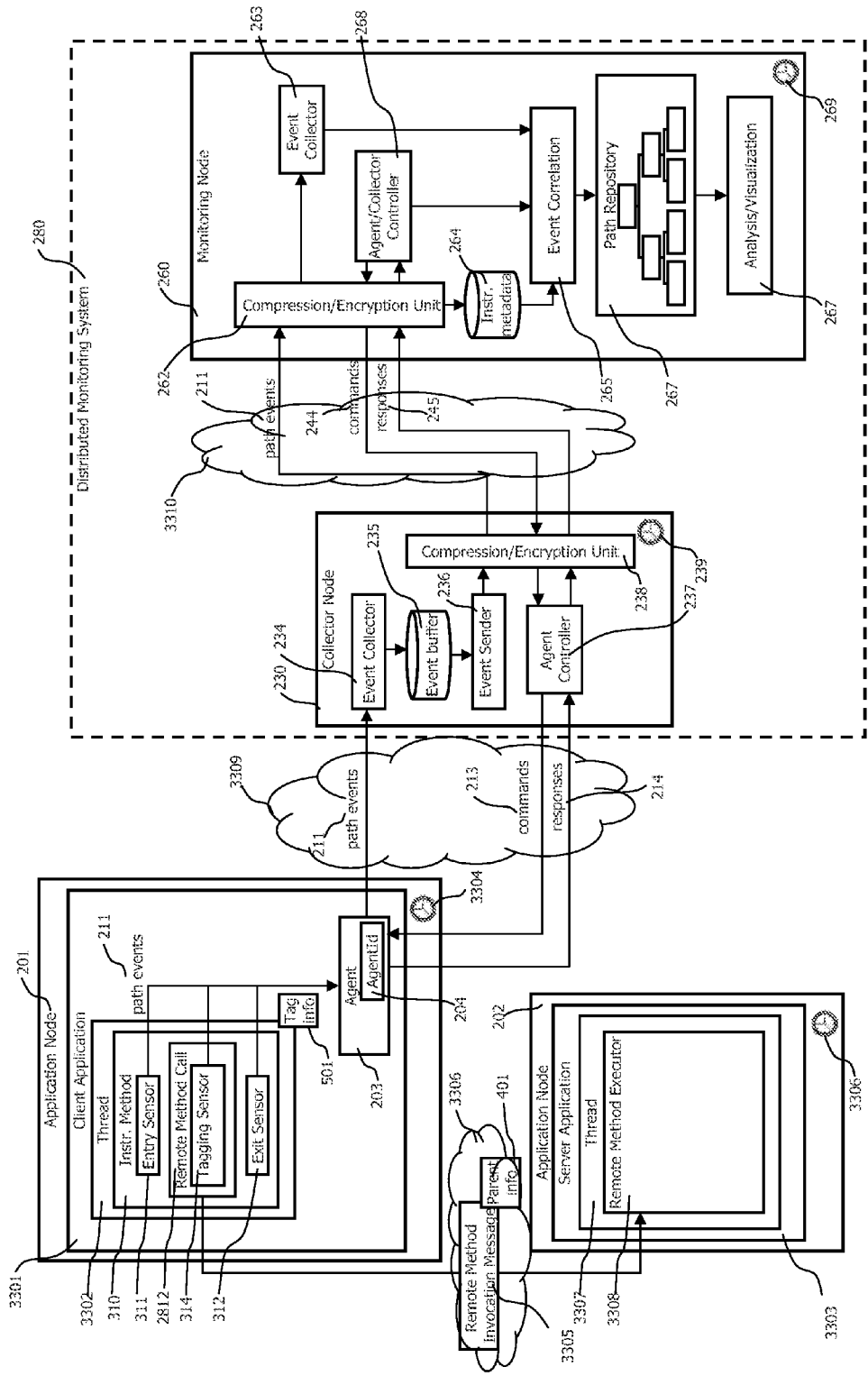
FIG 33: Transaction Involving Uninstrumented Remote Method Server

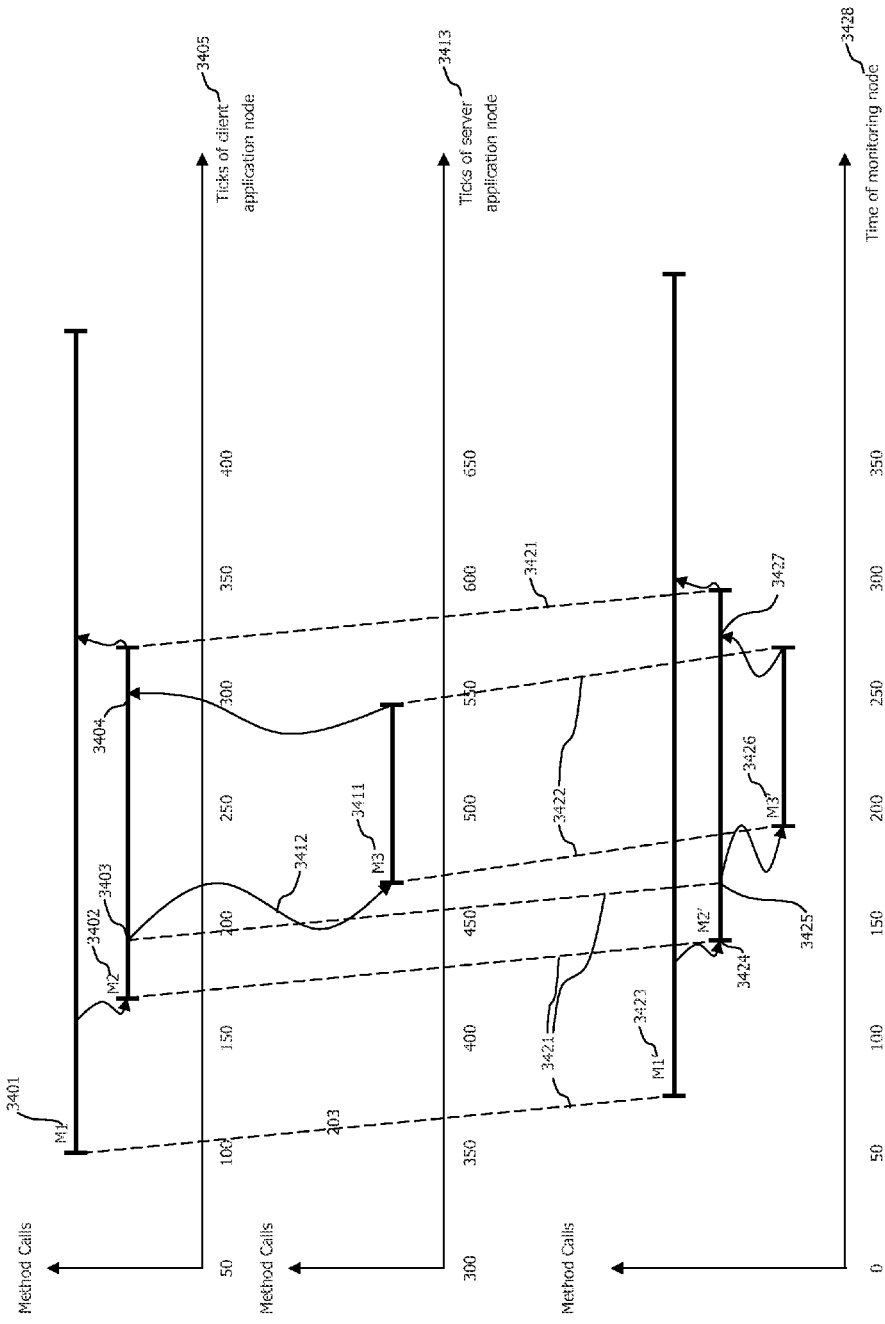
FIG 34: Translation of Distributed Transaction Timing Information into Monitoring Node Time

COMPLETENESS DETECTION OF MONITORED GLOBALLY DISTRIBUTED SYNCHRONOUS AND ASYNCHRONOUS TRANSACTIONS

CROSS-REFERENCE TO RELATED APPLICATIONS

This application claims priority from U.S. Provisional Patent Application Ser. No. 61/287,610, filed on Dec. 17, 2009, entitled, "Completeness Detection of Monitored Globally Distributed Synchronous and Asynchronous Transactions," which is hereby incorporated by reference herein.

This application is related to the following commonly-owned and co-pending patent applications, all of which are incorporated by reference herein:

U.S. patent application Ser. No. 11/502,660, filed on Aug. 11, 2006, entitled "Method and System for Automated Analysis of the Performance of Remote Method Invocations in Multi-Tier Applications Using Bytecode Instrumentation";
  U.S. patent application Ser. No. 11/744,876, filed on May 6, 2007, entitled "Method and System for Adaptive, Generic Code Instrumentation Using Run-Time or Load-Time Generated Inheritance Information for Diagnosis and Monitoring Application Performance and Failure";
  U.S. patent application Ser. No. 12/120,645, filed on May 15, 2008, entitled "Method and System for Processing Application Performance Data Outside of Monitored Applications to Limit Overhead Caused by Monitoring";
  U.S. patent application Ser. No. 12/191,409, filed on Aug. 14, 2008, entitled "Method and System for Tracing Individual Transactions at the Granularity Level of Method Calls Throughout Distributed Heterogeneous Applications Without Source Code Modifications";
  U.S. patent application Ser. No. 12/120,495, filed on May 14, 2008, entitled "Method and System for Dynamic Remote Injection of In-Process Agents Into Virtual Machine Based Applications"; and
  U.S. patent application Ser. No. 12/627,183, filed on Nov. 30, 2009, entitled "Methods and System for Global Real-Time Transaction Tracing."

BACKGROUND

Acquisition of software application performance data is an important but difficult task because efforts to gather the performance data may change the behavior of the monitored application, which, in turn, also affects the acquired performance data. In a possible worst case, performance monitoring may cause a malfunction or even a crash of the application.

A variety of tools exist for monitoring performance by instrumenting the bytecode of the monitored application. Such tools can provide performance data at a fine-grained level (e.g., down to data describing single method calls). Information at this detailed level is powerful for quickly and efficiently finding and eliminating performance problems. Acquisition of such high-quality information may require the placement of a large quantity of bytecode for performance monitoring into the bytecode of the monitored application. Such bytecode which is inserted into the monitored application is referred to herein as "sensor bytecode" or simply as "sensors." Sensors can create a large amount of measurement data that has to be aggregated and analyzed.

Further, monitoring of distributed applications can require the transfer of both original bytecode and instrumented bytecode over network connections. Although this process may be aided and enhanced by compression and/or encryption of the bytecode to make more efficient use of network bandwidth, network transmission of bytecode is subject to bottlenecks, both caused by network connections and the instrumentation process. For example, an unreliable or failed network connection can stall the instrumentation process. Further, in the case of distributed applications, the instrumentation process itself is subject to bottlenecks at the multiple, parallel instrumentation engines which are used in different processes on different computers.

Information about application performance data is often created by the applications that are monitored and then transferred to remote monitoring systems which may correlate performance data received from multiple applications. Propagation of application performance data from creating applications to a monitoring system is subject to different fluctuating latencies introduced by the behavior of the computer networks interconnecting monitored applications with monitoring systems. Additionally, the timing systems maintained by the computer systems running the monitored applications and the timing systems of the compute systems running the monitoring system may be subject to different time drifts.

SUMMARY

Before summarizing certain embodiments of the present invention, explanations of certain terms used herein shall be provided. Such explanations should not be understood as limiting definitions, but instead as instructive explanations of how certain terms may be used herein. In the list that followings, each term is followed by its definition:

agent controller a component of a collector node, whose purposes are to: (1) receive commands from a monitoring node; (2) send commands to agents executing on application nodes connected to the collector node, such as commands to request timing data from the agents; and (3) receive responses, which may contain timing data and/or performance data, from the agents; and (4) forward the responses to the monitoring node
  agent peer data data, stored at a monitoring node, which describes the application nodes that are connected (directly, or indirectly through collector nodes) to the monitoring node, such as the time drift between each such application node and the monitoring node
  agent software installed on, or otherwise available to, an application node and associated with a particular application executing on that application node; the purpose of the agent is to instrument the application, to extract tracing data from the application, to transmit the tracing data to collector nodes and/or monitoring nodes, and to receive and execute commands received from the collector nodes and monitoring nodes, and to send back command responses
  agent-collector connection time the time at which a particular application node first connects to a corresponding collector node, measured in the timing system of the collector node; the agent-collector connection time is used to calculate the time drift between the application node and the monitoring node connected to the collector node
  agent-collector controller a component of a monitoring node, whose purposes are to: (1) send commands to collector nodes connected to the monitoring node, such as commands to request timing data from application nodes connected to the collector nodes; and (2) maintain a repository of collector peer data representing time drifts for the collector nodes connected to the monitoring node; and (3) maintain a repository of agent peer data representing time drifts for the application nodes connected to the collector nodes connected to the monitoring node application node a computer (whether a physical computer or a virtual computer), connected to a network, which executes an application that participates in a distributed transaction; multiple application nodes may participate in a single distributed transaction over the network application part a part of an application, executing on a particular application node, which takes part in execution of a distributed transaction by the application; examples of application parts are classes and methods async wait time an additional delay, measured in the timing system of a monitoring node, which is allocated to asynchronous parts of a transaction before determining that no additional performance data is to be expected from the transaction part collector node a computer connected to a network, whose function is to receive tracing data from one or more agents executing on one or more application nodes and to transmit such tracing data to a monitoring node; multiple collector nodes may be associated with a single monitoring node; multiple application nodes may be associated with a single collector node collector peer data data, stored at a monitoring node, which describes the collector nodes that are connected to the monitoring node, such as the time drift between each such collector node and the monitoring node collector-monitor connection time the time at which a particular collector node first connects to a corresponding monitoring node, measured in the timing system of the monitoring node; the collector-monitor connection time is used to calculate the time drift between the collector node and the monitoring node connected to the collector node distributed application either (1) one application, such as a monitored application, which executes over two or more application nodes; or (2) two applications which execute a distributed transaction on a single application node distributed transaction a transaction executed by one or more applications over multiple application nodes distributed transaction part a part of a distributed transaction, which uses an application to execute; a thread execution is an example of a distributed transaction part instrumented bytecode bytecode into which a sensor has been inserted latest event timestamp a timestamp, associated with a particular agent executing on a particular application node, and measured in the timing system of a monitoring node connected to the application node, representing the latest (most recent) time at which the agent transmitted timing data to the monitoring node, such as by transmitting such timing data as part of a ping event or as part of tracing data measurement data data generated by a sensor which describes performance characteristics of a monitored application monitored application an application whose performance is being monitored by at least one sensor monitoring node a computer connected to a network, whose function is to receive tracing data from one or more collector nodes (or directly from one or more agents executing on one or more application nodes), to convert the timing data from such tracing data into the timing system of the monitoring node; to determine the time drift between each application node and the monitoring node; and to determine whether execution of distributed transactions has completed by taking into account the time drifts; additionally, the monitoring node correlates events received from different agents containing measurement data and method invocation information being part of a distributed transaction into tracing data describing the complete distributed transaction oldest agent timestamp the oldest of all latest event timestamps available at a particular monitoring node; the oldest agent timestamp may be used to determine whether any additional tracing data is expected to be received by the monitoring node in relation to the execution of a particular distributed transaction performance data correlation the process of determining that multiple sets of performance data are all associated with the same distributed transaction performance data see measurement data ping event a periodic transmission of timing data from an agent executing on an application node to a collector node or a monitoring node, whether or not the application node is currently participating in a distributed transaction; the timing data is represented in the timing system of the application node sensor bytecode that has been inserted into a monitored application to monitor performance of the application and to generate performance data sensor bytecode see sensor tickcount the smallest unit of time used by a particular application node; typically generated starting from zero by the application node's CPU starting when the application node is booted up; the tickcount often is measured in the number of CPU clock cycles performed since bootup, and therefore is a measurement of time which is not affected by user manipulations and which has no units of measurement (e.g., milliseconds or seconds)

tick-to-time factor a conversion factor, associated with a particular application node, which may be used to convert tickcounts of that application node into timestamps measured in the timing system of that application node; more specifically, a tickcount of the application node may be converted into a timestamp measured in the timing system of the application node by multiplying the tickcount by the application node's tick-to-time factor; therefore, a tick-to-time factor has units such as milliseconds/tick; the tick-to-time factor of an application node may, for example, be provided by an operating system executing on that application node time drift a difference in a particular point in time as measured by a timing system of a first application node and a timing system of a second application node; for example, if the current tickcount of a first application node is converted into a timestamp T1 represented in the timing system of a second application node, and if the current tickcount of the second application node is converted into a timestamp T2 of the second application node, then the difference between T1 and T2 represents the time drift between the first and second application nodes timestamp a representation of a particular point in time, represented in the timing system of a particular application node; a timestamp has units of measurement, such as milliseconds timing data data generated by a particular application node, collector node, or monitoring node representing a time, such as the current time, in the timing system of that node; timing data may be represented, for example, using tickcounts or timestamps timing system a system used by a particular application node for measuring time; the timing system of an application node may, for example, be specified by timestamps of that application node tracing data a combination of performance data and timing data generated by a particular application node and transmitted by the agent associated with that application node to collector nodes and/or monitoring nodes Having described certain terms used herein, a summary of certain embodiments of the present invention will now be provided.

Embodiments of the present invention may be used for software application performance monitoring, such as monitoring large scale applications that are distributed (e.g., globally) across a plurality of computers. Such an application may include a plurality of parts executing on separate computer systems. Each such computer system may be equipped with its own timing system, each with its own time drift. In other words, different ones of the computer systems may have different time drifts from each other. The computer networks interconnecting those computer systems, which may be used for communication to execute globally distributed transactions, may be subject to different, fluctuating network latencies.

Some embodiments of the invention may include one or more agents, deployed to distributed parts of such a monitored large-scale application. Such agents may be connected with each other using one or more collector nodes. The collector nodes may be capable of receiving tracing data from the deployed agents and to forward the received tracing data to a monitoring node. The monitoring node may be capable of correlating tracing data received from multiple agents via multiple collector nodes, thereby generating transaction tracing data describing the execution of individual distributed (synchronous or asynchronous) transactions. Tracing data may also contain timing information from the computer systems running the monitored distributed application.

Certain embodiments of the present invention may store timestamps (e.g., on collector nodes) describing the times at which agents first connected to their corresponding collector nodes (agent-collector connection times). Similarly, certain embodiments of the present invention may store timestamps (e.g., on monitoring nodes) describing the times at which collector nodes first connected to their corresponding monitoring nodes (collector-monitor connection times). These connection times may be used as base timestamps for the iterative calculation of a time compensation value (drift) compensating different time drifts and different fluctuating network latencies between computer systems running monitored applications, collector nodes, and monitoring nodes, and the computer networks connecting them. The drift may be used to translate timing data received with tracing data into a comprehensive timing system on the monitoring node.

Other embodiments of the present invention may cyclically send commands from a monitoring node to connected collector nodes, which may in turn send commands to their connected agents to retrieve timing information from them. Such received timing information may be used, together with connection timestamp information, to cyclically calculate and update drift information for all agents and collector nodes.

Yet other embodiments may translate timing information received with tracing data into the timing system of the monitoring node by applying drift data to compensate drifts caused by network latencies and time drifts to store a latest event timestamp, which describes the point of time, in the monitoring node's timing system, of the tracing data received most recently for each connected agent.

In some embodiments, a monitoring node may contain an agent/collector controller, capable of sending commands to connected collector nodes, and to maintain a repository of collector peer data representing time drift data for each connected collector node together with agent peer data representing time drift data from agents connected to each collector node.

In certain other embodiments, collector nodes may contain an agent controller which may receive commands from a monitoring node, send commands to all agents connected to the collector node, and receive the respective responses from the agents to maintain an agent peer repository representing time drift data of each connected agent. The agent controller may send responses for respective commands received by the monitoring node back to the monitoring node.

In certain embodiments, agents may cyclically send ping events to their connected collector node(s) and/or monitoring node(s), in order to maintain a minimum update rate of the latest event timestamp for each agent, in the event that an agent is not executing a monitored transaction for some period of time.

Some other embodiments may use the latest event timestamp for each agent to determine a point of time for a monitored distributed transaction at which no additional tracing data from any connected agent contributing to the distributed transaction is expected to be received. Once this point in time is identified, the tracing data describing the distributed transaction may be marked as completed.

Other embodiments may consider communication delays occurring in communication required for execution of distributed transactions which may, e.g., be introduced by messaging systems. Communication delays may be compensated by applying an extra timeout before transaction tracing data is marked as completed.

Certain embodiments may use the latest event timestamp to determine the completion times of monitored transactions being executed by different threads running within the same virtual machine.

Other embodiments may use the latest event timestamp to determine the completion times of monitored transactions executing a remote method invocation.

Yet other embodiments may use the latest event timestamp to determine completion of monitored transactions containing communication between a web browser and a web server by, e.g., sending HTTP requests.

Certain embodiments may use the latest event timestamp, together with an extra timeout, to compensate for communication delays caused by messaging servers to determine when monitored transactions containing message-based communication have completed. Messages may be forwarded by the messaging servers to one or multiple message receivers.

Some embodiments may use the latest event timestamp to determine whether the receiver application of, e.g., a remote method message, or a message sent via a messaging server is monitored and thus to determine whether tracing data can be expected from those receiver applications. This information may be used to determine whether additional tracing data for a monitored transaction can be expected and whether the tracing data modeling the monitored transaction should be marked as completed.

Other embodiments may use the drift information to transfer all timing data received with tracing data from multiple applications participating in the execution of a monitored distributed transaction into the timing system of the monitoring node to enable evaluation of the timing of the whole monitored distributed transaction, and to enable comparison of timing information received from multiple applications.

More specifically, one embodiment of the present invention is directed to a method for use with a system, wherein the system includes a first source node and a destination node. The method includes:

(1) at the destination node:
  (1)(a) requesting first source timing data;
(2) at the first source node, transmitting the first source timing data, representing a first current time of the first source node represented in a first source timing system of the first source node;
(3) at the destination node:
  (3)(a) receiving the first source timing data; and
  (3)(b) using the received first source timing data to identify a first time drift between the first source timing system and a destination timing system of the destination node.

Operation (2) may further include, at the first source node, transmitting second source timing data, representing a second current time of the first source node represented in the first source timing system of the first source node. Operation (3) may further include: (3)(c) at the destination node, using the first time drift to translate the second source timing data into first destination timing data represented in the destination timing system.

The first source timing data may include a source current tickcount representing a current tickcount of the first source node. A source tick-to-time factor associated with the first source node may represent a factor to translate a tickcount of the first source node into a point in time represented in the first source timing system of the first source node. A current destination timestamp may represent a current time of the destination node represented in the destination timing system of the destination node. A source-destination connect tickcount may represent a tickcount at the first source node at a time at which the first source node connected to the destination node. A source-destination connect timestamp may represent a point in time in the destination timing system at which the first source node connected to the destination node. Operation (3)(b) may include calculating the time drift using the formula: time drift=current destination timestamp−((source current tickcount−source-destination connect tickcount)*source tick-to-time factor+source-destination connect timestamp. Operation (3)(c) may include translating the first source timing data into the destination timing data using the formula: destination timing data=(source current tickcount−source-destination connect tickcount)*source tick-to-time factor+source-destination connect timestamp+time drift.

Operation (2) may further include transmitting the source-destination connect tickcount from the first source node to the destination node before performing (3)(b).

Operations (1), (2), (3)(a), and (3)(b) may be repeated a plurality of times to identify a plurality of time drifts between the source node and the destination node. A moving average of the plurality of time drifts may be calculated. Operation (3)(c) may include using the moving average as the first time drift to translate the first source timing data into the first destination timing data.

Operation (1)(a) may include cyclically requesting the first source timing data. Operation (2) may include transmitting a first plurality of source timing data representing a plurality of current times of the first source node represented in the first source timing system. Operation (3)(a) may include receiving the first plurality of source timing data, and operation (3)(b) may include using the received first plurality of source timing data to identify the first time drift between the first source timing system and the destination timing system.

Operation (2) may further include, at the first source node, transmitting second source timing data, representing a second current time of the first source node represented in the first source timing system of the first source node. Operation (3) may further include using the first time drift to translate the second source timing data into first destination timing data represented in the destination timing system.

The first source node may include a first application executing a first part of a distributed transaction on the first source node, and a first agent executing on the first source node and associated with the first application. Operation (2) may include, at the first agent, transmitting first agent tracing data to the destination node, wherein the first agent tracing data includes: (a) measurement data descriptive of performance of the first application; and (b) the first source timing data. Operation (3) may further include using the first time drift to translate the first source timing data into first destination timing data represented in the destination timing system.

The distributed transaction may include a plurality of parts, and the system may further include: (1) a second application executing on a second source node, wherein the second application does not execute any of the plurality of parts of the distributed transaction; and (2) a second agent executing on the second source node and associated with the second application. The method may further include: (4) at the second agent, transmitting second agent tracing data to the destination node, wherein the second agent tracing data includes second agent timing data representing a second current time of the second source node represented in the a second source timing system of the second source node. Operation (3)(a) may further include receiving the second agent tracing data. Operation (3) may further include translating the second agent timing data into second destination timing data represented in the destination timing system.

The first and second source nodes may be the same source node as each other or different source nodes from each other. Operation (4) may be performed cyclically.

The system may further include a third node, and operation (3) may further include transmitting the first source timing data to the third node. The method may further include, at the third node: (5)(a) receiving the first source timing data; (5)(b) using the received source timing data to identify a second time drift between the first source timing system and a third timing system of the third node; and (5)(c) using the second time drift to translate the first source timing data into third timing data represented in the third timing system. Operation (5)(b) may include identifying the second time drift by adding the first time drift to a time drift between the destination timing system and the third timing system.

The system may further include a second source node which differs from the first source node. The method may further include: (4) at the second source node, transmitting second source timing data, representing a second current time of the second source node represented in a second source timing system of the second source node; and (5) at the destination node: (5)(a) receiving the second source timing data; and (5)(b) using the received second source timing data to identify a second time drift between the second source timing system and the destination timing system of the destination node. Operation (5) may further include using the second time drift to translate the second source timing data into second destination timing data represented in the destination timing system.

Another embodiment of the present invention is directed to a method for use with a system, wherein the system includes an application node and a destination node. The application node may include a first application executing a first part of a distributed transaction on the application node. The method may include, at the destination node: (A) selecting a start path record representing a start path of the distributed transaction; (B) identifying a completion timestamp, represented in a timing system of the destination node, indicating a completion time of the start path; (C) identifying an oldest latest event timestamp, represented in a timing system of the monitoring node, from among a plurality of latest event timestamps associated with a plurality of agents; (D) determining whether the oldest agent timestamp represents a time that is later in time than the completion timestamp; and (E) if the oldest agent timestamp is not determined to represent a time that is later in time than the completion timestamp, then setting a completeness state of the start path to indicate that the start path has completed. Operation (E) may further include setting completeness states of all descendant paths of the start path to indicate that the descendant paths have completed. The start path may include at least one asynchronous part, and operation (D) may include determining whether the oldest agent timestamp represents a time that is later in time than a sum of the completion timestamp and an asynchronous wait time.

The method may further include: (E) if the oldest agent timestamp is determined to represent a time that is later in time than a sum of the completion timestamp and an asynchronous wait time, then determining whether all sub-paths of the start path have completed; and (F) if it is determined that all sub-paths of the start path have completed, then setting a completeness state of the start path to indicate that the start path has completed.

The method may further include: (E) if the oldest agent timestamp is determined to represent a time that is later in time than the completion timestamp, then determining whether all sub-paths of the start path have completed; (F) if it is determined that all sub-paths of the start path have completed, then setting a completeness state of the start path to indicate that the start path has completed. The method may further include: (G) if it is not determined that all sub-paths of the start path have completed, then, if a timeout period associated with the start path has elapsed since the start path has initiated, then setting a completeness state of the start path to indicate that the start path was completed by timeout.

The method may further include: (F) if it is not determined that all sub-paths of the start path have completed, then determining whether parent information of the start path record has been set; (G) if it is determined that parent information of the start path record has been set, then ending the method without performing (D) and (E); and (H) if it is determined that parent information of the start path record has not been set, then performing (D) and (E).

Yet another embodiment of the present invention is directed to a method for use with a system, wherein the system includes a first application node and a second application node. The first application node includes: (1) a first application executing a first method on the first application node; and (2) a first agent executing on the first application node and associated with the first application. The second application node includes: (1) a second application executing a second method on the second application node; and (2) a second agent executing on the second application node and associated with the second application. The method includes: (A) at the first agent, transmitting first agent tracing data over a first network connection to a destination node, wherein the first agent tracing data includes: (a) first measurement data descriptive of performance of the first application and (b) first agent timing data representing a current time of the first application node represented in a first timing system of the first application node; (B) at the second agent, transmitting second agent tracing data over a second network connection to the destination node, wherein the second agent tracing data includes: (a) second measurement data descriptive of performance of the second application and (b) second agent timing data representing a current time of the second application node represented in a second timing system of the second application node; (C) at the destination node: (C)(1) receiving the first and second agent tracing data; (C)(2) translating the first agent timing data into first destination timing data represented in a timing system of the destination node; (C)(3) translating the second agent timing data into second destination timing data represented in the timing system of the destination node; and (C)(4) comparing the first destination timing data to the second destination timing data.

Operation (C)(4) may include calculating a difference between the first destination timing data and the second destination timing data, wherein the difference is represented in the timing system of the destination node. The first agent timing data may represent a start time of the first method. The first agent timing data may represent an exit time of the first method. The first agent timing data may represents a time at which the first application makes a remote method call to a second application node; and the second agent timing data may represent a start time of the remote method call at the second application node.

Yet another embodiment of the present invention is directed to a method for tracing a distributed transaction executed by a web browser and a web server. The method includes: (A) placing a tagging sensor in a method of a first part of the distributed transaction, wherein the first part is executed by the web browser; (B) placing a tag extraction sensor in a method of a second part of the distributed transaction, wherein the second part is executed by the web server; (C) in response to execution of the first part of the distributed transaction by the web browser, using the tagging sensor to collect first correlation information for the first part; (D) in response to execution of the second part of the distributed transaction by the web server, using the tag extraction sensor to collect the first correlation information from within the second part and to collect second correlation information from within the second part; (E) using the first and second correlation information to identify a relationship between the first and second parts; and (F) using the identified relationship to monitor performance of the distributed transaction.

Execution of the first part may include execution of an instrumented method by the web browser. Execution of the instrumented method by the web browser may include invocation of a web request by the web browser to the web server. Execution of the second part may include processing the web request by the web server.

Operation (C) may include using the tagging sensor to add correlation information to the web request invoked by the web browser to the web server. Operation (D) may further include using the tag extraction sensor to extract correlation information contained in the web request. Operation (E) may include using the extracted correlation information to identify a parent-child relationship between the first and the second parts.

BRIEF DESCRIPTION OF THE DRAWINGS

FIG. 1 exemplary shows the monitored execution of a distributed transaction, particularly highlighting the effects caused by different and varying network latencies.

FIG. 2 is a block diagram of a distributed monitoring system capable to monitor synchronously and asynchronously distributed transactions.

FIG. 3 is a block diagram of different sensor types and the types of methods to which they may be instrumented.

FIG. 4 is a block diagram of a parent info record which may be used to transfer correlation information between different threads. The threads may run in different virtual machines, which may in turn run on different hosts, which are connected by a computer network.

FIG. 5 is a block diagram of a tag info record which may be used to store information to correlate a chain of distinct sequential or nested method calls within one thread.

FIGS. 6A-6C show different forms of path event records which are used to notify the correlation module about events that occurred during monitoring of transactions FIG. 6A is a block diagram of a start path event record which may be used to indicate the start of the first execution of an instrumented method within a thread.

FIG. 6B is a block diagram of a path event record which may be used to indicate entries or exits of instrumented methods.

FIG. 6C is a block diagram of a path correlation event record which may be used to indicate execution of a thread creating method.

FIGS. 7A-7F outline a set of commands and responses required to acquire information about different time drifts and network latencies between distributed collector nodes, agents and a monitoring node.

FIG. 7A is a block diagram showing an agent tickcount command used to trigger an agent to retrieve the current tickcount of its application node.

FIG. 7B is a block diagram showing an agent tickcount response used to send the current tickcount from an agent to its connected collector node.

FIG. 7C is a block diagram of an collector tickcount command which may be used to trigger a collector node to retrieve ist current tickcount.

FIG. 7D is a block diagram of a collector tickcount response used to send the current tickcount from a collector node to ist connected monitoring node.

FIG. 7E shows a block diagram of a collector agents drift update command used to trigger a collector node to send current drift data from all its connected agents.

FIG. 7F is a block diagram of a collector agents drift update command used to send agent drift data from all agents connected to collector node to a monitoring node.

FIG. 8 shows the structure of a ping event node, which is cyclically sent by an agent to its connected collector node.

FIGS. 9A-9C describe the handling of a ping event on agent, collector node and monitoring node;

FIG. 9A shows creation and initialization of a ping event by the agent

FIG. 9B shows forwarding of the ping event from the collector node to the monitoring node FIG. 9C depicts handling of the timing information of a ping event by a monitoring node.

FIG. 10 is a flow diagram showing the execution of a method entry sensor. The entry sensor first checks if the tag info record stored in the thread local storage indicates if a parent thread is assigned to the current thread and if the current entry sensor invocation is the first within the current thread and sends path event records accordingly.

FIG. 11 is a flow diagram showing the execution of a method exit sensor. The exit sensor first checks if the tag info record stored in the thread local storage indicates that at least one entry sensor was executed within the current thread. In this case, an event record indicating a method exit is sent.

FIG. 12 is a flow diagram showing the process of adding an event record, which may either be a start path, event, path event, path correlation event record or a ping event record to the event buffer of an agent.

FIG. 13 is a flow diagram showing the process of cyclically sending path event records and ping event records from the agent to its connected collector node.

FIG. 14 is a block diagram showing the structure of an agent controller of a collector node, which may receive commands from a monitoring node, forward commands to the connected agents of the collector node, and store peer information of the connected agents in an agent peer repository.

FIG. 15 is a block diagram of an agent/collector controller of a monitoring node, which may send commands to the connected collector nodes, and may hold a repository of collector peers describing connected collector nodes, which may contain a nested agent peer repository which holds information about the agents connected to each specific collector node.

FIGS. 16A-16C illustrate the handshake process between an agent and its collector node, and optional updates on a connected monitoring node.

FIG. 16A is a flow diagram showing startup of the agent, and sending handshake information to the collector node after connection.

FIG. 16B is a flow diagram showing the processing of the agent handshake information at the collector node, and notification of the monitoring node if the collector node is connected to a monitoring node.

FIG. 16C is a flow diagram shows processing of the agent connection information sent during agent handshake by the monitoring node.

FIGS. 17A-17B describe the process of connection initialization between a monitoring node and a collect node, including the initialization of a collector peer and optionally the creation and initialization of agent peers on the monitoring node.

FIG. 17A is a flow diagram showing the process of connecting a collector node to a monitoring node and sending peer data after connection.

FIG. 17B is a flow diagram showing the processing of collector and agent peer data on a monitoring node.

FIGS. 18A-18C describes the cyclical update of time drift and network latency data of connected collector nodes and agents.

FIG. 18A is a flow diagram showing the process performed by the monitoring node to retrieve and process time drift and network latency data.

FIG. 18B is a flow diagram describing how a connected collector node handles the received commands to update its own time drift and network latency data and the data of its connected agents.

FIG. 18C is a flow diagram showing how an agent handles a command to update its time drift and network latency data.

FIGS. 19A-19C are block diagrams of data structures of path records which may be used to represent parts of individual transaction.

FIG. 19A is a block diagram showing a start path record, which represents a part of a transaction executed within one thread.

FIG. 19B is a block diagram showing a path record which represents an individual execution of a method performed as part of a transaction.

FIG. 19C is a block diagram showing a path correlation record which is used to link the parts of one transaction executed within different threads into a complete end-to-end transaction, spanning multiple threads, virtual machines or host machines.

FIG. 20 is a flow diagram showing the processing of a received start path event record by the correlation module of the monitoring node.

FIG. 21 is a flow diagram showing the processing of a received path correlation event record by the correlation module of the monitoring node.

FIG. 22 is a flow diagram showing the processing of a received path event record by the correlation module of the monitoring node, including the pairing of path event records representing method exits with the path records representing the corresponding method entries, and completion detection of a transaction portion executed within one thread.

FIG. 23 is a flow diagram showing how time information in form of tickcounts received from an agent is translated into time information valid in the timing system of the monitoring node.

FIG. 24 is a flow diagram showing the process of determining the completeness state of distributed asynchronous and synchronous transactions tracing data in real time, considering different time drifts and network latencies between different application nodes involved in execution of the monitored transactions.

FIGS. 25A-25B describe the process of transferring correlation information between two different threads, being part of a monitored transaction.

FIG. 25A is a flow diagram showing the actions performed within the thread that initiates the thread switch.

FIG. 25B is a flow diagram showing the process of extracting the transferred correlation information in the activated thread;

FIG. 26 is a block diagram showing a portion of a monitored transaction where one thread activates another thread running within the same virtual machine. The transfer of correlation information between threads and sending of path event records from an agent to the monitoring node via a collector node and sending commands from the monitoring node via a collector node to an agent are shown.

FIGS. 27A-27B show the transfer of correlation information between a client thread that invokes a remote method and a server thread that executes the invoked method. Both threads may be executed on different host systems which are connected by a computer network.

FIG. 27A is a flow diagram showing the transfer of correlation information to the network message representing the remote method invocation.

FIG. 27B is a flow diagram showing how the correlation information is transferred to the local storage of the thread serving the remote method call.

FIG. 28 is a block diagram showing a portion of a monitored transaction where one thread invokes a remote method, which may be executed by a different virtual machine, running on different host systems, connected by a computer network. It also shows the transfer of correlation information within the network representing a remote method invocation, and the usage of different collector nodes by the agents contributing to the distributed transaction trace.

FIGS. 29A-29B depict the process of transferring correlation information within a web request (e.g. HTTP request) sent from a web browser to a web server.

FIG. 29A is a flow diagram showing how the web browser adds correlation information to a web request before it is sent.

FIG. 29B is a flow diagram showing the extraction of the correlation information by a thread that handles web requests.

FIG. 30 is a block diagram showing a distributed transaction, partly executed on a web browser. The involved browser contains an agent which sends tracing data to a monitoring node via a collector node, and augments web requests with correlation information, allowing to correlate the portion of the transaction executed on the web browser with other portions of the transaction executed by other application nodes.

FIGS. 31A-31B describe the process of transferring correlation information within messages sent via dedicated messaging services, like a messaging server.

FIG. 31A is a flow diagram showing how the sending thread adds correlation information to a message before it is sent;

FIG. 31B is a flow diagram showing the extraction of the correlation information by the thread that receives the message.

FIG. 32 is a block diagram showing a portion of a monitored transaction that sends a message using a dedicated messaging infrastructure like a messaging server to one or more message recipients, including the transfer of correlation information within the sent message. If the message is cloned and sent to multiple recipients, also the attached correlation information may be cloned.

FIG. 33 is a block diagram of a partial monitored transaction, executed by a monitored remote method execution client and a not monitored remote execution server.

FIG. 34 is a timing diagram showing translation from time information of different parts of a distributed transaction into the timing system of a monitoring node.

DETAILED DESCRIPTION

Embodiments of the present invention include systems and methods for tracing distributed transactions through heterogeneous application environments, without the requirement to modify application source code, using correlation information which identifies an individual transaction. The involved application executing the transaction may be distributed an run on multiple application nodes; as a result, the transaction may constitute a distributed transaction. The multiple application nodes involved in executing the transaction may, for example, be multiple computer systems, connected by a computer network, and may be distributed globally. Parts of the transaction (such as threads) may spawn child transactions. Correlation information may be transferred from parts of the transaction to the spawned child transactions, thereby allowing the parts of the distributed transaction to be correlated with each other.

Additionally, embodiments of the present invention include systems and methods for instrumenting bytecode which may be used to execute distributed synchronous and asynchronous transactions automatically.

The term bytecode, which is commonly used as synonym for Java bytecode, executed by Java Virtual machines, is used more broadly within this document to include, for example, compiled code interpreted by virtual machines, including, e.g., the Microsoft Common Intermediate Language which is executed by Microsoft Common Language Runtime.

Bytecode instrumentation may be performed on multiple instances of bytecode in parallel in a decentralized manner. Furthermore, bytecode instrumentation may be controlled by a central node, to minimize both network traffic caused by bytecode transfer for out-of-application instrumentation and configuration effort for controlling the instrumentation process. Such bytecode instrumentation requires neither modifications to source code of monitored applications, nor access to the source code. The code of monitored applications may be instrumented on the fly, at application run-time, during or after loading bytecode. Neither the deployment of additional libraries to the monitored applications, nor modification or exchange of existing application libraries is required.

Embodiments of the present invention include a method which considers multiple different time drifts on different computers and different and fluctuating network latencies between the different computers executing parts of distributed synchronous and asynchronous transactions, and the parts of a distributed transaction monitoring system which may be executed on different computer systems connected by a computer network.

Some embodiments allows exact correlation of individual local and remote sub-transactions spawned by an individual transaction at the method invocation level, including also the sequence of multiple sub transactions spawned during the execution of one instrumented method, even if the sub transaction is spawned in a not instrumented method called by the instrumented method. Additionally, embodiments provide correct tracing and monitoring data of distributed transactions if only a subset of the applications involved in the execution of a transaction is instrumented. If one or more applications within the execution chain of a transaction are not instrumented, correct tracing data may be provided up to, but not including, the first application in the transaction chain which is not instrumented.

Some embodiments enable the temporal sequence of method invocations which are part of a distributed transaction to be reconstructed, taking into account the varying and fluctuating network latencies of the computer networks connecting the computer systems which execute parts of the distributed transaction, and taking into account the multiple different time drifts of those computer systems.

All calculations regarding acquired measurement data and correlation of parts of distributed transaction or method invocations may be performed outside of the monitored applications, and may also be performed outside of the application node running the application to reduce overhead caused by monitoring within the applications or within the application node running the application.

An agent may be deployed to each monitored application on startup. The agent which has been deployed to an application may intercept loading of bytecode by the virtual machine in which the application executes. The agent may capture the intercepted bytecode and send it to a remote instrumentation engine for instrumentation.

The instrumentation engine may extract meta-data from the received bytecode, including, but not limited to, the name of the class represented by the bytecode and names of the methods of the class. The instrumentation engine may determine, according to the extracted meta-data, which methods should be augmented with instrumentation bytecode (sensors).

A sensor indicating the entry and a sensor indicating the exit of an instrumented method may be placed within the bytecode of the instrumented method. Such sensors are referred to herein as "entry sensors" and "exit sensors," respectively. Entry sensors may be placed at the beginning of an instrumented method, and exit sensors may be placed at every exit point of an instrumented method.

Instrumented methods may be exited in a normal way, e.g., by the execution of a return statement, or through an exception which occurred during method execution and which is not handled within the method. Each such exit type may be handled differently by different instrumentation code. Entry and exit sensors may use the storage of the local thread to store and retrieve information required to correlate separate method invocations within a single thread.

Additional sensors, referred to herein as "tagging sensors," may be placed in methods which start threads, methods which initiate remote method calls, or methods which send messages using messaging infrastructure (such as a messaging server). Tagging sensors extract information required to identify a parent thread which, e.g., starts another thread, invokes a remote method, or sends a message. The extracted information may be used to correlate measurement data from the parent thread with measurement data from dependent threads. The tagging sensors store the extracted information in a place which is accessible for both the parent thread and the thread(s) invoked by the parent thread.

In case of a thread directly invoked by the parent thread, the extracted information may be stored in an object representing the invoked thread. In a Java environment, for example, the extracted correlation information may be stored in an additional field of classes implementing the "java.lang.Runnable" interface which was inserted by the instrumentation engine via bytecode instrumentation.

For remote method invocations, the tagging sensor may store the extracted correlation information in an additional header field of the message representing the remote method invocation. In the case of a sent message, the tagging sensor may add a new parameter to the message and store correlation information as the value of the new parameter.

Although the implementation of tagging sensors for different target technologies, such as local thread switches or remote method invocation differs, their basic functionality, consisting of the extraction of correlation information from a parent thread and storing it on a location which is accessible by a thread invoked by the parent thread, remains the same.

Methods that directly or indirectly activate a thread may be instrumented with a tag extraction sensor. Example of those methods are methods which process an incoming remote method invocation, methods which receive a message from a messaging server, or methods which are invoked to execute a thread, such as the method "run" of classes derived from the class "java.lang.Thread" in Java environments. Tag extraction sensors may retrieve the correlation information stored by the associated tagging sensor and store the retrieved correlation information in the storage of the local thread to make it accessible to entry and exit sensors. Although the implementation of tag extraction sensors may differ between different target technologies, such differences are not relevant for understanding embodiments of the present invention, and therefore such differences are not described herein.

On the execution of an entry sensor, the sensor may first determine whether the current invocation is the first invocation of an entry sensor within the execution of the current thread, by using information retrieved from storage of the current thread. If the current invocation is the first of an entry sensor within the current thread, then the sensor may determine whether information of a parent transaction, as transferred and initialized by tagging sensors and tag extraction sensors, is available in thread storage of the current thread, and send an event indicating a new started transaction. The entry sensor may update the data in the thread-local storage to indicate that an invocation of an entry sensor has occurred. Indicators for call depth and the index of spawned child transactions, stored in the thread-local storage of the current thread, may be reset. Afterwards, an event record, indicating a new started transaction, may be initialized and sent to a remote correlation engine. The sent event record may also contain information for identifying and correlating a parent transaction, if information about the parent transaction is available in the thread-local storage.

Additionally, measurement data may be acquired, and an event record indicating a method entry may be initialized with the measurement data and sent to a remote correlation module, and the call depth indicator may be incremented.

On execution of an exit sensor, measurement data may be acquired and stored in an event node indicating a method exit which is sent to a remote correlation module. Finally the call depth indicator may be decremented.

A remote correlation module may receive the event records generated by entry and exit sensors and use data extracted from the event records to incrementally build data structures that reflect the execution of individual, distributed transactions. Concurrently, an analysis module may access the data structure to enable analysis and visualization of transactions in real-time, during the execution of the transactions.

Splitting and independently sending and correlating method entry and exit event records allows the analysis of transactions that block during execution and do not return. The received entry event records allow the determination of the last method entered by the transaction, which is also the blocking method. This information is important to isolate and find the root cause for the block.

Some embodiments provide a system and method that allow tracing individual distributed end-to-end transactions. The execution of the traced transactions may involve multiple threads, virtual machines, and host systems. Other embodiments allow tracing communication performed by monitored distributed transactions using various different communication channels. Such tracing mechanisms may communicate by, for example, sending messages using messaging services such as Sun Microsystems' JMS or Microsoft's Messaging Queue, invoking remote messages, or explicitly activating threads. However such communication is performed, the communication mechanism may allow adding correlation information to sent messages as out-of-band information.

Embodiments of the present invention may generate correlation information which allows reconstructing the chronological execution sequence of parts of distributed transactions executed on multiple hosts, even if the clocks of the hosts are not synchronized.

Deviations of clock times of different computer systems involved in the execution of the monitored transaction, and which are part of the distributed transaction tracing and monitoring system, together with fluctuating network latencies are monitored by the distributed monitoring system. Information about deviations of clock times and fluctuating network latencies may be used to translate time information received from distributed computer systems into the timing system of a monitoring node.

Translating transaction-related timing information into one common timing system enables a more sophisticated algorithm to determine the completion of monitored distributed synchronous and asynchronous transactions, which may produce correct results even if transaction tracing data is received in incorrect temporal order, and even if transactions are only partially monitored due to, for example, a non-instrumented application which is a part of the transaction but which does not provide tracing information because it is not instrumented.

The purpose of FIG. 1 is to illustrate one of the various problems which may occur during monitoring synchronous and asynchronous distributed transactions, which involve multiple computer systems in addition to a distributed monitoring system deployed on different computer systems, all connected by multiple computer networks with different, fluctuating latencies. There are clearly other issues which arise during monitoring and tracing globally distributed transactions, like e.g. different time drifts of clocks of involved computer systems etc.

FIG. 1 illustrates some features of a distributed transaction containing a remote message call performed by a monitored RMI client application 101 executing on an application node. An agent 107 is deployed to the application 101 on the application node. The agent 107 performs a remote method call to a monitored RMI server application 121. Another agent 130 is deployed to the server application 121. A method 102, instrumented with an entry sensor 103 and an exit sensor 106, is executed by the RMI client application 101. Entering the method 102 and executing the entry sensor 103 causes the entry sensor 103 to place a start path event record and a path event record into the event buffer of the agent 107. During execution of method 102, a remote method call is executed, which causes the execution of an instrumented tagging sensor 105, which in turn places a path correlation event record into the event buffer of the agent 107 and augments the remote method invocation request 111 with correlation data. The remote method invocation request 111 is sent to the RMI server application 121, via a computer network 108. Execution of the RMI client application 101 is suspended until execution of the remote method is finished.

After the remote method invocation is finished and the RMI client application 101 has received the remote method invocation response 115 from the RMI server application 121, the method 102 is finished, which causes the execution of the instrumented method exit sensor 106, which places a path event record indicating a method exit into the event buffer of the agent 107.

The agent 107 of the RMI client application 101 cyclically checks its event buffer for received event records and sends those event records to its connected collector node 140 in its event handling thread 109. During the event sending process 112, the agent 107 sends a start path event record, a path event record indicating a method entry, and a path correlation event indicating a spawned sub-path to the connected collector node 140 via a computer network 135, and removes those path events records from its buffer. At the next cyclic execution of the event sending process 114, assume that the agent 107 detects no event records in its buffer to send. The subsequent execution of the event sending process 116 sends a path event record indicating a method exit to the collector node 140.

The RMI server application 121 which runs a remote method request service thread 122, receives the remote method invocation request 111, and starts a new thread to handle the request 123. Creating and starting this thread causes the execution of a tag extraction sensor 124, which extracts information used to correlate the portion of the transaction monitored by the agent 107 with the portion of the transaction monitored by agent 130. The remote method invocation handling thread 123 starts execution of the requested method 125, which triggers the instrumented entry sensor 126, which places a start path event record containing information to correlate this portion of the distributed transaction with the part of the transaction executed by the RMI client application 101 and a path event record indicating a method entry into the event buffer of the agent 130. On termination of the method 125, a path event record indicating a method exit is inserted into the event buffer of the agent 130. Afterwards, the remote method invocation handling thread 123 sends the remote method call response 115 back to the RMI client application 101.

The agent 130 deployed to the RMI server application 121 cyclically checks its event buffer for event records which should be sent to the connected collector node 140 in its event handling thread 136. Assume that the first two execution of event handling 131 and 132 do not find event records in the buffer and therefore terminate immediately. The third execution 133 sends a start path event record, a path event record indicating a method entry and a path event record indicating a method exit to the collector node 140 via a computer network 135.

The collector node 140, which is listening for incoming event records in its event handling thread 142, first receives the path event records indicating a started path, a method entry, and the start of a sub-path on RMI client application 101, in its incoming event handling execution 142, and forwards the events to the monitoring node 160 via a computer network 161. (Note that the networks 108, 135, and 161 may be combined with each other in any way.) The collector node 140 then receives an event record indicating a method exit on RMI client application 101 in incoming event handling execution 143. Finally, the collector node receives an event record indicating a started path at RMI server application 121, followed by two event records indicating a method entry and a method exit in incoming event execution 144, and forwards them to the monitoring node 160.

The monitoring node 160 first receives and processes event records indicating a started path, a method entry, and a remote method call at the RMI client application 101, in execution of path event correlation process execution 162. The monitoring node 160 then receives a path event record indicating a method exit at RMI client application 101, which the monitoring node processes in path event process execution 165. The received method exit event also indicates that the path executed on RMI client application 101 is finished, and that the correlation process can not decide if the remote method call performed during the transaction was directed to an application node which is not instrumented, and thus does not send path events, or if the remote method request is served by an instrumented application node, and that the corresponding path events have not yet reached the monitoring node due to higher network latencies.

The path event records from the RMI server application 121, which are handled in correlation process execution 167, are received after the correlation of the parent part of this transaction has already been finished. As a result, it may not be possible to correlate such path event records to the parent transaction correctly.

FIG. 2 is a block diagram illustrating a distributed monitoring system 280 according to one embodiment of the present invention. The monitoring system 280 includes a monitoring node 260, which may be connected to a one or more collector nodes 230 via a computer network 241. Although the monitoring node 260 and collector nodes 230 are shown as distinct entities in FIG. 2, one or more of the collector nodes 230 may be combined with (e.g., implemented within) the monitoring node 260. Data exchanged between collector nodes 230 and monitoring node 260 may be encrypted and/or compressed, allowing communication via insecure and low bandwidth WAN connections. Collector nodes 230 may be connected to a plurality of agents 203, via a computer network 212. Those agents 203 may be deployed to applications 202 running on application nodes 201.

Although the monitoring system 280 shown in FIG. 2 may include one or more collector nodes 230 and one or more monitoring nodes 260, for ease of explanation the following description will refer to a plurality of collector nodes 230 and a single monitoring node 260. However, it should be understood that the system 280 may include any number of collector nodes 230 and any number of monitoring nodes 260. Furthermore, the collector nodes 230 may be omitted from the system 280, in which case one or more application nodes 201 may communicate directly with the monitoring node 260 and perform functions disclosed herein as being performed by the collector nodes 230. Those having ordinary skill in the art will appreciate how to implement various features of the collector nodes 230 within the application nodes 201 based on the description provided herein.

The monitoring node 260 may send instrumentation rules 240 to the collector nodes 230 and receive instrumentation metadata 242 and path event records 211, to control the instrumentation process of monitored applications 202 running on application nodes 201 and to receive information about performed instrumentations and tracing information about executed transactions.

The collector nodes 230 may receive original bytecode 205 for instrumentation and send instrumented bytecode 206 back to the agent 203 and may extract instrumentation metadata from the received original bytecode which may be stored in an instrumentation metadata repository 233. The collector nodes 230 may also receive path event records containing trace information about transactions performed by monitored applications 202.

The monitoring node 260 may send commands 244 to the collector nodes 230 and receive command responses 245 from the collector nodes. The collector nodes 230 may in turn send commands 214 to their connected agents 203 and receive command responses 215 from the agents 203. Commands may be used to control the behavior of the collector nodes 230 and/or agents 203 or to retrieve runtime information about collector nodes 230 and/or agents 203.

More particularly, the monitoring node 260 may include an agent/collector controller 268, which initiates command sending and which may use information received in response to commands to create and update collector node peer information and/or peer information about the agents 203 connected to the collector nodes 230. Collector node peer and agent peer information may be used by the event correlation process to, e.g., determine completion of monitored distributed synchronous and/or asynchronous transactions. Collector nodes 230 may also contain an agent controller 237, which may receive commands 244 from the monitoring node 260 and send command responses 245 back to the monitoring node 260. Additionally the agent controller 237 may send commands 214 to the agents 203 connected to a collector node 230 and use received responses 215 to create and update agent peer information.

Peer information about agents and collector nodes may contain information about time drifts of clocks 213, 239, 269 of application nodes 201 running applications 202, collector nodes 230, and monitoring node 260, and information about different and fluctuating network latencies of the computer networks 212 and 241 which connect application nodes 201 to collector nodes 230 and collector nodes to monitoring node 260. To be able to reliably calculate and correlate time drift information from multiple computer systems involved in the execution of a distributed transaction, it is necessary to obtain timing information which is sufficiently accurate and which is independent of user actions. As will be described in more detail below, embodiments of the present invention obtain such timing information using the "tickcount" that is provided by most operating systems. The tickcount associated with a particular computer system indicates how much time has elapsed since the computer system was last booted. This tickcount is used in combination with a tick-to-time factor, which enables the tickcount to be transformed into a time span measured, e.g., in seconds or milliseconds.

FIG. 3 is a block diagram illustrating basic sensor types which may be instrumented into different parts of a monitored application 202. Exemplary embodiments may distinguish between entry sensors 311 and exit sensors 312, which may be instrumented into methods 310 according to instrumentation rules, and tagging sensors 314 and tag extraction sensors 316 which may be instrumented in methods initiating creation of other threads 313, and corresponding methods starting these threads 315. Those thread creation methods 313 may include, for example, methods which send synchronous or asynchronous messages using messaging-oriented middleware, methods which prepare network messages representing remote message invocations, or methods which initiate an interaction with another thread within the same virtual machine. Thread-initiation methods 315 may include methods which receive interactions from other threads, such as methods which receive synchronous or asynchronous messages, methods which receive messages representing remote method invocations, or methods which start new threads.

Loading of original bytecode 205 of the application 202 running on the application node 201 by a native loader 207 may be intercepted by the agent 203 and sent to the collector node 230 for instrumentation. The collector node 230 may instrument the intercepted bytecode to produce instrumented bytecode 206, and then return the instrumented bytecode 206 (including sensors which have been injected into it). The instrumented bytecode 206 may be forwarded to the virtual machine 302 for execution.

FIG. 4 contains a block diagram of a parent info record 401, which may be used to transfer correlation information from a portion of a distributed transaction executed within one thread to another portion of a distributed transaction which is executed by another thread. A parent info record 401 contains an agentId 402, identifying the agent 203 which is deployed to the application 202 that executed the part of the instrumented distributed transaction that created the parent info record 401, a local pathId, which identifies an individual execution of the part of the distributed transaction, and a forkId, which identifies the point during of execution of the transaction path at which this parent info record has been created.

FIG. 5 shows a block diagram of a tag info record 501, which may be stored in the thread local storage of a thread and which may contain information to correlate portions of a distributed transaction executed within a single thread (such as sequential or nested method executions) and to correlate threads which were started during execution of a distributed transaction by another thread (referred to herein as a "parent thread") which performs execution of another part of the distributed transaction.

Such parent-child relationships between threads executing a distributed transaction may occur if a thread spawns a child thread within the local virtual machine, a thread invokes a remote method call (which may create a synchronously executed thread on another virtual machine), or by sending a message using a dedicated messaging system (which may be received by multiple receivers, causing the creation of multiple, asynchronously executed child threads).

The tag info record 501 includes a parent data 510 section (which holds information about an optional parent thread) and a local data 520 section (which holds information about the current execution in the local thread). The parent data 510 contains a parent agentId 511, which holds the identifier of the agent deployed to the application 202 that executed the parent part of the transaction. The parent local pathId 512 identifies the individual execution of the part of the distributed transaction that created the current thread, and the parent forkId 513 identifies at which point of execution of the parent part of the transaction this thread was spawned. It is noteworthy that the parent data section 510 may not be initialized, which may, for example, be the case if the current thread is the root thread of the monitored transaction and no parent thread exists.

The local data section 520 contains information for correlating subsequent method calls within the current thread into a consistent call stack, together with information for locating the application 202 which executed the thread and the application node 201 which is running the application 202. The agentId 521 identifies the agent 203 which was deployed to the application 202 executing this thread (and thus also the application node 201 running the application), the local pathId 522 identifies one individual execution of the thread, the call depth 523 indicates the current number of nested instrumented method calls, and the forkId 524 indicates the current number of spawned child threads. The forkID may be used to uniquely identify threads created by the thread described by the local data section 520.

FIGS. 6A-6C are block diagrams which show path event records created by sensors during execution of instrumented bytecode. Path event records may, for example, indicate start of a thread execution (as in the case of start path event record 601), entry or exit of a method during execution of a thread (as in the case of path event record 631), or spawning of a sub-thread (as in the case of path correlation event record 641).

As shown in FIG. 6A, a start path event 601, which is sent to indicate the start of a new transaction or the start of the execution of a part of a transaction in a new thread, contains a parent data section 610 which includes data that identifies the thread execution that started the current thread, whereas the data of the local data section 620 identifies the current thread execution. The parent data 610 may include a parent agentId 611, a parent local pathId 612, and a forkId 613. The parent agentId 611, parent local pathId 612 and forkId 613 identify application 202 and application node 201, thread execution and the activation of the current thread within all thread activations performed by the parent thread of the current thread. The local data 620 includes, but is not limited to, an agentId 621, a local pathId 623, payload data 623, and a current tickcount 624. AgentId 621 and local pathId 622 identify the local application 202 and application node 201 and the execution of the current thread. The payload data 623 includes, but is not limited to, data describing the current thread, such as its name or ID. The current agent tickcount 624 is set to the current tickcount value from the application node representing the creation time of the start path event record 601.

Path event records 631, as depicted in FIG. 6B, are used to indicate entry or exit of instrumented methods 310. A path event record contains an agentId 632 and a local pathId 633 which identify the application 202 and application node 201 and the thread execution that originated the path event record. The entry/exit indicator 634 allows distinguishing between path event records created by entry sensors 311 and exit sensors 312. The sensorId 635 is a key to the instrumentation metadata repository 233, and allows the reconstruction of the context of the sensor that created the path event record 631. The call depth 636 indicates the nesting depth of the instrumented method that created the path event record. The payload data 637 includes information about the current execution of an instrumented method 310. Payload data 637 may include, but is not limited to, method execution time, synchronization time or wait time of the instrumented method.

The current agent tickcount 638 is set to the tickcount value from the application node representing the creation time of the path event record 631.

Path correlation event records 641, which are shown in FIG. 6C, are used to indicate that a thread activated another thread, either explicitly (e.g., by calling a remote method) or by sending a message. Path correlation event records allow reconstructing the sequence of thread activations performed by a thread. A path correlation event record contains an agentId 642 and a local pathId 643, which identify the application and the thread execution that originated the path correlation event record. The sensorId 644 allows the reconstruction of the context of the sensor that created the path correlation event node 641 and the call depth 845 indicates the nesting depth. The forkId 646 indicates the sequence number of the specific thread activation described by the path correlation event record.

FIGS. 7A-7F illustrate commands and corresponding responses, used for communication between monitoring node 260 and collector nodes 230, and between collector nodes and agents, especially to exchange time drift and network latency information between agents 203, collector nodes 230, and monitoring node 260.

An agent tickcount command 701 as shown in FIG. 7A contains a commandId 702, indicating that the command 701 is an agent tickcount command. The corresponding agent tickcount response 710, shown in FIG. 7B contains an acknowledge field 711, which indicates that the command 701 was correctly processed by the command receiver, and an agent tickcount field 712, which contains the tickcount representing the time of processing the command 701 at the agent 203 that received the command 701. Agent tickcount command 701 and agent tickcount response 710 are used by collector nodes 230 to retrieve time information from application nodes 201 running applications 202 with connected deployed agents 203.

A collector tickcount command 720 as shown in FIG. 7C and the corresponding collector tickcount response 730 as shown in FIG. 7D are used to send time information from connected collector nodes 230 to a monitoring node 260. A collector tickcount command 720 contains a commandId 721 indicating that the command 720 is a collector tickcount command. The collector tickcount response 730 contains an acknowledge 731 indicating that the command 720 was processed correctly, and a collector tickcount field 732 containing the tickcount representing the time of processing the command 720 at the receiving collector node 230.

The collector agents drift update command 740 and the corresponding collector agents drift update response 750, as shown in FIGS. 7E and 7F, are used to transfer information describing deviations between the timing systems of application nodes and collector nodes. Such deviations may, for example, be caused by different time drifts and/or different and fluctuating network latencies. A collector agents drift update command 740 contains a commandId 741 indicating that the command 740 is a collector agents drift update command. The corresponding collector agents drift update response 750 contains an acknowledge field 751, indicating that the command receiver correctly processed the command 740, and a number of agents field 752 which indicates the number of agent collector drifts which are contained in the collector agent drift update response 750, followed by an agentId field 753 and an agent collector drift 754 for each agent 203 connected to the collector node 230 which received the command 740. The agent collector drift 754 describes current timing deviation between timing systems of the application node 201 to which the agent 203 identified by the agentId field 753 is deployed, and the collector node 230 to which the collector is connected. Timing deviations may be caused, for example, by different time drifts of the timing systems of application node 201 and collector node 230 together with network latencies which may fluctuate over time.

A ping event record 800 as shown in FIG. 8 may be used to transfer timing information from application nodes 201 via collector nodes 230 to the monitoring node 260, regardless of execution of monitored transactions at monitored applications 202 running on application nodes 201. The ping event record 800 contains an agentId field 801, identifying the agent 203 that sent the event record 800, the application 202 to which the agent 203 is deployed, and the application node 201 which runs the application 202. The ping event record 800 also contains a current agent tickcount field 802, which contains the tickcount that represents the creation time of the ping event record 800 at the application node 201.

FIGS. 9A-9C are flow diagrams describing the creation and sending of a ping event record 800 by the agent (FIG. 9A), forwarding the ping event from the collector node 230 to the monitoring node 260 (FIG. 9B), and processing a received ping event record 800 by the monitoring node 260 (FIG. 9C).

As shown in FIG. 9A, the agent sends ping event records (such as ping event record 800) cyclically, at each agent ping interval. The agent ping interval may have an arbitrary duration. Durations between 5 and 10 seconds represent good tradeoffs between avoiding overhead generated by too much sent ping event records, and sufficient actuality of timing information received from the agents. The agent 203 first fetches the current tickcount from the application node 201 to which it is deployed (901), then creates a ping event record 800, then sets the agentId filed 801 to its agentId 204, and sets the current agent tickcount field 802 to the previously fetched tickcount (902). The agent 203 then adds the ping event record 800 to the event buffer 210 of the agent 203 (903). The process then ends (904).

As shown in FIG. 9B, a collector node 230, forwards a received ping event record 800 to the monitoring node 260 to which it is connected (910). The handling of the incoming ping event record 800 by a collector node 230 then ends (911).

FIG. 9C shows processing of an incoming ping event record 800 by the monitoring node 260. First the agent peer (for a detailed description of agent peers see FIG. 15) matching the agentId 204 received with the ping event record 800 is fetched from the collector/agent peer repository of the agent/collector controller 268 (for a detailed description of the agent/collector controller and the collector/agent peer repository, see FIG. 23) (920). Afterwards, the agent tickcount 802 is read from the ping event record 802, and the monitoring node time which corresponds to this tickcount is calculated considering time drifts and fluctuating network latencies between application node 201, collector node 230, and monitoring node 260 (921). For a detailed description of a way in which the tickcount may be converted into a time in the timing system of the monitoring node, see FIG. 23. The calculated time is stored in the latest event timestamp field of the fetched agent peer (see 1515 and 1509 in FIG. 15) (922). The process then ends (923).

FIG. 10 is a flow chart describing the execution of an entry sensor 311. Calls to entry sensors are inserted at the start of each instrumented method 310 by the instrumentation engine 232. First the entry sensor checks if a tag info record 501 is available in the thread local storage. If none is available, a new tag info record is created, local and parent data are reset, and the new tag info record is added to the thread local storage. Then, the entry sensor checks if the local data 520 of the tag info record 501 in the thread local storage is initialized. (1001). If the local data 520 of the tag info record 501 is set, payload data is acquired (1002). Payload data may include, but is not limited to, execution time, synchronization time, or argument values of the current method. Then, the call depth 523 of the tag info record 501 is incremented (1003) and a path event record 631 is created and initialized with agentId 521, local pathId 522, and call depth 523 from the tag info record 501. The sensorId 635, which identifies the context of the entry sensor 311, is set. The entry/exit indicator 634 is set to "entry," the acquired payload data is stored in the path event record, and the current tickcount of the application node 201 is acquired and stored in the current agent tickcount field 638 (1004). The initialized path event record is inserted into the event buffer 210 of the agent (1005). Execution of the entry sensor ends (1013).

If the local data 520 of the tag info record 501 is not set (i.e., if 1001 evaluates to "n"), the entry sensor 311 generates a new local pathId 522, which uniquely identifies a thread execution within the scope of a virtual machine. Furthermore, the entry sensor 311 retrieves the agentId 204 from the agent 203 deployed to the application 202. Both local pathId 522 and agentId 204 are stored in the tag info record 501 of the local thread storage, and call depth 523 and forkId 524 of the tag info record 501 are reset (1006).

Afterwards, payload data specific for a started local execution path is acquired, which may contain the start time of the path, or an indicator about the event which caused the start of the execution, such as handling a message or executing a remote method (1007).

Then the entry sensor creates a start path event record 601, sets local pathId 621 and agentId 622 with data from the tag info node 501, stores the acquired payload data in the payload data 623, retrieves the current tickcount of the application node, and stores the retrieved tickcount in the current agent tickcount 624 of the created start path event record 601 (1008). Afterwards the entry sensor 311 checks if the parent data 510 of the tag info record 501 is set. If the parent data 510 is set, the entry sensor initializes the parent data 610 of the start path event record 601 with the parent data 510 of the tag info record 501 (1010). Otherwise, parent data 610 of the start path event record 601 is reset, indicating that no monitored parent thread exists (1011). Afterwards, the start path event 601 is inserted into the event buffer 210 of the agent 203 (1012). Execution of the entry sensor then continues with step 1002.

FIG. 11 is a flow diagram showing the execution of an exit sensor 312. Each time an instrumented method 310 is exited, an exit sensor 312 is invoked. On execution, the exit sensor first checks if the local data 520 of the tag info node 501 in the local thread storage is set (1101). If no local data is set, the current execution of the method does not belong to the execution of a monitored transaction. In this case, the execution of the exit sensor 312 ends (1108). Otherwise, execution continues by acquiring pay load data of the exit sensor 312 (1102). The payload data may contain, but is not restricted to execution time, synchronization time or CPU time of the current method. Afterwards, a path event record 631 is created, and its agentId 632, local pathId 633 and call depth 636 are initialized with the corresponding values from the tag info node 501 of the thread local storage. The sensorId 635 is initialized with a value identifying the current method, the entry/exit indicator 634 is set to "exit", the payload data 637 is set to the previously acquired values, and the current agent tickcount 638 is set to the current tickcount of the application node 201 (1103). The initialized path event record is stored in the event buffer 210 of the agent 203 (1104), and the call depth 523 of the tag info record 501 in the thread local storage is decremented (1105). If the call depth has now a value of 0 (1106), the tag info node 501 in the local thread storage is reset (1107). A call depth of 0 indicates that execution of the outermost instrumented method within the current execution of the current thread is finished and thus the values of the tag info record 501 are no longer valid. Execution of the exit sensor ends then (1108).

FIG. 12 is a flow chart showing the process of inserting an event record (e.g., start path event record 601, path event record 631, path correlation event record 641, or ping event record 800) into the event buffer 210 of an agent 203. First, the process of FIG. 12 determines whether the event buffer 210 contains enough free space to insert the event record (1200). If not enough space is available, the event record is skipped (1203). Otherwise, the event record is stored in the event buffer 210 (1201). Afterwards, the process ends (1202).

FIG. 13 is a flow chart that describes the process of cyclically sending the event records stored in the event buffer 210 to a connected collector node 230. Frequency of cyclical sending may have an arbitrary value. A good value which avoids both buffer overflows and unnecessary checking empty buffers is 5 to 10 seconds. Ideal sending frequency also depends on the size of the buffer. Sending of event records may be performed asynchronously with execution of application code.

First, all event records stored in the event buffer 210 are sent to the connected collector node 230 (1300). Then, the sent event records are deleted from the buffer (1301), and process ends (1302).

FIG. 14 is a block diagram showing an exemplary embodiment of an agent controller 237 of a collector node 230, which may be used to send commands 214 to agents 203 connected to the collector node 230 and receiving corresponding responses 215, storing agent peer 1402 information about connected agents 203 at the collector node, and receiving commands 244 from a connected monitoring node 260, handling the received commands and sending corresponding responses 245 back to the monitoring node 260.

The agent controller 237 contains a command handler 1400, which may handle commands 244 received from a connected monitoring node 260, by either sending commands 214 to agents 203 connected to the collector node 230 and interpreting corresponding responses 215 received from agents, evaluating runtime information from the collector node 230, or using information stored in the agent peer repository 1401 to create corresponding responses 245 to commands received from the monitoring node 260.

The agent peer repository 1401 may contain an agent peer record 1402 for each agent 203 which is connected to the collector node 230. An agent peer record contains an agentId 1403, which identifies a specific agent 203 deployed to a specific application 202 on a specific application node 201. Additionally, it contains a tick to time ratio 1404 which contains an application node 201 specific factor which may be used to convert a tickcount received from this specific application node 201 into a time value in, e.g., milliseconds. The agent connect tickcount 1405 contains the tickcount received from the application node 201 running the application 202 to which the agent 203 is deployed which represents the connection time between agent 203 and collector node 230 (i.e., the time at which agent 203 first connected to collector node 230) in application node 201 ticks. The agent/collector connect timestamp 1406 contains a timestamp of connection between agent 203 and collector node 230, represented in the timing system of the collector node 230. The agent collector drift 1407 may describe time deviations between the timing system of the application node 201 and the timing system of the collector node 230. The agent collector drift may be represented, for example, in milliseconds.

FIG. 15 is a block diagram showing an embodiment of an agent/collector controller 268, which may be used to centrally control collector nodes 230 connected to a monitoring node 260, and to control agents 203 connected to those collector nodes 230. The agent/collector controller 268 may contain a command handler 1501 which may be used to send commands 244 to connected collector nodes 230 and receive corresponding responses from them to build and maintain an agent/collector peer repository 1502 which may contain information about the connected collector nodes 230 and the agents 203 connected to those collector nodes 230.

The agent/collector peer repository 1502 may contain collector peer records 1503, each describing a connected collector node 230 and the agents 203 connected to this collector node 230. A collector peer record 1503 may contain a tick-to-time ratio, containing a factor which allows calculation of the time which corresponds to a tick count received from the collector node 230 described by this collector peer node 1503. Additionally, the collector peer record 1503 may contain a collector connect tickcount 1505 which contains the tickcount received from the collector node 230 at connect time, and a collector monitoring node connect timestamp 15, containing a timestamp represented in the timing system of the monitoring node 260 describing the connection time between the collector node 230 described by this collector peer record 1503 and the monitoring node 260. The collector/monitoring node drift 1507 describes deviations between the timing systems of collector node 230 and monitoring node 260. The collector and/or monitoring node times may be represented, for example, in milliseconds. Each collector peer record 1503 contains an agent peer repository 1508, describing the agents 203 connected to the collector node 230. Agent peer repositories 1502 may contain agent peer records 1509 which provide information about a specific agent 203 connected to the collector node 230. An agent peer record 1509 may contain an agentId 1510, identifying the agent 203 it describes, a tick-to-time ratio 1511 providing a factor to convert tickcounts received from this agent into time values in, e.g., milliseconds. Additionally, the agent peer record 1509 may contain the agent connect tickcount, representing the tickcount from the agent 203 at the time when agent 203 first connected to the collector node 230, an agent/collector connect timestamp, representing the time when the agent 203 first connected to the collector node 230, an agent/collector drift 1514, describing a time deviation between application node 201 of the agent 203 and the collector node 230 to which the agent 203 is connected. The agent/collector drift 1514 may, for example, be a time value represented in milliseconds. The latest event timestamp 1515 may contain a time value represented in the timing system of the monitoring node 260, representing the creation time of the latest event record, e.g., the path event record or the ping event record received from the agent 203.

FIGS. 16A-16C are flow diagrams describing the initial connection (handshake) between an agent 203 and a collector node 230, and additional optional processing of agent peer data at a monitoring node 260 which may be connected to the collector node 230 during connection of the agent 203.

FIG. 16A describes initialization of agent 203 at startup of application 202. First, the agent 203 tries to establish a connection to a collector node 230 (1600), and determines whether a connection between the agent 203 and the collector node 230 has been established successfully (1601). If the connection was established successfully, the agent 203 sends its agentId 204, together with the current tickcount of the application node 201, together with the tick to time ratio of the application node 201, to the collector node 230 (1602). The process ends then (1603).

As FIG. 16B shows, handling of a new agent connection by collector node 230 starts by reading the agentId, tickcount, and tick to time ratio received from the agent 203 (1610). The collector node 230 then creates a new agent peer record 1402 for the new connected agent, and sets the agentId 1403, tick to time ratio 1404, and agent connect tickcount 1405 to the corresponding values received from the agent 203. The collector node 230 also sets the agent/collector connect timestamp 1406 to the current time of the collector node 230, represented in the timing system of the collector node. The collector node 230 also sets the agent collector drift 1407 zero, and stores the initialized agent peer record 1402 in the agent peer repository 1401 (1611). The collector node 230 then determines whether the collector node 230 is connected to monitoring node 260 (1612). If the collector node 230 is connected to the monitoring node 260, the collector node notifies the monitoring node 260 about the newly-connected agent (1613). The process then ends (1614).

FIG. 16C shows processing of a new connection between agent 203 and collector node 230, as performed by monitoring node 260. First, the monitoring node 260 reads data about the newly-connected agent 203, which the monitoring node 260 received from the collector node 230 (1620) to which the agent 203 is now connected. Then the monitoring node 260 creates a new agent peer record 1509, and initializes its agentId 1509, tick to time ratio 1510, agent connect tickcount 1511, and agent/collector connect timestamp 1512 with the corresponding values received from the collector node 230. The monitoring node 260 sets the agent/collector drift 1514 to zero, and sets the latest event timestamp 1515 to the current timestamp of the monitoring node 260 (1621). The process then ends (1622).

FIGS. 17A-17B are flow diagrams showing an initial connection (handshake) between collector node 230 and monitoring node 260.

FIG. 17A shows connection of collector node 230 to monitoring node 260 after the collector node 230 has been initialized. The collector node 230 tries to establish a connection to monitoring node 260 (1700). If the connection was established successfully (1701), the collector node 230 sends the current tickcount and the tick to time ratio of the collector node 230 to the monitoring node 260 (1702). Then the collector node 230 sends agent peer data of all agents 203 currently connected to the collector node 230 to the monitoring node 260 (1703). The process then ends (1704).

FIG. 17B is a flow diagram which shows the handling of handshake information received from collector node 230 by monitoring node 260. First, the monitoring node 260 reads the tickcount and tick to time ratio received from the collector node 230 (1710). Then the monitoring node 260 creates a new collector peer record 1503, and initializes the tick to time ratio and collector connect tickcount with corresponding data received from the collector node 230. The monitoring node 260 also sets the collector/monitoring node connect timestamp 1506 to the time at which the monitoring node 260 connected to the collector node 230. The monitoring node 260 also sets the collector/monitoring node drift 1507 to zero, and stores the created collector peer record in the collector peer repository 1502 of the agent/collector controller 268 (1711). It is noteworthy that no collectorId is required to assign a connected collector node 230 with a collector peer record 1503, because identification of matching collector peer record 1503 may be performed by using the ID of the connection between monitoring node 260 and collector node 230, which remains unchanged during lifetime of the connection between collector node 230 and monitoring node 260.

The monitoring node 260 then creates agent peer records 1509 for the agent peer data received from the collector node 230, and initializes the agentId, tick to time ratio, agent connect tickcount, and agent/collector connect timestamp to values received from the collector node. The monitoring node also sets the agent/collector drift 1514 to zero and sets the latest event timestamp 1515 to the current time at the monitoring node 260, represented in the timing system of the monitoring node. The created agent peer records 1509 are stored in the agent peer repository 1509 of the created collector peer record 1503 (1712). The process then ends (1713).

FIGS. 18A-18C are flow diagrams showing the cyclical update of drift information between agents 203 and collector nodes 230 and between collector nodes 230 and monitoring node 260.

As shown in FIG. 18A, drift update is cyclically triggered by the monitoring node 260 by sending a collector tickcount command 720 to all connected collector nodes 230 (1800) and receiving the corresponding collector tickcount responses 730 from all connected collector nodes 230 (1800). Then, the new collector/monitoring node drift is calculated for each connected collector node 230 by using formula (1) (1801):

new collector/monitoring node drift=current monitoring node timestamp−((received collector tickcount−collector connect tickcount)*tick to time ratio+collector monitoring node connect timestamp)     Equation 1

Equation 1 calculates the difference between the current timestamp of monitoring node 260 with a calculated timestamp. To calculate the timestamp, the tickcount received at the time of connection time of the collector node 230 to the monitoring node 260 (e.g. the collector/monitoring node connect timestamp 1506) is subtracted from the tickcount received by the monitoring node 260 with the collector tickcount response 730. The result is multiplied with the tick to time ratio 1504 for the collector node 230, and represents the time elapsed since connection of the collector node 230 to the monitoring node 260 in the timing system of the collector node 230. This time is translated into the timing system of the monitoring node 260 to get a calculated timestamp by adding the collector/monitoring node connect timestamp 1506. It is noteworthy, that a history of calculated drifts may be kept and used to calculate a moving average of drift values, and use this average drift instead of the current drift. This may be useful in environments with computer networks showing short term latency spikes, which could otherwise lead to instable time drift data.

The new calculated collector/monitoring drift values are stored in the collector/monitoring node drift field 1507 of the respective collector peer records 1503 (1802). Then the monitoring node 260 sends collector agents drift update commands 740 to all connected collector nodes 230 and receives the corresponding collector agents drift update responses 750 from all connected collector nodes 230 (1803). The received agent collector drifts 754 are stored in the agent/collector drift field 1514 of corresponding agent peer records 1509, according to the received agentIds 753 (1804). The process then ends (1805).

FIG. 18B shows handling of drift update related commands by collector nodes 230. On receiving a collector tickcount command 720, the collector node 230 fetches the current tickcount (1810), creates a collector tickcount response 730, initializes the acknowledge 731 with a value indicating successful handling of the command and the collector tickcount 732 to the fetched current tickcount, and sends the response to the monitoring node 260 (1811). The process then ends (1812).

On receiving a collector agents drift update command 740, the collector node 230 sends agent tick count commands 701 to all connected agents 203 and receives the corresponding agent tickcount responses 710 (1820). Then the collector node 230 calculates new agent/collector drifts for each connected agent 203 by using Equation 2 (1821):

new agent/collector node drift=current collector node timestamp−((received agent tickcount−agent connect tickcount)*tick to time ratio+agent collector node connect timestamp)     Equation 2

Calculation of agent/collector node drift is performed similar to calculation of collector/monitoring node drift, by subtracting the current collector time from a calculated collector time, which is calculated using tickcounts and the tick to time ratio received from the agent 203 and the agent collector connect timestamp.

The calculated drifts are stored in the agent collector drift field 1407 of the corresponding agent peer records 1402 (1822). Then the collector node 230 creates a collector agents drift update response 750, and initializes the acknowledge field to indicate successful command execution. The collector node 230 also stores the number of connected agents 203 in the nr of agents field 752. The collector node 230 also stores, in the agentId field 753 of each connected agent, the agentId 204 of the connected agent. Furthermore, the collector node 230 stores the corresponding calculated agent/collector drift in the agent collector drift field 754. The collector node 230 then sends the response to the monitoring node 260. The process then ends (1824).

FIG. 18C shows the part of drift updating process as performed by the agent 203. On receiving an agent tickcount command 701, the agent 203 first gets the current tickcount from the application node 201 of the application 202 to which it is deployed (1830) and then creates and initializes an agent tickcount response 710 by setting the acknowledge field 711 to indicate successful command execution and setting the agent tickcount field 712 to the fetched tickcount. The response is then sent to the collector node 230 (1832). The process then ends (1832).

FIGS. 19A-19C are block diagrams showing path records, which are used to model executions of transactions and which are created and managed by the event correlation module 265 according to incoming event records (see FIGS. 6A-6C).

A start path record 1901 as described in FIG. 19A is used to model the part of a transaction which was performed by a specific execution of a thread, and to model dependencies between thread executions that build the execution of a distributed synchronous and/or asynchronous transaction by representing parent/child relationships. The parent path info 1910 of a start path record 1901 represents an optional parent path of the path described by this start path record, and contains information to identify the parent path together with the point of execution of the parent path where this path was created. The parent pathId 1911 uniquely identifies the parent path within the scope of a specific agent 203, the parent agentId 1912 uniquely identifies the agent 203 (and in turn the application 202 and the application node 201 running the application) which monitored the parent path. The forkId 1913 uniquely identifies the point during execution of the parent path in which the thread represented by this start path record was created.

The path info 1920 section contains information to identify the path, together with information to model execution within the current thread and information about optional monitored child paths that this path created, and information about completeness of this path. The pathId 1921 uniquely identifies one execution of a part of a distributed transaction performed within one thread, the agentId 1922 uniquely identifies the agent 203 deployed to an application 202 and the application node 201 running the application, the payload data 1923 contains information relevant for the this path, such as the name of the thread that executed it and the path nodes 1924 may contain a list of path records 1931 and path correlation records 1941, which may describe executions of instrumented methods 310 performed within this thread and threads created during execution, the order of the path records may reflect the temporal order of monitored method entries and thread creations. The temporary correlation records 1925 may contain correlation records 1941 for which no corresponding start path record is yet available. The completeness state 1926 may be used to reflect if and how completeness of the thread execution described by this start path record 1901 was detected. Values of completeness state may include, for example, "processing" (indicating that the thread execution described by this start path record is still occurring), "completed" (indicating that thread execution described by this start path record and executions of all monitored directly and indirectly started synchronous and asynchronous thread executions has been completed), and "timed out" (indicating that either completion of the thread execution described by the start path record 1901 or execution of a monitored direct or indirect child or parent thread execution did not occur within a specific timeout period). The timeout period may be started with creation of start path record 1901 representing the root thread execution of a monitored transaction. Such a start path record 1901 does not contain initialized parent path info, indicating that it represents the primal thread execution performed by a monitored transaction. For such start path records, the creation timestamp 1928 is set to the monitoring node time stamp on creation time. For other start path records, the creation timestamp 1928 is reset. Values for timeout periods may vary, depending on the type of monitored transaction. A good initial timeout value may be 10 minutes. The completed timestamp 1927 indicates the point of time in the timing system of the monitoring node 260 when the path event record 631 modeling the exit of the top level monitored method of the thread execution described by this start path record 1901 was correlated by the event correlation module 265.

FIG. 19B is a block diagram showing a path record 1931, which may be used to model single invocations of instrumented methods 310, and may contain payload data 1932 holding information about the represented method invocation, like e.g. duration of method execution, CPU time required for execution etc. The sensorId 1933 is a key to the instrumentation metadata repository 264, and allows the reconstruction of the context of the sensor that created the path event record 631 which led to the creation of the path record 1931. Instrumentation metadata may contain information such as the name of the method or the class to which the method belongs. Call depth 1934 may be used to indicate the call nesting depth of the represented invocation of the instrumented method 310.

FIG. 19C is a block diagram of a path correlation record 1941, which may be used to model spawn points which created synchronously- and asynchronously-executed child threads of the current thread. A path correlation record may contain a forkId 1942 which may be used to identify a specific spawn point within a specific execution of a thread, a sensorId 1942, which may be a key to the instrumentation metadata repository 264, allowing the reconstruction of the context of the sensor that created the path correlation event record 631 which led to the creation of the path record 1931. Call depth 1934 may be used to indicate call nesting depth of the represented thread creating method 313, the async indicator 1945 may be used to distinguish between synchronously and asynchronously spawned sub paths, and the child path references 1946 may contain references to start path records representing threads started by the execution of the thread creating method 313 represented by this path correlation record 1941.

FIG. 20 is a flow diagram showing the processing of a start path event record 601 by the event correlation module 265 of a monitoring node 260.

After receiving a start path event record 601, the event correlation module 265 first queries the path repository 266 for an existing start path record 1901 with the same pathId 1921 and agentId 1922 (2001). If such a start path record is found (2002), the event correlation module 265 determines whether the completeness state 1926 of the start path record 1901 indicates that the path has already been completed (2004). If the found start path event 1901 has already been marked as completed, then special handling of start path events received after path completion is performed (2019), which may, e.g., include notifying the user that a start path event record 601 was received after completion of the transaction has been detected, and suggesting adapting the transaction timeout. Then, the corresponding monitoring node time for the current agent tickcount 624 may be calculated and stored in the latest event timestamp 1515 of the agent peer record 1509 with an agentId 1510 matching the agentId 621 received with the incoming start path event record 601 (2020). The process then ends (2021).

In case of a completeness state 1925 indicating a transaction that has not yet completed (2004), the payload data of the start path record is updated with the payload data of the received start path event record 601 (2005). (Such a start path record might be available if the start path event record of a child path is received before the start path record of the parent path.)

If no start path record with matching pathId 1921 and agentId 1922 can be found (2002), a new start path record 1901 is created and inserted into the path repository 266 and its path info section 1920 is initialized with data from the local data section 620 of the incoming start path event record 601, and the creation timestamp 1928 is reset (2003). The event correlation module 265 then checks if the parent data section 610 of the received start path event record 601 is initialized (2006). If no parent data is available in the received start path event record 601, the parent path info section 1910 of the created or updated start path record 1901 is reset and the creation timestamp 1928 is set to the current time of the monitoring node (2007). (A start path record 1901 with no set parent data 1910 indicates the start of a new monitored transaction which may or may not spawn child paths. Such a start path record may be used to represent a whole distributed transaction, and the creation timestamp set in such start path event records may be used to evaluate if a transaction timeout period has elapsed for the represented transaction.) Then, the corresponding monitoring node time for the current agent tickcount 624 is calculated and set to the latest event timestamp 1515 of the agent peer repository with matching agentId 1508 (2020). The process then ends (2021).

In case of initialized parent data (2006), the parent data section 1910 of the created or updated start path record 1901 is initialized with values from the received start path event record 601 (2008), and the path repository 266 is searched for a start path record 1901 where the pathID and agentId match the parent pathId 1911 and parent agentId 1912 of the created or updated path record (2009). If such a start path record 1901 is not found in the path repository 266 (2010), then a new start path record 1901 is created which represents the parent thread of the thread represented by the received start path event record. The parent data of the created start path record is cleared, its pathId 1921, and agentId 1922 are set to the parent pathId 612 and parent agentId 611 of the received start path event record 601, a new path correlation record 1941 is created, and a child path reference, referencing the created or updated start path record 1901 is added to it. The new path correlation record 1941 is added to the temporary correlation records 1925 of the start path record representing the parent thread, its creation timestamp 1928 is cleared, and the created start path record representing the parent path is inserted into the path repository 266 (2011). Afterwards, the corresponding monitoring node time for the current agent tickcount 624 of the received start path event record is calculated and set to the latest event timestamp 1515 of the respective agent peer record 1509 (2020). The process then ends (2021).

If a start path record 1901 where the pathID 1921 and agentId 1922 match the parent pathId 1911 and parent agentId 1912 of the created or updated start path record is found (2010) (such a start path record represents the parent path of the path represented by the currently updated or created start path record), then the completeness state 1926 of the found start path record 1901 is verified to determine whether it indicates that the transaction has already completed (2012). If the completeness state 1926 of the parent start path record 1901 indicates that the transaction has already completed, then receiving of a start path event 1901 for an already completed transaction is handled (2019), and the latest event timestamp 1515 of the matching agent record 1509 is updated with the monitoring node time corresponding to the current agent tickcount 624 of the received start path event record 601 (2020). The process then ends (2021).

If the completeness state 1926 of the parent start path record 1901 indicates that the transaction has not been completed (2012), then the path records 1924 of the found start path record 1901 representing the parent path are queried for a path correlation record 1941 with the same forkId 1941 as the forkId 613 of the received start path event record 601 (2013).

If such a path correlation record 1941 is found within the path records 1924 of the parent start path record (2014), then a reference to the created or updated start path record 1901 is added to the child path references 1946 of the path correlation record 1941 (2018), and the corresponding monitoring time to the received current agent tickcount 624 is calculated and stored in the matching agent peer record 1509 (2020). The process then ends (2021).

If no path correlation record 1941 is found in path records 1924 (2014), then the temporary correlation records 1925 of the start path record 1901 representing the parent path are queried for a path correlation record 1941 with a forkId 1942 as the forkId 613 of the received start path event record 601 (2015). If no such path correlation record 1941 is found (2016), a new one is created and added to the temporary correlation records 1925 (2017).

A reference to the created or updated start path record 1901 is added to the child path references 1945 of the found or created path correlation record 1941 (2018), and the latest event timestamp 1515 of the matching agent peer record 1509 is set to the monitoring node time corresponding to the received current agent tickcount 624 (2020). The process then ends (2021).

FIG. 21 is a flow diagram showing the processing of a path correlation event record 641 by the event correlation module 265.

The event correlation module 265 first checks if a start path node 1901 with an agentId 1922 and pathId 1921 equal to the local agentId 632 and local pathId 633 of the received path correlation event record 631 exists in the path repository 266 (2101). If no matching start path record 1901 is found (2102), the incoming path correlation event record 631 is ignored (2107), and the latest event timestamp of the agent peer record matching the agentId is updated with the monitoring node time corresponding to the received current agent tickcount (2110). The process then ends (2111).

If a matching start path record 1901 is found (2102), then the completeness state 1926 of the start path record 1901 is checked (2103). If the completeness state 1926 indicates that the transaction to which the start path record 1901 belongs is already completed, then special handling for a path correlation event record 641 received after transaction completeness is performed (2104), the incoming path correlation event is ignored (2107), and the latest event timestamp of the agent peer record matching the agentId is updated with the monitoring node time corresponding to the received current agent tickcount (2110). The process then ends (2111).

If the completeness state 1926 of the start path record 1901 indicates that the transaction has not been completed, the temporary correlation records 1925 of the found start path record 1901 are queried for a path correlation node 1941 with a forkId 1942 matching the forkId 646 of the received path correlation event record 641 (2105). If such a path correlation record is found (2106), then the path correlation record 1941 is removed from the temporary correlation records 1925 of the start path record 1901, and appended to its path records 1924 (2109). Otherwise, a new path correlation record 1941 is created, and its forkId 1942, sensorId 1943, call depth 1944 and async indicator 1945 are set to the corresponding values of the received path correlation event record 641, and the created path correlation record 1941 is appended to the path records 1924 of the start path record 1901 (2108).

In both cases the corresponding monitoring node time of the current agent tickcount 648 received with the path correlation event record 641 is calculated and stored in the latest event timestamp field 1515 of the agent peer record 1509 with the same agentId 1510 as the agentId 642 of received path correlation event record 641 (2110). The process then ends (2111).

FIG. 22 is a flow diagram showing the handling of an incoming path event record 631 by the event correlation module 265. First, the event correlation module 265 queries the path repository 266 for a start path record 1901 with agentId 1922 and pathId 1921 matching agentId 632 and local pathId 633 of the incoming path event record 631 (2201). If no such start path record 1901 is found (2202), the incoming path event record 631 is ignored (2203), the latest event timestamp 1515 of the agent peer record 1509 matching the agentId 642 received with the path correlation event record 641 is updated with the monitoring node time corresponding to the current agent tickcount 648 received with the path correlation event record 641 (2113). The process then ends (2214).

If a matching start path record 1901 is found, its completeness state 1926 is checked to determine whether it indicates a completed transaction or not (2203). In case of a completed transaction, handling of path event records after transaction completion is performed (2204), the correlation event is ignored (2205), and the latest event timestamp 1515 of the matching agent peer record 1509 is updated with the monitoring node time corresponding to the received current agent timestamp 638 (2213). The process then ends (2214).

If the completeness state 1926 of the matching start path record 1901 indicates that the transaction has not yet completed (2203), the event correlation module checks if the incoming path event record 631 indicates a method entry or a method exit (2206).

In case of a method entry, a new path record 1931 is created, its payload data 1932, sensorId 1933, and call depth 1934 are initialized with the corresponding values of the incoming path event record 631, and the new path record 1931 is appended to the path records 1925 of the start path record 1901 (2207). Afterwards, the corresponding monitoring node time for the current agent tickcount 638 received with the path event record 631 is calculated and stored to the agent peer record 1509 with an agentId 1510 matching the agentId 632 of the incoming path event record 631 (2213). The process then ends (2214).

In case of a method exit, the event correlation engine queries the path records 1924 of the start path record 1901 for the path record 1931 representing the corresponding method entry (2208). Finding the corresponding path record 1931 may be performed by starting from the end of the path records 1924 of the start path record 1901 and sequentially searching for a path record 1931 with matching sensorId 1933 and call depth 1934. Then, the payload received with the incoming path event record 631 is merged with the payload of the path record 1931 modeling the corresponding method entry (2209). Then, the event correlation engine determines whether the call depth of the received path event record 631 is 1, indicating the exit of the top level instrumented method 310 within the thread execution represented by the start path record 1901. In this case, the corresponding monitoring node time for the current agent tickcount 638 received with the path event record 631 is calculated (2211), and the completed timestamp 1927 of the start path record 1901 is set to the calculated corresponding monitoring node time (2212).

Then, regardless of the received call depth, the latest event timestamp 1515 of the agent peer record 1509 with an agentId 1510 matching the agentId 632 of the incoming path event record 631 is updated with the monitoring node time corresponding to the current agent tickcount 638 received with the incoming path event record 631 (2213). The process then ends (2214).

FIG. 23 is a flow diagram showing the calculation of a corresponding monitoring node time for a given agent tickcount. On receiving an agentId and an agent tickcount, first the matching collector peer record 1503 and agent peer record 1509 are fetched form the agent/collector peer repository 1502 (2301). It is noteworthy that an agent 203 may only be connected to one collector node 230 at a time, and thus the agentId is sufficient to identify both the collector peer record 1502 and the agent peer record 1509.

Afterward, the agent connect tickcount 1512, tick to time ratio 1511, and agent/collector connect timestamp 1513, agent/collector drift 1514 are fetched from the agent peer record 1509, the collector/monitoring node drift 1506 is fetched from the collector peer record 1503, and the fetched values are used to calculate the corresponding monitoring node time by using Equation 3 (2301):

corresponding monitoring node time=(received agent tickcount−agent connect tickcount)*tick to time ratio+agent/collector connect timestamp+agent/collector drift+collector/monitoring node drift     Equation 3

As shown in Equation 3, the agent connect tickcount is first subtracted from received agent tickcount to get the number of ticks that have elapsed since the agent connected to its collector node. Then, the result is multiplied by the tick to time ratio of the agent to get a corresponding time value describing the connection duration of the agent. The agent/collector connection timestamp is then added to the connection duration to get a monitoring node time value corresponding to the received agent tickcount. The corresponding monitoring node time is then adjusted by adding the agent/collector drift and the collector/monitoring node drift. After this calculation is performed, the process ends (2303).

FIG. 24 is a flow diagram showing the path completion algorithm which calculates the completion state of monitored transactions. The path completion check may be performed cyclically by the event correlation module 265 for all start path records 1901 within the path repository 266. The check may be performed, e.g., every 1-5 seconds. In an initial step the path completeness check determines whether the completion of the current start path record 1901 has already been detected by, e.g., determining whether the completeness state 1926 indicates that the path is already completed (2400). In case of a start path record 1901 already marked as completed, the process ends (2412).

Otherwise, it is determined whether the completed timestamp 1927 of the start path record 1901 is set (2401). If the completed timestamp 1927 has not been set, then it is determined whether the parent path info 1910 is not set, indicating that the start path record models the top level thread execution of a transaction, and therefore may represent a whole distributed transaction (2409). If parent path info 1910 is set, then the process ends (2412). If the parent path info 1910 is not set, it may be determined whether the transaction timeout is already elapsed by comparing the current monitoring node time with the transaction timeout added to the creation timestamp 1928 of the start path record 1901 (2410). If the transaction timeout has not yet elapsed, then the process ends (2412). In case of an elapsed transaction timeout, the completeness state 1926 of the start path record 1901, and its entire direct and indirect child start path records 1901 (e.g., connected by child path records 1946 of path correlation records 1941 in temporary correlation records 1925 and path records 1924 of start path records) is set to indicate completion caused by an elapsed transaction timeout (2411). The process then ends (2412).

If the completed timestamp 1927 of the start path record 1901 has already been set, indicating that the thread execution represented by this start path record is already finished (2401), then it is determined whether the start path record 1901 is linked to any child start path events (2402). This may be performed by, e.g., determining whether path records 1924 contain path correlation events 1941, indicating spawned thread executions. If no such start path events 1901 are found, then the completeness state of the start path record 1901 is set to a value indicating a completed transaction (2403), and the process ends (2412).

If the path records 1924 of the start path record 1901 contain path correlation records (2402), then the oldest agent timestamp (OAT) of all connected agents is calculated. This may be performed by, for example, obtaining the oldest latest event timestamp 1515 of all agent peer records 1509 in all agent peer repositories 1508 of all collector peer records 1503 in the agent/collector peer repository 1502 (2404).

Then it may be determined whether the path records 1924 of the start path event 1901 contain path correlation records 1941 with a set async indicator 1945 (2405). If any such path correlation records are found, then it is determined whether the OAT is greater (i.e., later in time) than the completion timestamp 1928 of the start path record 1901 plus an async wait time (2406). The async wait time allows correlation parts of the transaction which may, e.g., be triggered by message communication, which may be subject to delays, caused by, e.g., queuing of messages or by e.g. spawned child threads with low priority. The async wait time defines the maximum message delay time tolerated by the distributed monitoring system 280 and allows correlation of message triggered transaction parts which may be started after the threads that sent the message have terminated.

If no correlation records 1941 with set async indicator 1945 are found (2405), it is determined whether the OAT is greater than the completed timestamp 1927 of the start path record 1901 (2407).

If no correlation records with a set async indicator 1945 are found and the OAT is greater than the completed timestamp 1927 of the start path record 1901, or correlation records with set async indicator 1945 are found and the OAT is greater than the completened timestamp 1927 plus the async wait time, then it is determined whether the completeness state 1926 of all start path records 1901 linked with this start path event record 1901 via child path references 1946 in path correlation records indicates a completed thread execution (2408). This may be performed by determining whether the completeness state 1926 of all start path records 1901 referred by all child path references 1945 of all path correlation records 1945 in the path records 1924 of the start path record 1901 are set to indicate completed execution. If the completion states 1945 of all referred start path records 1901 indicate a completed thread execution, the completeness state 1926 of the processed start path record 1901 is set to a value indication completed execution (2403), and the process then ends (2412).

If not all referred start path records 1901 indicate completed execution (2408), or the processed start path record 1901 contains no path correlation records 1941 with a set async indicator 1945 and the OAT is smaller than (i.e., refers to an earlier time) the competed timestamp 1926 of the processed start path record 1901 (2407), or the processed start path record 1901 contains path correlation records 1941 with a set async indicator 1945 and the OAT is smaller than (i.e., refers to an earlier time) the completed timestamp 1927 of the processed start path record 1901 plus the async wait time (2406), then it is determined whether the parent info 1910 of the processed start path record is initialized (2409). If the parent info 1910 is initialized, then the process ends (2412). Otherwise, it is determined whether the transaction timeout has already elapsed by comparing the creation timestamp 1928 of the processed start path record 1901 with the current monitoring server time and determining whether the transaction timeout time has already elapsed (2410). If the timeout period has not yet elapsed, the process ends (2412). Otherwise, the completeness state of the processes start path record 1901, and of all direct and indirect child start path records, is set to a value indicating path completion due to transaction timeout. The process then ends (2412).

FIGS. 25A-25B are flow diagrams showing execution of an exemplary embodiment of tagging sensors 314 and tag extraction sensors 316 which may be instrumented into methods that spawn threads from a parent thread (thread creating methods 313) and methods that execute the spawned thread (thread starting methods 315).

As described in FIG. 25A, execution of such a tagging sensor 314 starts with retrieving the tag info record 501 from the thread local storage and determining whether the local data 520 of the tag info record 501 is set (2501). If no tag info record 501 is available, or local data 520 is not set, execution of the tagging sensor ends (2507). Otherwise, a parent info record 401 is created and agentId 402, local pathId 403 and forkId 404 are initialized with corresponding values from the tag info record 501 (2503). Afterwards, the parent info record 401 is stored in the object representing the child thread which is about to be started (2504). The object representing the child thread, which may be a "java.lang.Thread" object in Java environments, is also accessible by the child thread which is created. Next, a path correlation event record 641 is created and agentId 642, local pathId 643, forkId 646 are initialized with corresponding values from the tag info record 501, the sensorId 644 is set to a value uniquely identifying the sensor that created the path correlation event record 641, the async indicator 647 is set to a value indicating asynchronous execution, and the current agent tickcount 648 is set to the current tickcount of the application node 201. Additionally, the forkId 524 of the tag info record 501 is incremented (2505). Afterwards the created correlation event record 641 is stored in the event buffer 210 the agent 203 (2506). The process ends then (2507).

FIG. 25B shows execution of the corresponding tag extraction sensor 316 which is triggered when the spawned child thread is started (e.g. execution of a thread starting method 315). First, the tag extraction sensor checks if the object representing the started thread contains a parent info record 401 (2510). If no parent info record 401 is found, execution of the tag extraction sensor ends (2514). Otherwise, a new tag info record 501 is created, and its local data is reset (2511). Afterwards, parent data 511 is set with corresponding values from parent info record 401 (2512) and the tag info record 501 is stored in the thread local storage of the started thread (2513), and execution of the sensor ends (2514).

FIG. 26 is a block diagram showing an exemplary embodiment for monitoring a transaction which is executing in a parent thread 2602 and which is spawning a child thread 2604, which is also monitored. Both parent thread 2602 and child thread 2604 are executed on a single application 2601. On starting of the parent thread 2602, a tag extraction sensor 316 is executed, which returns immediately because no tag info record 501 is available in the thread local storage. Afterwards, an instrumented method 310 is executed, which triggers the execution of an entry sensor 311. The entry sensor inserts a start path event record 601 and a path event record 631 indicating a method entry into the event buffer 210 of the agent 203. The method then calls a not instrumented method 2608, which in turn calls a nested instrumented method 310, causing the execution of an entry sensor 311, which adds a path event record 631 indicating a method entry to the event buffer 210 of the agent 203. During execution of this instrumented method 310, a thread creation 2603 is performed by calling a thread creating method 313, which causes the execution of a tagging sensor 314, which adds a parent info record 401 to the object representing the new thread which is passed from the parent thread 2602 to the new created child thread 2604. After executing the thread creation, the instrumented method 310 exits, causing the execution of an exit sensor 312, which inserts a path event record 621 indicating a method exit into the event buffer 210. After exiting this instrumented method 310 and the not instrumented method 2608, the first entered instrumented method 310 is exited, causing creation of a path event record 631 indicating a method exit which is stored in the event buffer 210. This also indicates that the execution of the parent thread 2602 ends and the local data section 520 of the tag info record 501 is cleared.

Meanwhile execution of the child thread 2604 may be started, causing the execution of a tag extraction sensor 316, which extracts parent information from a parent info record 401 and may create a tag info record 501, resets its local data 520 and initialize its parent data 510 with values from the parent info record 401. Afterwards, the child thread executes an instrumented method 310, causing the execution of an entry sensor 311 and an exit sensor 312 which create a start path event record and two path event records 631 indicating a new monitored thread, a method entry and a method exit. All event records are stored in the event buffer 210. Thread scheduling of the virtual machine, together with thread priorities may cause a delayed execution of the child thread, which may cause that the event records of the child thread are added to the event buffer 210 after all event records created by the parent thread 2602.

The agent 203 cyclically and asynchronously to execution of parent thread 1502 and child thread 1504 sends the path events and ping events placed in its event buffer 210 to its connected collector node 230. Different execution priorities of parent thread 2602 and child thread 2604 may cause that path events created by child thread 2604 are placed in the event buffer 210 after all path events created by the parent thread 2602 are already sent to the monitoring node 260 via a collector node 230, indicating that the part of the transaction performed by the parent thread 2602 has already finished before any trace data of the child thread 2604 reaches the monitoring node 260. In this case the completeness check process (see FIG. 24) waits after completeness of tracing data describing the execution of the parent thread 1502, until the latest event timestamp of all agents 203 connected to all connected collector nodes plus the async wait time is younger than the completed timestamp 1927 of the start path record 1902 describing the parent thread 2602. This allows correlating of delayed path event records from the child thread 2604 with the path events of the parent thread 2602 before marking the start path record 1901 describing the parent thread 2602 as completed. The path completion algorithm allows to provide an execution tracing path containing tracing data from parent thread execution 2602 and child thread execution 2604.

FIGS. 27A-27B are flow diagrams showing execution of an exemplary embodiment of tagging sensors 314 and tag extraction sensors 316 which may be instrumented into methods that initiate remote method calls (thread creating methods 313) and methods that handle remote execution of methods (thread starting methods 315).

FIG. 27A shows the invocation of a tagging sensor 314 which may be used to instrument thread creating 313 methods which initiate remote method calls, like e.g. Java RMI calls. On invocation of a remote method call at the client side, the tagging sensor 314 may first try to retrieve a tag info record 501 from the local storage of the current thread (2701). If no tag info record 501 is available, or the local data section of the tag info record 501 is not initialized (2702), the process ends (2707).

Otherwise, a parent info record 401 may be created and its agentId 402, local pathId 403 and forkId 404 may be initialized with agentId 521, local pathId 522, and forkId 524 from the local data section 520 of the tag info record 501 from the local thread storage (2703). Afterwards, the parent info record 401 is stored in the message representing the remote method call, which may be used to send information about a remote method invocation request from a remote method caller via a computer network to a remote method invocation server which may handle remote method calls (2704). Next, the tagging sensor 314 may create a path correlation event record 641, initialize its agentId 642, local pathId 643, call depth 645, and forkId 646 with agentId 521, local pathId 522, call depth 523 and forkId 524 of the tag info record 501, the sensorId 644 is set to a value uniquely identifying the sensor that created the path correlation event record 641, the async indicator 647 is set to a value indicating synchronous execution, and the current agent tickcount 648 is set to the current tickcount of the application node 201 running the application which initializes the remote method call. Additionally, the forkId 524 of the tag info record 501 is incremented (2705). The initialized path correlation event record 641 is then inserted into the event buffer 210 of the agent 203 (2706). The process ends then (2707).

FIG. 27B shows execution of a tag extraction sensor, which may be used to extract a parent info record from remote method message at the receiver side.

It may first be checked if the remote method call message contains a path info record 401 (2710). If no path info record is found the process ends (2714). Otherwise, a tag info record 501 may be created, its local data section 520 reset, indicating that no entry sensor 311 has been executed during this thread execution (2711), the parent info section 510 of the tag info record 501 is initialized with data from the parent info record 401 received with the remote method call message (2712) and the initialized tag info record 501 may be stored in the thread local storage (2713). The process then ends (2714).

FIG. 28 is a block diagram showing an exemplary embodiment for monitoring a transaction starting in a client application 2801 running on an application node, which performs a remote method call to a server application 2803 running on another application node 201, which is also monitored.

The monitored distributed transaction may be executed by a client application 2801 and a server application 2803 running on two application nodes 201, connected by a computer network 2806. An agent 203 may be deployed to the client application 2801 which is connected to a collector node 230 by a computer network 2809. Another agent 203 may be deployed to the server application 2803 which is connected to another collector node 230 via another computer network. Both collector nodes 230 may be connected to a monitoring node, via a computer network 2811.

The monitored transaction starts by executing a thread 2802 on the client application 2801. It enters an instrumented method 310, which triggers execution of an entry sensor 311 which creates a start path event record and path event record indicating a new monitored thread execution and an entered instrumented method 310. Both event records are stored in the even 210 of the agent 203 deployed to the client application 2801. Then, a remote method call 2812 is invoked, causing the execution of a tagging sensor 314, which places a path correlation event record 641 in the event buffer 210 of the agent 203. Afterwards, a remote method invocation message 2805, tagged with a parent info record 401 is sent to the sever application 2803 running on another application node 201 via a computer network 2806, and execution of the caller thread 2802 is suspended until the remote method execution is finished.

The remote method invocation message 2805 is received by the sever application 2803, which starts a new thread 2807 that invokes a remote method executor 2808, which triggers execution of a tag extraction sensor 316, which creates a tag info record 501, initializes its parent data section 510 with corresponding data from the parent info record 401 received with the remote method invocation message 2805, and stores it in the thread local storage. Afterwards, execution of the thread handling the remote execution 2807 invokes an instrumented method 310, which triggers execution of an entry sensor 311 and an exit sensor 312, which place a start path event record, and two path event records in the event buffer 210 of the agent deployed to the server application 2803. Afterwards, execution of the remote method is finished, and the suspended caller thread 2802 is notified about the finished remote method call, and an optional method return value is transferred back to the client application 2801 which may be handled by the caller thread 2802. Then, execution of the caller thread 2802 continues, which causes termination of the instrumented method 310 which trigger the execution of an exit sensor 312 which places a path event record in the event buffer 210 of the agent 203 deployed to the client application 2801.

The current agent tickcount fields of the path event records sent from the client application 2801 are initialized with current tickcount values from the timing system 2804 of the application node 201 running the client application 2801, and the current tickcount fields of path event records sent from the server application 2803 are initialized with current tickcount values from the timing system 2806 of the application node 201 running the server application 2803.

The agents 203 deployed to client application and server application may cyclically, and asynchronous to execution of the monitored distributed transaction create ping event records, store them in their event buffer and send the event buffer content to the collector nodes 230 to which they are connected.

The collector nodes 230 may concurrently receive path event records and ping event records from the two agents, may optionally buffer, encrypt and/or compress them, and forward them to the monitoring node 260 for correlation. Simultaneously, the monitoring node 260 may send commands to update collector/monitoring node and agent/collector node drifts.

As the agents 203 deployed to the client application 2801 and to the server application 2803 are connected to different collector nodes via different computer networks 2810 and 2811, all path event records sent by the client application 2801 may reach the event correlation module 265 before the path event records sent by the server application 2803, because e.g. the network latency of computer network 2810 connecting the agent 203 of the server application 2803 with its collector node 230 is much higher than the network latency of the computer network 2809 connecting the agent 203 of the client application 2801 with its collector node 230.

In this case, the cyclical drift update (see FIG. 18), may calculate a drift for the agent 203 deployed to the server application which compensates the higher network latency, and the path completeness check (see FIG. 24) may used the compensated agent latest timestamps 1515 of both connected agents 203 to defer setting the completeness state of the start path record modeling the thread execution at the client application until the latest timestamps 1515 of all connected agents are older than the completed timestamp of this start path record 1901. This guarantees that all path event records from the thread execution at the server application 2803 have already been correlated before the start part record 1901 modeling the client thread execution is marked as completed. It is noteworthy that cyclical drift update also compensates deviating drifts of the timing systems 2804, 2806 and 239 of involved application nodes 201 and collector nodes 230.

FIGS. 29A-29B are flow diagrams showing execution of an exemplary embodiment of tagging sensors 314 and tag extraction sensors 316 which may be instrumented into methods that initiate a web request, which may e.g. be a HTTP request on a web browser (thread creating methods 313) and methods that handle received web requests on a web server (thread starting methods 315).

FIG. 29 A shows the execution of tagging sensor 314, which may be instrumented into a method of a web browser which sends a web request to a web server. Instrumentation within the web browser may be performed by bytecode instrumentation in case of e.g. Java applets, or by instrumentation of JavaScript code in case of e.g. AJAX applications.

The tagging sensor first fetches a tag info record 501 from the thread local storage (2901). If no tag info record 501 is available or the local data section 520 of the found tag info record is not set (2902), the process then ends (2907). Otherwise, a parent info record 401 is created and initialized with data from the local data section 520 of the tag info record 501 (2903). Afterwards, the parent info record is stored in the web request which is going to be sent to the web server. This may be performed by e.g. adding some additional parameters to the HTTP header of a HTTP request (2904). Then, a path correlation event record 641 is created and initialized with data from the tag info record 501. Additionally, the forkId 524 of the tag info record 501 is incremented (2905). The path correlation event record is inserted into the event buffer 210 of the agent (2906), and the process then ends (2907).

FIG. 29B shows execution of a tag extraction sensor 316 which may extract correlation information from a received web request, e.g. a HTTP request. Execution of the tag extraction sensor 316 may be triggered by a received HTTP request. First, the sensor checks if the incoming HTTP request contains data to reconstruct a parent info record 401 (2910). If no such data is available, the process ends (2914). Otherwise, the sensor creates a tag info record 501 and resets its local data (2911). Afterwards, the data of the parent info section 510 is set to the values of the parent info record 401 initialized with data from the incoming request (2912), and the tag info record 501 is stored in the thread local storage (2913). The process then ends (2914).

FIG. 30 is a block diagram showing an exemplary embodiment for tracing distributed transactions originated from a web browser 3001 to a web server application 3003, connected by a computer network 3006.

Agents 203 may be deployed to the web browser 3001 and the web server application 3003, the agents may be connected to two different collector nodes 230, via different computer networks 3009 and 3010. The two collector nodes 230 may be connected to a monitoring node 260 via another computer network 3011.

The monitored distributed transaction e.g. starts by execution of an instrumented JavaScript method 310, executed by a JavaScript execution thread 3002 performed by a web browser 3001 running on an application node 201. The entry sensor 311 of the instrumented method 310 creates a start path event record and a path event record, which are both added to the event buffer 210 of the agent 203 which is deployed to the web browser 3001. Afterwards, the instrumented method may invoke a web request 3012, which may e.g. send a HTTP request to a web server application 3003. Performing the web request triggers execution of a tagging sensor 314, which creates a path correlation event record 641 which is added to the event buffer 210 of the agent deployed to the web browser, and adds a parent info record 401 to the HTTP request 3005 before it is sent to the web server application 3003. Afterwards, execution of the instrumented JavaScript method 310 may be suspended until a HTTP response from the web server application 3003 is received.

The web server application 3003 which may run on another application node 201, receives the HTTP request 3005 augmented with parent info record data 401 and may start a new thread 3007 to process the incoming HTTP request with a web request service handler 3008. A tag extraction sensor 316 may be instrumented to the web request service hander which extracts parent information from the received HTTP request 3005 creates a tag info record 501, initialize its parent info section with data from the parent info record 401 and store the created tag info record 501 in the local storage of the current thread. Afterwards, the web request service handler 3008 may enter an instrumented method 310, causing the execution of an entry sensor 311 and an exit sensor 312, which create a start path event record and two path event records which are added to the event buffer 210 of the agent 203 deployed to the web server application 3003.

Asynchronously to the execution of the monitored distributed transaction, the agents 203 deployed to the web browser 3001 and the web server application 3003 are cyclically sending path event records and ping event records stored in their event buffer 210 to their connected collector nodes 230 via different computer networks 3009 and 3010. The collector nodes 230 may encrypt and/or compress the incoming event records and forward them to a monitoring node 260 via another computer network 3011. Concurrently, the monitoring node 260 may send commands to update drift data of all connected collector nodes 230 and all connected agents 203.

Different latencies of the computer network 3009 connecting the web browser 3001 agent 203 with its collector node 230 and the computer network 3010 connecting the web server agent 203 with its collector node 230 may delay events from the web server application 3003 until all events of the web browser have been correlated by the event correlation module 265 of the monitoring node 260.

In this case, the agent collector drift 1514 for the agent 203 of the web server application 3003 may compensate the higher latency of the computer network connecting the agent 203 by adjusting the latest event timestamp 1514. The adjusted latest event timestamp 1510 may defer setting the completeness state 1926 of the start path record 1901 modeling the thread execution of the web browser 3001 until the latest event timestamp 1514 of the agent deployed to the web server application 3003 is younger than the completed timestamp 1927 of the start path record 1901. This guarantees that all events from the web server application 3003 which are older than the completed timestamp 1927 of the start path record 1901 modeling the part of the distributed transaction executed on the web browser 3001 have already arrived, and that all tracing data from the web application sever 3003 has already been correlated before the start path record 1901 of the web browser 3001 is marked as completed.

FIGS. 31A-31B are flow diagrams showing execution of an exemplary embodiment of tagging sensors 314 and tag extraction sensors 316 which may be instrumented into methods that send messages via a dedicate messaging system like system e.g. implementing the Java Messaging Service JMS (thread creating methods 313) and methods that process messages received from such messaging systems (thread starting methods 315). It is noteworthy that messaging systems may deliver messages to multiple recipients, and thereby may create different, parallel execution branches of distributed transactions.

FIG. 31A shows execution of a tagging sensor 314 which may be triggered by a message send initiated by a message sender application. First, the sensor tries to retrieve a tag info record 501 from the thread local storage (3101). If no tag info record 501 is available in the thread local storage or if the local data of the tag info record 501 is not set (3102), the process ends (3107). Otherwise, a parent info record 401 is created and initialized with data from the local data section 520 of the tag info record 501 (3103). Afterwards, the parent info record is applied to the message which is going to be sent. This may performed by adding a new parameter to the message and set its value with the created parent info record 401 (3104). Then, a path correlation event record may be created and initializes with data from the local data section of the tag info record 501, its current agent tickcount 648 may be set with the current tickcount of the application node 201 running the message sender application, and the async indicator 647 may be set to a value indicating an asynchronously executed sub path. Additionally, the forkId 524 of the tag info record 501 is incremented (3105). The created path correlation event record 641 may then be added to the event buffer 210 of the agent deployed to the message sender application (3106). The process then ends (3107).

FIG. 31B shows execution of a tag extraction sensor 316 which may be instrumented to a message receiving method. The sensor may be triggered if a message receiving application receives a new message and spawns a new thread to process this message. First, the sensor checks if the received message contains a parent info record 401 (3110). If no parent info record 401 is found, the process ends (3114). Otherwise, a tag info record 501 is created, its local data section 510 is cleared (3111) and its parent data section 520 is initialized with data from the received parent info record 401 (3112). Afterwards, the tag info record 501 is stored in the thread local storage (3113). The process then ends (3114).

FIG. 32 is a block diagram showing an exemplary embodiment for tracing distributed transactions originated from a message sender application 3201 to a set of message receiver applications 3211. Message sender application 3201 running on an application node 201 may send messages via a computer network 3206 to a messaging server 3207 running on another application node, which inserts received messages in a message queue 3208. The message receiver applications 3211 which may run in yet other application nodes, may receive messages from the messaging server 3207 via another computer network 3209.

Agents 203 may be deployed to the message sending application 3201 and some of the message receiving applications 3211, which may be connected to two different collector nodes 230, via different computer networks 3216 and 3215. The two collector nodes 230 may be connected to a monitoring node 260 via another computer network 3217.

The monitored transaction may start by a thread 3202 execution on the sender application 3201, which enters an instrumented method 310, which triggers execution of an entry sensor 311, which creates a start path event record 601 and a path event record 631 which are both inserted into the event buffer 210 of the agent 203 deployed to the message sender application 3201. Afterwards a message sending method 3203 is called which triggers execution of a tagging sensor 314. The tagging sensor 314 creates a parent info record 401 and attaches it to the message 3205 which is going to be sent, creates a path correlation event record 641 and appends it to the event buffer 210 of the agent 203. Afterwards the message 3205 may be sent to the messaging server 3207, and execution of the instrumented method may terminate, triggering execution of an exit sensor 312, which adds a path event record 631 to the event buffer 210 of the agent 203.

The messaging server may insert the message into its message queue 3208. The messages may be stored in the message queue until the messaging server has processed all previously received messages. The message server may then create copies of the received message 3205 for each receiver application 3211. The message copies 3210 also include a copy of the parent info record 401. The message server 3207 may then deliver each message copy 3210 to a message receiver application 3211.

Each receiver application may spawn a new thread 3212 on receiving the message 3210, and invoke a message handling method 3213, to which a tag extraction sensor 316 may be instrumented. The tag extraction sensor crates a new tag info record 501, initializes its parent data section with data from the parent data info 401 extracted from the received message 3210, and may store the tag info record in the thread local storage. During execution of the message handling method 3213, an instrumented method 310 may be invoked which triggers the execution of an entry sensor 311 and an exit sensor 312. The entry sensor places a start path event record 601 and a path event record 631, and the exit sensor places a path event record 631 in the event buffer 210 of the agent 203 deployed to the respective receiver application 3211.

Asynchronously to the execution of the monitored distributed transaction, the agents 203 deployed to the sender application 3201 and the multiple receiver applications 3211 are cyclically sending path event records and ping event records stored in their event buffer 210 to their connected collector nodes 230 via different computer networks 3216 and 3215. The collector nodes 230 may encrypt and/or compress the incoming event records and forward them to a monitoring node 260 via another computer network 3217. Concurrently, the monitoring node 260 may send commands to update drift data of all connected collector nodes 230 and all connected agents 203.

Different network latencies of computer networks connecting agents 203 with their respective collector nodes 230, and deviating time drifts between timing systems 3204, 3214 and 239 of involved application nodes 201 and connector nodes 230 may be handled by the time cyclical drift update (see FIG. 18) together with the cyclical path completeness check (see FIG. 24).

Delays between sending a message 3205 from a sender application 3201 and receiving and processing corresponding received messages 3210 on receiver applications 3211, caused by message handling in messaging servers 3207, may be addressed by the async wait time (see FIG. 24, 2406). The async wait time delays setting the completeness state 1926 of a start path record 1901 containing path correlation records with set async indicator for a specific time period, which may compensate delay time caused by message handling of messaging servers 3207.

FIG. 33 is a block diagram showing an exemplary embodiment for monitoring a transaction starting in a client application 3301 running on an application node 201, which performs a remote method call to a server application 3303 running on another application node 201, which is not monitored.

The monitored distributed transaction may be executed by a client application 3301 and a server application 3303 running on two different application nodes 201, connected by a computer network 3306. An agent 203 may be deployed to the client application 3801 which is connected to a collector node 230 by a computer network 3809. No agent 203 may be deployed to the server application 3303. The collector node 230 may be connected to a monitoring node, via a computer network 3310.

The monitored transaction starts by executing a thread 3302 on the client application 3301. It enters an instrumented method 310, triggering the execution of an entry sensor 311 which creates a start path event record and path event record indicating a new monitored thread execution an entered instrumented method 310. Both event records are stored in the even 210 of the agent 203 deployed to the client application 203. Then, a remote method call 3312 is invoked, causing the execution of a tagging sensor 314, which places a path correlation event record 641 in the event buffer 210 of the agent 203.

Afterwards, a remote method invocation message 3305, tagged with a parent info record 401 is sent to the sever application 3303 running on another application node 201 via a computer network 3306, and execution of the caller thread 3302 is suspended until the remote method execution is finished.

The server application 3303 may create a new thread 3307 and may start a remote method executor 3308 to process the received remote method invocation message 3305. After remote method execution is finished, the server application 3303 may send an optional method return value back to the client application 3302 together with a notification that the remote method was performed successfully.

The suspended thread 3302 may be resumed and exit the instrumented method 310, triggering the execution of an exit sensor 312, which places a path event record 631 in the event buffer of the agent 203.

The agent 203 deployed to the client application 3301 may cyclically and asynchronous to the execution of the monitored transaction, insert ping event records 800 into its event buffer 210 and may send event in its event buffer 210 to its connected collector node 230. The collector node 230 may forward those events to the monitoring node 260 for correlation.

The event correlation module 265 may receive the events sent by the agent 203 deployed to the client application 3301, create a start path record 1901 and add path records 1931 and path correlation records 1941 corresponding to the received start path event record 601, path event records 631, and path correlation event record 641. After receiving the last path event record 631 from the client application 3301, the event correlation module 265 recognizes that the execution of the thread 3302 by the client application 3301 is finished (see FIGS. 22, 2210, 2211 and 2212) and sets the completed timestamp 1927 of the start path record 1901. The cyclical path completeness check (see FIG. 24) compares the completed timestamp 1927 with the oldest agent timestamp (OAT) of all agents 203 connected to all connected collector nodes 230 (see FIG. 24, 2407). An OAT which is grater than the completed timestamp 1927 indicates that time on all connected agents is more advanced than the execution time of the remote method, and no more path event records describing the remote method execution can be expected, because e.g. no agent 203 is deployed to the server application 3303 handling the remote method call. Thus the start path record 1901 can be marked as completed.

FIG. 34 shows how certain exemplary embodiments may use available drift information to translate timing information of different parts of a monitored distributed transaction from their origin timing system into the timing system of the monitoring node. Translating all time information into one timing system allows comparison of time information received from different application nodes.

Instrumented method M1 3401 is executed on a client application node 201, which calls instrumented method M2 3402 which invokes a remote method M3 3411 on a server application node 201. Entry and exit of M1, M2 and M3, create start path event records 601 and path event records 631, and remote invocation 3412 of M3 3411 creates a path correlation event record 641. All sent path event records contain tickcount information valid for the timing system of the respective timing system of the executing application node 201, e.g. ticks of client application node 3405 or ticks of server application node 3413. Without translation of timing information, application node local analysis may be performed, by e.g. calculating execution time for M1, calculating relative start time of M2 from start of M1, etc. But it would not be possible to determine e.g. the delay between start of M2 on client application node and the start of M3 on the server application node 201.

The time drift of the agent 203 deployed to the client application node 201, together with the time drift of its collector node 230, may be used to translate 3421 time information received from the agent of the client application node 201 into the timing system of the monitoring node 260. Additionally, the drift data of agent 203 and collector node 230 for the server application node 201 may be used to translate 3422 time information received from the agent deployed to the server application node into the timing system of the monitoring node 260.

M1' 3423, M2' 3424 and M3' 3426 represent the execution time of M1 3401, M2 3402 and M3 3411 after translation into the timing system of the monitoring node 260 and allow to relate timing information received from different agents, like e.g. determining the network delay between invocation of M3 on the client application node 201, and start of the execution of M3 on the server application node 201.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed.

The techniques described above may be implemented, for example, in hardware, software tangibly stored on a computer-readable medium, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by a computer processor executing a program tangibly embodied (e.g., in non-transitory signals) on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

The invention claimed is:

1. A method comprising:
   (A) selecting a start path record representing a start path of a distributed transaction, wherein the start path corresponds to execution of a first part of the distributed transaction, wherein a plurality of application nodes executes parts of the distributed transaction, wherein the plurality of application nodes execute on a plurality of computer systems, wherein a first application node in the plurality of application nodes executes a first part of the distributed transaction, wherein a first plurality of agents is installed on the plurality of application nodes, wherein at least one of the plurality of agents is installed on each of the plurality of application nodes, wherein the start path does not have a parent path;
   (B) identifying a completion timestamp, represented in a timing system of a destination node executing on one of the plurality of computer systems, indicating a completion time of the start path;
   (C) identifying an oldest latest event timestamp, represented in a timing system of the monitoring node, from among a plurality of latest event timestamps associated with a second plurality of agents, the second plurality of agents including the first plurality of agents that are installed on the plurality of application nodes;
   (D) determining whether the oldest agent timestamp represents a time that is later in time than the completion timestamp;
   (E) if the oldest agent timestamp is determined to represent a time that is later in time than the completion timestamp, then setting a completeness state of the start path to indicate that the start path has completed;
   (F) if the oldest agent timestamp is determined to represent a time that is later in time than the completion timestamp, then determining whether all sub-paths of the start path have completed;
   (G) if it is determined that all sub-paths of the start path have completed, then setting a completeness state of the start path to indicate that the start path has completed; and
   (H) if it is not determined that all sub-paths of the start path have completed, then, if a timeout period associated with the start path has elapsed since the start path has initiated, then setting a completeness state of the start path to indicate that the start path was completed by timeout.

2. The method of claim 1, wherein (E) further comprises setting completeness states of all descendant paths of the start path to indicate that the descendant paths have completed.

3. The method of claim 1, wherein the start path includes at least one asynchronous part, and wherein (D) comprises determining whether the oldest agent timestamp represents a time that is later in time than a sum of the completion timestamp and an asynchronous wait time.

4. The method of claim 1, further comprising:
   (I) if the oldest agent timestamp is determined to represent a time that is later in time than a sum of the completion timestamp and an asynchronous wait time, then determining whether all sub-paths of the start path have completed; and (J) if it is determined that all sub-paths of the start path have completed, then setting a completeness state of the start path to indicate that the start path has completed.

5. A system comprising at least one non-transitory computer-readable medium comprising computer-program instructions executable by at least one computer processor to perform a method, the method comprising:
- (A) selecting a start path record representing a start path of a distributed transaction, wherein the start path corresponds to execution of a first part of the distributed transaction, wherein a plurality of application nodes executes parts of the distributed transaction, wherein the plurality of application nodes execute on a plurality of computer systems, wherein a first application node in the plurality of application nodes executes a first part of the distributed transaction, wherein a first plurality of agents is installed on the plurality of application nodes, wherein at least one of the plurality of agents is installed on each of the plurality of application nodes, wherein the start path does not have a parent path;
- (B) identifying a completion timestamp, represented in a timing system of a destination node executing on one of the plurality of computer systems, indicating a completion time of the start path;
- (C) identifying an oldest latest event timestamp, represented in a timing system of the monitoring node, from among a plurality of latest event timestamps associated with a second plurality of agents, the second plurality of agents including the first plurality of agents that are installed on the plurality of application nodes;
- (D) determining whether the oldest agent timestamp represents a time that is later in time than the completion timestamp; and
- (E) setting a completeness state of the start path to indicate that the start path has completed if the oldest agent timestamp is determined to represent a time that is later in time than the completion timestamp;
- (F) determining whether all sub-paths of the start path have completed if the oldest agent timestamp is determined to represent a time that is later in time than the completion timestamp;
- (G) setting a completeness state of the start path to indicate that the start path has completed if it is determined that all sub-paths of the start path have completed; and
- (H) setting a completeness state of the start path to indicate that the start path was completed by timeout if: (1) it is not determined that all sub-paths of the start path have completed and (2) a timeout period associated with the start path has elapsed since the start path has initiated.

6. The system of claim 5, wherein (E) further comprises setting completeness states of all descendant paths of the start path to indicate that the descendant paths have completed.

7. The system of claim 5, wherein the start path includes at least one asynchronous part, and wherein (D) comprises determining whether the oldest agent timestamp represents a time that is later in time than a sum of the completion timestamp and an asynchronous wait time.

8. The system of claim 5, wherein the method further comprises:
- (I) determining whether all sub-paths of the start path have completed if the oldest agent timestamp is determined to represent a time that is later in time than a sum of the completion timestamp and an asynchronous wait time; and
- (J) setting a completeness state of the start path to indicate that the start path has completed if it is determined that all sub-paths of the start path have completed.

* * * * *

UNITED STATES PATENT AND TRADEMARK OFFICE
CERTIFICATE OF CORRECTION

| | |
|---|---|
| PATENT NO. | : 9,231,858 B1 |
| APPLICATION NO. | : 12/971408 |
| DATED | : January 5, 2016 |
| INVENTOR(S) | : Greifeneder et al. |

It is certified that error appears in the above-identified patent and that said Letters Patent is hereby corrected as shown below:

Title page

Item (57), under "ABSTRACT", in Column 2, Line 4, delete "computers" and insert -- computer --, therefor.

Item (57), under "ABSTRACT", in Column 2, Line 6, delete "computers" and insert -- computer --, therefor.

Item (57), under "ABSTRACT", in Column 2, Line 15, delete "computers" and insert -- computer --, therefor.

Drawings

In Fig. 1, Sheet 1 of 34, delete "FIG" and insert -- FIG. --, therefor at each occurrence throughout the figures (Figs. 2-34) and on Title page figure (O.G. Fig.).

In Fig. 3, Sheet 3 of 34, in Tag "233", in Line 2, delete "metadat" and insert -- metadata --, therefor.

In Fig. 13, Sheet 13 of 34, in Step "1300", in Line 3, delete "collecor" and insert -- collector --, therefor.

In Fig. 18A, Sheet 18 of 34, in Step "1801", in Line 1, delete "montoring" and insert -- monitoring --, therefor.

In Fig. 18A, Sheet 18 of 34, in Step "1801", in Line 8, delete "montoring" and insert -- monitoring --, therefor.

In Fig. 20, Sheet 20 of 34, in Step "2003", in Line 4, delete "completness" and insert -- completeness --, therefor.

Signed and Sealed this
Fifth Day of July, 2016

Michelle K. Lee
*Director of the United States Patent and Trademark Office*

Drawings

In Fig. 20, Sheet 20 of 34, in Step "2007", in Line 5, delete "monitoringnode" and insert -- monitoring node --, therefor.

In Fig. 20, Sheet 20 of 34, in Step "2011", in Line 7, delete "recordss;" and insert -- records; --, therefor.

In Fig. 22, Sheet 22 of 34, in Step "2206", in Line 1, delete "entryevent?" and insert -- entry event? --, therefor.

In Fig. 22, Sheet 22 of 34, in Step "2207", in Line 1, delete "initialialize" and insert -- initialize --, therefor.

In Fig. 22, Sheet 22 of 34, in Step "2207", in Line 3, delete "appendit" and insert -- append it --, therefor.

In Fig. 24, Sheet 24 of 34, delete "intervall" and insert -- interval --, therefor.

In Fig. 31A, Sheet 31 of 34, in Step "3105", in Line 2, delete "asyncIndicator;" and insert -- async indicator; --, therefor.

Specification

In Column 2, Line 24, delete "compute" and insert -- computer --, therefor.

In Column 5, Line 13, delete "nodes" and insert -- nodes. --, therefor.

In Column 11, Line 17, delete "transactions" and insert -- transactions. --, therefor.

In Column 11, Line 37, delete "an collector" and insert -- a collector --, therefor.

In Column 11, Line 39, delete "ist" and insert -- its --, therefor.

In Column 11, Line 42, delete "ist" and insert -- its --, therefor.

In Column 11, Line 52, delete "node;" and insert -- node. --, therefor.

In Column 11, Line 54, delete "agent" and insert -- agent. --, therefor.

In Column 11, Line 56, delete "node" and insert -- node. --, therefor.

In Column 13, Line 34, delete "thread;" and insert -- thread. --, therefor.

In Column 14, Line 13, delete "sent:" and insert -- sent. --, therefor.

Specification

In Column 14, Lines 38-39, delete "an run" and insert -- a run --, therefor.

In Column 17, Line 37, delete "sent" and insert -- send --, therefor.

In Column 18, Line 51, delete "request 123." and insert -- request 111. --, therefor.

In Column 19, Line 15, delete "execution 142," and insert -- execution 143, --, therefor.

In Column 22, Line 43, delete "pathId 623," and insert -- pathId 622, --, therefor.

In Column 24, Line 50, delete "record 802," and insert -- record 800, --, therefor.

In Column 25, Line 1, delete "initialized." and insert -- initialized --, therefor.

In Column 25, Line 32, delete "pathId 621 and agentId 622" and insert -- pathId 622 and agentId 621 --, therefor.

In Column 27, Line 25, delete "timestamp 15," and insert -- timestamp 1513, --, therefor.

In Column 28, Lines 29-31, delete "agentId 1509, tick to time ratio 1510, agent connect tickcount 1511, and agent/collector connect timestamp 1512" and insert -- agentId 1510, tick to time ratio 1511, agent connect tickcount 1512, and agent/collector connect timestamp 1513 --, therefor.

In Column 29, Line 13, delete "repository 1509" and insert -- repository 1508 --, therefor.

In Column 31, Lines 66-67, delete "sensorId 1942," and insert -- sensorId 1943, --, therefor.

In Column 32, Line 33, delete "state 1925" and insert -- state 1926 --, therefor.

In Column 32, Lines 61-62, delete "agentId 1508" and insert -- agentId 1510 --, therefor.

In Column 33, Line 42, delete "forkId 1941" and insert -- forkId 1942 --, therefor.

In Column 33, Line 62, delete "references 1945" and insert -- references 1946 --, therefor.

In Column 35, Line 2, delete "timestamp 638" and insert -- timestamp --, therefor.

In Column 35, Line 12, delete "records 1925" and insert -- records 1924 --, therefor.

In Column 36, Line 38, delete "records 1946" and insert -- references 1946 --, therefor.

In Column 37, Line 24, delete "path references 1945 of all path correlation records 1945" and insert -- path references 1946 of all path correlation records 1941 --, therefor.

Specification

In Column 37, Line 26, delete "states 1945" and insert -- states 1926 --, therefor.

In Column 37, Line 36, delete "competed timestamp 1926" and insert -- completed timestamp 1927 --, therefor.

In Column 38, Line 55, delete "event recored 621" and insert -- event record 631 --, therefor.

In Column 39, Line 13, delete "parent thread 1502 and child thread 1504" and insert -- parent thread 2602 and child thread 2604 --, therefor.

In Column 39, Line 25, delete "parent thread 1502," and insert -- parent thread 2602, --, therefor.

In Column 40, Line 47, delete "sever" and insert -- server --, therefor.

In Column 40, Line 53, delete "sever" and insert -- server --, therefor.

In Column 40, Line 60, delete "execution 2807" and insert -- execution 2808 --, therefor.

In Column 41, Line 14, delete "timing system 2806" and insert -- timing system 2813 --, therefor.

In Column 41, Line 55, delete "timing systems 2804, 2806" and insert -- timing systems 2804, 2813 --, therefor.

In Column 43, Line 29, delete "timestamp 1514." and insert -- timestamp 1513. --, therefor.

In Column 43, Line 30, delete "timestamp 1510" and insert -- timestamp 1513 --, therefor.

In Column 43, Line 33, delete "timestamp 1514" and insert -- timestamp 1513 --, therefor.

In Column 43, Line 40, delete "application sever 3003" and insert -- server application 3003 --, therefor.

In Column 44, Line 17, delete "local data section 510" and insert -- local data section 520 --, therefor.

In Column 44, Line 18, delete "parent data section 520" and insert -- parent data section 510 --, therefor.

In Column 45, Line 67, delete "sever" and insert -- server --, therefor.

In Column 46, Line 11, delete "application 3302" and insert -- application 3301 --, therefor.

CERTIFICATE OF CORRECTION (continued)
U.S. Pat. No. 9,231,858 B1

Specification

In Column 46, Line 34, delete "FIGS. 22," and insert -- FIG. 22, --, therefor.

In Column 46, Line 39, delete "grater" and insert -- greater --, therefor.